United States Patent
Ryoo et al.

(10) Patent No.: US 12,435,462 B2
(45) Date of Patent: *Oct. 7, 2025

(54) METHOD FOR CONTROLLING LAUNDRY TREATING APPARATUS

(71) Applicant: LG Electronics Inc., Seoul (KR)

(72) Inventors: Byeongjo Ryoo, Seoul (KR); Hyuksoo Lee, Seoul (KR); Bio Park, Seoul (KR); Woohee Kang, Seoul (KR); Taewoong Kim, Seoul (KR); Taewon Cheon, Seoul (KR)

(73) Assignee: LG Electronics Inc., Seoul (KR)

( * ) Notice: Subject to any disclaimer, the term of this patent is extended or adjusted under 35 U.S.C. 154(b) by 896 days.

This patent is subject to a terminal disclaimer.

(21) Appl. No.: 17/357,326

(22) Filed: Jun. 24, 2021

(65) Prior Publication Data

US 2021/0404110 A1   Dec. 30, 2021

(30) Foreign Application Priority Data

Jun. 24, 2020 (KR) .................. 10-2020-0077187
Jun. 24, 2020 (KR) .................. 10-2020-0077203
Jan. 29, 2021 (KR) .................. 10-2021-0013281

(51) Int. Cl.
*D06F 58/48* (2020.01)
*D06F 58/20* (2006.01)
(Continued)

(52) U.S. Cl.
CPC ............ *D06F 58/48* (2020.02); *D06F 58/206* (2013.01); *D06F 2103/04* (2020.02);
(Continued)

(58) Field of Classification Search
CPC .... D06F 58/48; D06F 58/206; D06F 2103/04; D06F 2103/10; D06F 2105/26;
(Continued)

(56) References Cited

U.S. PATENT DOCUMENTS

2007/0251119 A1   11/2007   Kim et al.
2015/0299934 A1   10/2015   Cavarretta et al.
(Continued)

FOREIGN PATENT DOCUMENTS

CN   107313226 A       11/2017
EP   2735643 A1 *   5/2014   ............. D06F 58/20
(Continued)

OTHER PUBLICATIONS

International Search Report and Written Opinion in International Appln. No. PCT/KR2021/007897, dated Oct. 13, 2021, 11 pages.
(Continued)

*Primary Examiner* — Jessica Yuen
(74) *Attorney, Agent, or Firm* — Fish & Richardson P.C.

(57) ABSTRACT

Disclosed is a method for controlling a laundry treating apparatus including an efficiency increasing operation and an efficiency maintaining operation, wherein the efficiency increasing operation includes a first efficiency increasing operation, wherein the controller controls the first driver such that an RPM of the drum corresponds to a first drum RPM and controls the second driver such that an RPM of the fan corresponds to a first fan RPM to perform a first efficiency increasing process, and a second efficiency increasing operation, wherein, after the first efficiency increasing operation, the controller controls the first driver such that the RPM of the drum corresponds to the first drum RPM and controls the second driver such that the RPM of the fan corresponds to a second fan RPM higher than the first fan RPM to perform a second efficiency increasing process.

24 Claims, 18 Drawing Sheets

(51) Int. Cl.
    *D06F 103/04* (2020.01)
    *D06F 103/10* (2020.01)
    *D06F 105/26* (2020.01)
    *D06F 105/30* (2020.01)
    *D06F 105/48* (2020.01)

(52) U.S. Cl.
    CPC ...... *D06F 2103/10* (2020.02); *D06F 2105/26* (2020.02); *D06F 2105/30* (2020.02); *D06F 2105/48* (2020.02)

(58) Field of Classification Search
    CPC .. D06F 2105/30; D06F 2105/48; D06F 58/02; Y02B 40/00
    See application file for complete search history.

(56) References Cited

U.S. PATENT DOCUMENTS

| | | | | |
|---|---|---|---|---|
| 2015/0322618 | A1* | 11/2015 | Bisaro | D06F 58/34 62/238.7 |
| 2018/0195230 | A1 | 7/2018 | Kim et al. | |
| 2021/0404108 | A1* | 12/2021 | Lee | D06F 58/206 |
| 2021/0404109 | A1* | 12/2021 | Ryoo | D06F 58/206 |

FOREIGN PATENT DOCUMENTS

| | | |
|---|---|---|
| EP | 3124689 A1 | 2/2017 |
| EP | 3492649 A1 | 6/2019 |
| JP | 2012-055400 A | 3/2012 |
| JP | 2014-045954 A | 3/2014 |
| JP | 2016-052394 A | 4/2016 |
| KR | 10-2006-0033188 A | 4/2006 |
| KR | 20120014429 | 2/2012 |
| RU | 2590124 C2 | 7/2016 |
| WO | WO 2014/079800 A1 | 5/2014 |
| WO | WO 2018/025391 A1 | 2/2018 |
| WO | WO2019083209 | 5/2019 |

OTHER PUBLICATIONS

Extended European Search Report in European Appln. No. 21828948.6, mailed on Jul. 11, 2024, 7 pages.
Office Action in Korean Appln. No. 10-2021-0013281, mailed on Dec. 6, 2024, 18 pages (with English translation).
Office Action in Russian Appln. No. 2023101266, mailed on Oct. 29, 2024, 11 pages (with English translation).
Office Action in Chinese Appln. No. 202180052855.7, mailed on May 29, 2025, 29 pages (with English translation).

* cited by examiner

METHOD FOR CONTROLLING LAUNDRY TREATING APPARATUS

CROSS-REFERENCE TO RELATED APPLICATIONS

This application claims the benefit of Korean Patent Application Nos. 10-2020-0077203, filed on Jun. 24, 2020, 10-2020-0077187, filed on Jun. 24, 2020, and 10-2021-0013281, filed on Jan. 29, 2021, which are hereby incorporated by reference as if fully set forth herein.

TECHNICAL FIELD

The present disclosure relates to a method for controlling a laundry treating apparatus, and to a method for controlling a laundry treating apparatus that may perform a drying operation of laundry accommodated in a drum.

BACKGROUND

A laundry treating apparatus, which is an apparatus for treating laundry input into a cabinet, includes a washing machine, a dryer, a refresher, and the like. The refresher is an apparatus that removes dust, germs, and the like from clothes and the like once worn.

The dryer, which is one of the laundry treating apparatus in which a drying operation of the laundry may be performed, may remove moisture from the laundry accommodated in a drum inside a cabinet. A scheme in which air is heated, and then the moisture in the laundry is evaporated and removed from the laundry as the heated air passes through the laundry may be used for the dryer.

The dryer may be classified into an exhaust-type dryer or a circulation-type dryer based on a heating scheme of air or a flow path of the air. The exhaust-type dryer may be constructed such that the air is heated with a heater, and the air that has passed through the laundry is discharged to the outside. The circulation-type dryer may be constructed such that the air is heated through a fluid circulator including a compressor, a condenser, and an evaporator, and the air that has passed through the laundry is recirculated in the dryer.

In one example, the drying operation in the treating apparatus in which the drying operation may be performed may be divided into a plurality of processes. Related document KR 10-2006-0023715 A discloses a laundry treating apparatus in which a drying operation including a plurality of drying sections is performed.

The laundry treating apparatus in related document KR 10-2006-0023715 A discloses a structure in which the plurality of drying sections are distinguished by determining a moisture content through a temperature change of air discharged from the drum, and an exhaust-type drying scheme using an electric heater is used.

However, in a heat pump-type drying scheme including the compressor and the like, the distinguishment of the drying sections using the temperature change of the air is difficult to relate to changes in a drying efficiency and an energy efficiency, and is difficult to relate to establishment of an appropriate control strategy of various driving apparatuses included in the laundry treating apparatus.

That is, the scheme that divides drying processes based on a temperature change of air at an outlet of the drum based on the exhaust-type laundry treating apparatus using the heater as a heat source is hard to be utilized in the heat pump-type laundry treating apparatus with different drying mechanism characteristics, that is, a condensing-type laundry treating apparatus.

In one example, related document EP 03143190 B1 discloses a laundry treating apparatus that performs a drying operation including a stabilization process of the various driving apparatuses included in the laundry treating apparatus.

The laundry treating apparatus of related document EP 03143190 B1 determines a stabilization section in which each driving apparatus is stabilized when the drying operation is performed, and the stabilization section is identified by measuring a temperature of fluid of a heat pump system.

However, the stabilization section is directly related to stabilization of each system of the laundry treating apparatus and has little direct relation to the changes in the drying efficiency and the energy efficiency for effective drying. In the drying operation, processes other than the stabilization section may not be distinguished.

In one example, related document EP 3124680 B1 discloses a laundry treating apparatus in which the drying operation is divided into a plurality of processes and whether to simultaneously drive the drum and a fan and a rotation direction of the fan are set for each process.

Related document EP 3124680 B1 discloses the drying operation limited to a small load of the laundry. The drying operation is only divided into the plurality of processes based on improvement of a distribution of the laundry or the temperature of the fluid in the heat pump, and is not directly related to the changes in the drying efficiency and the energy efficiency. In addition, the drum and the fan are not able to have different RPM changes in the simultaneous driving situation of the drum and the fan, so that it is difficult to establish a more advantageous control strategy in terms of the energy efficiency and the drying efficiency.

Therefore, in the laundry treating apparatus in which the drying operation may be performed, it becomes an important task in this technical field to divide the drying operation into the plurality of processes based on the drying efficiency, the energy efficiency, or the like, identify the plurality of processes in an effective scheme, and efficiently establish a control strategy of each driving apparatus for each of the plurality of processes to improve the drying efficiency and the energy efficiency.

SUMMARY

Embodiments of the present disclosure are to provide a method for controlling a laundry treating apparatus that may efficiently perform a drying operation by dividing the drying operation of laundry into a plurality of drying processes based on a drying efficiency.

In addition, embodiments of the present disclosure are to provide a method for controlling a laundry treating apparatus that may effectively establish a control strategy of each driving apparatus even when a change in a drying efficiency is not reflected in real time by dividing a drying operation of laundry into a plurality of drying processes based on a behavioral tendency of the drying efficiency.

In addition, embodiments of the present disclosure are to provide a method for controlling a laundry treating apparatus that may efficiently perform a drying operation by effectively setting entry conditions for each of a plurality of drying processes constituting the drying operation of laundry.

In addition, embodiments of the present disclosure are to provide a method for controlling a laundry treating apparatus that may effectively improve energy efficiency by efficiently operating each driving apparatus for each of a plurality of processes included in a drying operation of laundry.

One embodiment of the present disclosure may divide a drying operation in which laundry is dried in a laundry treating apparatus into a plurality of processes based on a generally applied sensor, and allow operating conditions of a compressor, a fan, a drum, and the like corresponding to main driving apparatuses to be different based on laundry evaporation and dehumidification characteristics in the drying processes, thereby improving energy efficiency.

One embodiment of the present disclosure may perform an effective drying operation by dividing a drying operation of laundry based on drying efficiency, and the drying operation may include an efficiency increasing process for increasing the drying efficiency, an efficiency maintaining process for efficiently maintaining the drying efficiency increased in the efficiency increasing process, and an efficiency decreasing process for completing the drying operation while efficiently reducing the drying efficiency after the efficiency maintaining process.

One embodiment of the present disclosure may efficiently divide a drying operation using a humidity sensor that may measure a humidity amount of air that passes through a drum in a condensing-type laundry treating apparatus in which evaporation of moisture and dehumidification of air are performed while the air is circulating.

In addition, while a conventional case has a structure in which a drum and a fan are rotated through one motor, one embodiment of the present disclosure may control a RPM of a drum and a RPM of a fan at different change rates in processes of a drying operation, and efficiently improve drying efficiency and energy efficiency of the drying operation through various operating conditions of the drum, the fan, and a compressor as the drum and the fan receive rotational forces from different actuators.

For example, in one embodiment of the present disclosure, a driver for rotating a drum and a fan may include a first driver and a second driver, the first driver may rotate the drum, the second driver may rotate the fan, and a controller may control the first and second drivers independently of each other to establish various driving strategies.

The method for controlling the laundry treating apparatus according to an embodiment of the present disclosure described above relates to a method for controlling a laundry treating apparatus including a cabinet, a drum disposed rotatably inside the cabinet, wherein the drum accommodates laundry therein, a fluid circulator including a condenser, a compressor, and an evaporator for circulating fluid therethrough, an air circulator including a fan for flowing air heated through the fluid circulator into the drum, a driver including a first driver for rotating the drum and a second driver for rotating the fan, and a controller that performs a drying operation of the laundry by controlling the compressor and the driver.

One embodiment of the present disclosure includes an efficiency increasing operation, wherein the controller performs an efficiency increasing process for increasing drying efficiency inside the drum during the drying operation, and an efficiency maintaining operation, wherein, after the efficiency increasing operation, the controller performs an efficiency maintaining process for maintaining the drying efficiency during the drying operation.

The efficiency increasing operation includes a first efficiency increasing operation and a second efficiency increasing operation. In the first efficiency increasing operation, the controller controls the first driver such that an RPM of the drum corresponds to a first drum RPM and controls the second driver such that an RPM of the fan corresponds to a first fan RPM to perform a first efficiency increasing process.

In the second efficiency increasing operation, after the first efficiency increasing operation, the controller controls the first driver such that the RPM of the drum corresponds to the first drum RPM and controls the second driver such that the RPM of the fan corresponds to a second fan RPM higher than the first fan RPM to perform a second efficiency increasing process.

The controller may control the compressor and the driver such that an increase rate of the drying efficiency is higher in the first efficiency increasing operation than in the second efficiency increasing operation.

The controller may control the compressor and the driver such that an increase rate of a measured value of a compressor sensor disposed in the fluid circulator to measure a temperature of the fluid passing through the compressor is greater in the first efficiency increasing operation than in the second efficiency increasing operation.

The controller may control the compressor such that a frequency of the compressor corresponds to a first frequency in the first efficiency increasing operation and in the second efficiency increasing operation.

The controller may control the compressor such that the frequency of the compressor corresponds to a second frequency lower than the first frequency in the efficiency maintaining operation. The controller may control the first driver such that the RPM of the drum corresponds to the first drum RPM in the efficiency maintaining operation.

The controller may control the second driver such that the RPM of the fan corresponds to the second fan RPM in the efficiency maintaining operation. The efficiency increasing operation may further include a second efficiency increasing process entry determination operation.

The second efficiency increasing process entry determination operation may be performed before the second efficiency increasing operation, and the controller may determine whether a duration of the first efficiency increasing operation is equal to or greater than a first efficiency increasing operation execution time in the second efficiency increasing process entry determination operation. The second efficiency increasing operation may be performed when the duration is determined to be equal to or greater than the first efficiency increasing operation execution time in the second efficiency increasing process entry determination operation.

The method may further include an efficiency maintaining process entry determination operation performed before the efficiency maintaining operation, wherein the controller determines whether entry conditions of the efficiency maintaining process are satisfied using a measured value of a humidity sensor disposed in the air circulator to measure a humidity of the air passing through the drum. The efficiency maintaining operation may be performed when it is determined in the efficiency maintaining process entry determination operation that the entry conditions of the efficiency maintaining process are satisfied.

The humidity sensor may include a first humidity sensor for measuring a humidity of air flowing into the drum and a second humidity sensor for measuring a humidity of air flowing out of the drum, and in the efficiency maintaining process entry determination operation, the controller may determine that the entry conditions of the efficiency maintaining process are satisfied when the drying efficiency derived from the measured values of the first humidity sensor and the second humidity sensor reaches an efficiency maintaining process entry drying efficiency.

The method may further include an efficiency maintaining process entry determination operation performed before the efficiency maintaining operation, wherein the controller determines whether a measured value of a compressor sensor disposed in the fluid circulator to measure a temperature of the fluid passing through the compressor corresponds to an efficiency maintaining process entry compressor sensor value in the efficiency maintaining process entry determination operation.

The efficiency maintaining operation may be performed when the measured value of the compressor sensor satisfies the efficiency maintaining process entry compressor sensor value in the efficiency maintaining process entry determination operation.

The controller may correct the efficiency maintaining process entry compressor sensor value to a higher value as a measured value of an outdoor air sensor for measuring a temperature of air outside the cabinet is higher in the efficiency maintaining process entry determination operation.

The method may further include an efficiency decreasing operation, wherein, after the efficiency maintaining operation, the controller performs an efficiency decreasing process for reducing the drying efficiency during the drying operation, and the efficiency decreasing operation may include a first efficiency decreasing operation.

In the first efficiency decreasing operation, the controller may control the first driver such that the RPM of the drum corresponds to the first drum RPM and control the second driver such that the RPM of the fan corresponds to a third fan RPM lower than the second fan RPM to perform a first efficiency decreasing process.

The controller may control the compressor such that a frequency of the compressor corresponds to a second frequency in the efficiency maintaining operation, and the controller may control the compressor such that the frequency of the compressor corresponds to a third frequency lower than the second frequency in the first efficiency decreasing operation.

The efficiency increasing operation may further include a laundry amount determination operation performed before the first efficiency increasing operation, wherein the controller determines a laundry amount while rotating the drum in the laundry amount determination operation.

In the first efficiency decreasing operation, the controller may correct the third fan RPM to a value equal to the second fan RPM and correct the third frequency to a value equal to the second frequency when the laundry amount determined in the laundry amount determination operation is equal to or greater than a large amount reference value.

The method may further include an efficiency decreasing process entry determination operation performed before the efficiency maintaining operation, wherein the controller determines whether a change rate of a measured value of a humidity sensor disposed in the air circulator to measure a humidity of the air passing through the drum corresponds to an efficiency decreasing process entry humidity change rate in the efficiency decreasing process entry determination operation.

The efficiency decreasing operation may be performed when the change rate of the measured value of the humidity sensor corresponds to the efficiency decreasing process entry humidity change rate in the efficiency decreasing process entry determination operation.

The method may further include an efficiency decreasing process entry determination operation performed before the efficiency maintaining operation, wherein the controller determines whether a change rate of a measured value of an evaporator sensor disposed in the fluid circulator to measure a temperature of the fluid passing through the evaporator corresponds to an efficiency decreasing process entry change rate in the efficiency decreasing process entry determination operation.

The efficiency decreasing operation may be performed when the change rate of the measured value of the evaporator sensor reaches the efficiency decreasing process entry change rate in the efficiency decreasing process entry determination operation.

The method may further include an efficiency decreasing process entry determination operation performed before the efficiency decreasing operation, wherein the controller determines whether a measured value of an electrode sensor disposed in the drum to measure a moisture amount in contact with the laundry reaches an efficiency decreasing process entry electrode sensor value in the efficiency decreasing process entry determination operation, and the efficiency decreasing operation may be performed when the measured value of the electrode sensor reaches the efficiency decreasing process entry electrode sensor value in the efficiency decreasing process entry determination operation.

The efficiency increasing operation may further include a laundry amount determination operation performed before the first efficiency increasing operation, wherein the controller determines a laundry amount while rotating the drum in the laundry amount determination operation.

In the efficiency decreasing process entry determination operation, the controller may determine whether the measured value of the electrode sensor reaches the efficiency decreasing process entry electrode sensor value when the laundry amount determined in the laundry amount determination operation is equal to or greater than a small amount reference value.

The efficiency decreasing operation may further include a second efficiency decreasing operation, wherein, after the first efficiency decreasing operation, the controller controls the first driver such that the RPM of the drum corresponds to a second drum RPM lower than the first drum RPM and control the second driver such that the RPM of the fan corresponds to a fourth fan RPM lower than the third fan RPM to perform a second efficiency decreasing process.

The controller may control the compressor and the driver such that a reduction rate of the drying efficiency is greater in the first efficiency decreasing operation than in the second efficiency decreasing operation.

The controller may control the compressor such that a frequency of the compressor corresponds to a third frequency in the first efficiency decreasing operation, and the controller may control the compressor such that the frequency of the compressor corresponds to a fourth frequency lower than a third frequency in the second efficiency decreasing operation.

In the second efficiency decreasing operation, the second drum RPM may have a value greater than 0, and the fourth fan RPM and the fourth frequency may correspond to 0, and thus, driving of the fan and the compressor may be terminated.

The efficiency decreasing operation may further include a second efficiency decreasing process entry determination operation, and in the second efficiency decreasing process entry determination operation, the controller may determine whether a measured value of an electrode sensor disposed in the drum to measure a moisture amount in contact with the laundry corresponds to a second efficiency decreasing process entry electrode sensor value for a preset observation time when the laundry amount determined in the laundry amount determination operation is equal to or greater than a small amount reference value.

The second efficiency decreasing operation may be performed when the measured value of the electrode sensor corresponds to the second efficiency decreasing process entry electrode sensor value for the observation time in the second efficiency decreasing process entry determination operation.

The controller may determine whether a duration of the first efficiency decreasing operation is equal to or greater than a first efficiency decreasing operation execution time when the laundry amount determined in the laundry amount determination operation is less than the small amount reference value in the second efficiency decreasing process entry determination operation, and the second efficiency decreasing operation may be performed when the duration of the first efficiency decreasing operation is equal to or greater than the first efficiency decreasing operation execution time in the second efficiency decreasing process entry determination operation.

In the second efficiency decreasing operation, the controller may terminate the second efficiency decreasing operation when a duration of the second efficiency decreasing operation is equal to or greater than a second efficiency decreasing operation execution time.

In one example, a method for controlling a laundry treating apparatus according to an embodiment of the present disclosure may include an efficiency maintaining operation, wherein the controller performs an efficiency maintaining process for maintaining drying efficiency inside a drum during a drying operation, and an efficiency decreasing operation, wherein, after the efficiency maintaining operation, the controller performs an efficiency decreasing process for reducing the drying efficiency during the drying operation.

The controller may control the first driver such that an RPM of the drum corresponds to a first drum RPM and control the second driver such that an RPM of the fan corresponds to a second fan RPM in the efficiency maintaining operation in the efficiency maintaining operation.

The efficiency decreasing operation may include a first efficiency decreasing operation, and, in the efficiency decreasing operation, the controller may control the first driver such that the RPM of the drum corresponds to the first drum RPM and control the second driver such that the RPM of the fan corresponds to a third fan RPM lower than the second fan RPM to perform a first efficiency decreasing process.

Embodiments of the present disclosure may provide the method for controlling the laundry treating apparatus that may efficiently perform the drying operation by dividing the drying operation of the laundry into the plurality of drying processes based on the drying efficiency.

In addition, embodiments of the present disclosure may provide the method for controlling the laundry treating apparatus that may effectively establish the control strategy of each driving apparatus even when the change in the drying efficiency is not reflected in real time by dividing the drying operation of the laundry into the plurality of drying processes based on the behavioral tendency of the drying efficiency.

In addition, embodiments of the present disclosure may provide the method for controlling the laundry treating apparatus that may efficiently perform the drying operation by effectively setting the entry conditions for each of the plurality of drying processes constituting the drying operation of the laundry.

In addition, embodiments of the present disclosure may provide the method for controlling the laundry treating apparatus that may effectively improve the energy efficiency by efficiently operating each driving apparatus for each of the plurality of processes included in the drying operation of the laundry.

DETAILED DESCRIPTION

Figure 1:
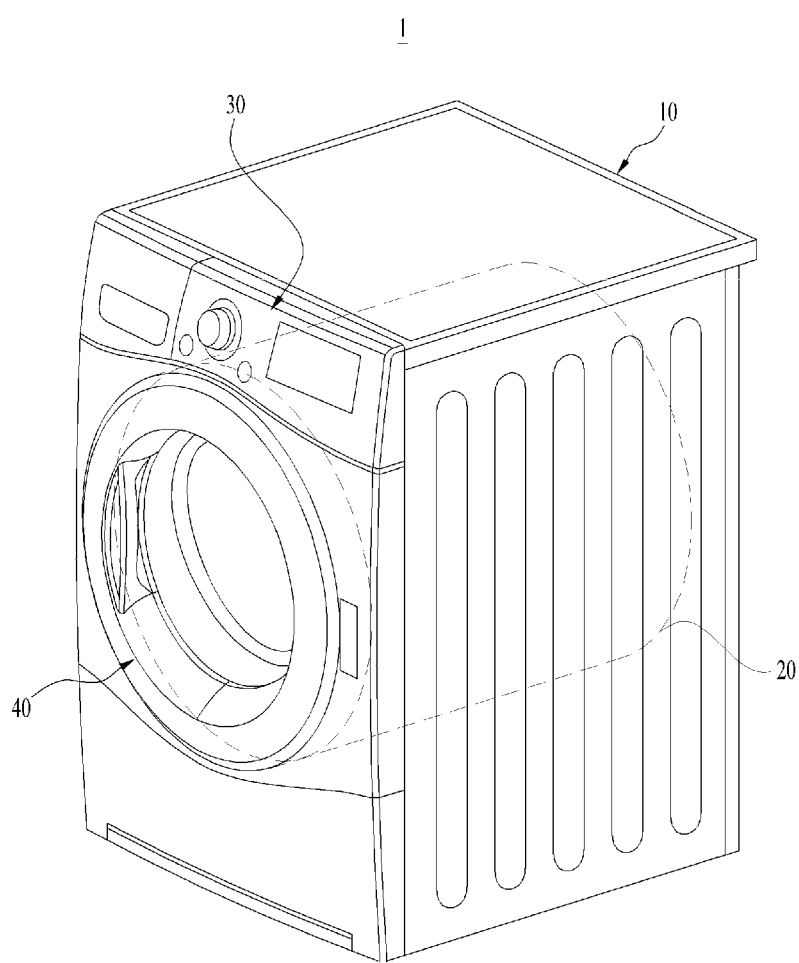
FIG. 1 is a view showing a laundry treating apparatus according to an embodiment of the present disclosure.

Hereinafter, an embodiment of the present disclosure will be described in detail with reference to the accompanying drawings such that a person having ordinary knowledge in the technical field to which the present disclosure belongs may easily implement the embodiment.

However, the present disclosure is able to be implemented in various different forms and is not limited to the embodiment described herein. In addition, in order to clearly describe the present disclosure, components irrelevant to the description are omitted in the drawings. Further, similar reference numerals are assigned to similar components throughout the specification.

Duplicate descriptions of the same components are omitted herein.

In addition, it will be understood that when a component is referred to as being 'connected to' or 'coupled to' another component herein, it may be directly connected to or coupled to the other component, or one or more intervening components may be present. On the other hand, it will be understood that when a component is referred to as being 'directly connected to' or 'directly coupled to' another component herein, there are no other intervening components.

The terminology used in the detailed description is for the purpose of describing the embodiments of the present disclosure only and is not intended to be limiting of the present disclosure.

As used herein, the singular forms 'a' and 'an' are intended to include the plural forms as well, unless the context clearly indicates otherwise.

It should be understood that the terms 'comprises', 'comprising', 'includes', and 'including' when used herein, specify the presence of the features, numbers, steps, operations, components, parts, or combinations thereof described herein, but do not preclude the presence or addition of one or more other features, numbers, steps, operations, components, or combinations thereof.

In addition, in this specification, the term 'and/or' includes a combination of a plurality of listed items or any of the plurality of listed items. In the present specification, 'A or B' may include 'A', 'B', or 'both A and B'.

Figure 2:
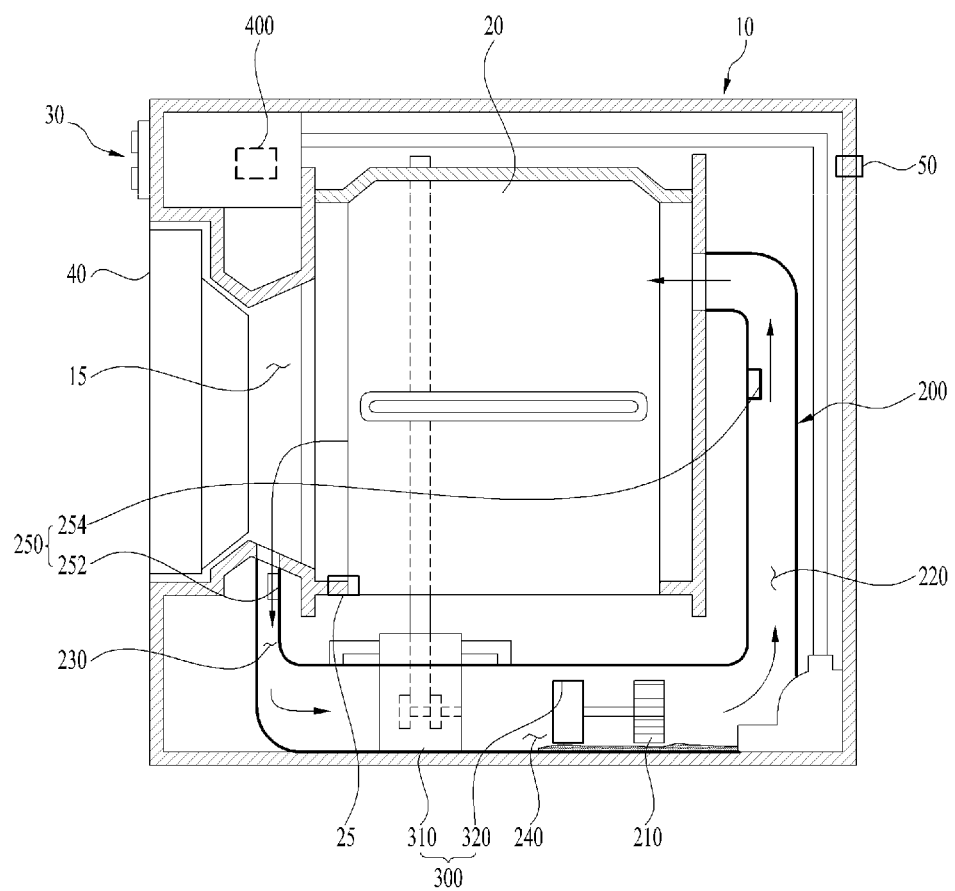
FIG. 2 is a view showing an interior of a laundry treating apparatus according to an embodiment of the present disclosure.

FIG. 1 shows a laundry treating apparatus 1 according to an embodiment of the present disclosure, and FIG. 2 shows an interior of a laundry treating apparatus 1 according to an embodiment of the present disclosure.

When referring to FIGS. 1 and 2, the laundry treating apparatus 1 according to an embodiment of the present disclosure includes a cabinet 10 and a drum 20. The cabinet 10 forms an appearance of the laundry treating apparatus 1, and a shape thereof may vary.

A control unit 30 may be disposed in the cabinet 10. At least a portion of the control unit 30 may be exposed to the outside of the cabinet 10, and the control unit 30 may be located at a top of a front face of the cabinet 10.

The control unit 30 may include a display and a manipulation unit that may be manipulated by a user. The display may visually represent an operating state and the like of the laundry treating apparatus 1. In addition, the display may further include a sound output unit that may output a sound, and may inform the user of the operating state and the like of the laundry treating apparatus 1 with the sound through the sound output unit.

The manipulation unit may include a plurality of buttons, or include a dial, a touch pad, and the like, and a command input by the user through the manipulation unit may be transmitted to a controller 400. The controller 400 that controls the laundry treating apparatus 1 may be equipped inside the control unit 30. The controller 400 may control a driver 300 and a fluid circulator 100 as will be described below.

In one example, a laundry inlet 15 may be defined in the cabinet 10, and a laundry door 40 that opens and closes the laundry inlet 15 may be disposed on the cabinet 10. The laundry inlet 15 and the laundry door 40 may be in various shapes at various locations on the cabinet 10.

FIG. 1 shows a state in which the laundry inlet 15 and the laundry door 40 are respectively defined in and disposed on a front face of the cabinet 10 according to an embodiment of the present disclosure. FIG. 1 discloses a laundry treating apparatus 1 in a form of a front loader in which the laundry inlet 15 and the laundry door 40 are respectively defined in and disposed on the front face of the cabinet 10, but a laundry treating apparatus 1 of a top loader type in which the laundry inlet 15 and the laundry door 40 are respectively defined in and disposed on a top face of the cabinet 10 is also possible.

The drum 20 may be disposed inside the cabinet 10. The drum 20 may be constructed to be rotatable, and the laundry may be accommodated in the drum 20. The drum 20 is in communication with the laundry inlet 15, so that the laundry input through the laundry inlet 15 may be accommodated in the drum 20.

The drum 20 may be formed in a cylindrical shape with a space defined therein, and one face thereof may be opened. The open face may face the laundry inlet 15 of the cabinet 10. Therefore, the laundry input through the laundry inlet 15 may be accommodated in the drum 20 through the open face of the drum 20.

In one example, the drum 20 may include a lifter that may stir the laundry by ascending and descending the laundry. A gasket for preventing leakage of the laundry may be disposed between the laundry inlet 15 of the cabinet 10 and the open face of the drum 20.

In one example, FIG. 2 shows an air circulator 200 disposed inside the cabinet 10 according to an embodiment of the present disclosure. The air circulator 200 may include a flow channel along which air flows defined therein, and may include a fan 210 for flowing the air.

The air circulator 200 may be constructed such that the air flowing inside the air circulator 200 circulates while passing through the drum 20. The air in the air circulator 200 may be heated while passing through the fluid circulator 100 to be described later. That is, one embodiment of the present disclosure may correspond to a condensing-type treating apparatus 1.

The air circulator 200 may include a fluid circulator-passing portion 240. The fluid circulator-passing portion 240 may be constructed to pass through at least a portion of the fluid circulator 100, and may serve as a path along which internal air is dehumidified and heated while passing through the fluid circulator 100.

The air circulator 200 may further include an air introducing portion 220. The air introducing portion 220 may correspond to a flow path of air that connects the fluid circulator-passing portion 240 with the drum 20. High-temperature and low-humidity air that has passed through the fluid circulator-passing portion 240 may flow along the air introducing portion 220 and be supplied into the drum 20.

The high-temperature and low-humidity air supplied into the drum 20 may come into contact with the laundry inside the drum 20 or pass through the laundry. Moisture in the laundry may be evaporated by the high-temperature and low-humidity air, and air with increased humidity containing the evaporated moisture may be discharged from the drum 20.

The air circulator 200 may further include an air discharging portion 230. The air discharging portion 230 may correspond to a flow path of air that connects the drum 20 with the fluid circulator-passing portion 240. Air discharged from the drum 20 may flow along the air discharging portion 230 to reach the fluid circulator-passing portion 240, then, may be dehumidified and heated while passing through the fluid circulator-passing portion 240, and then, pass through the air introducing portion 220 again to be supplied into the drum 20, so that the drying of the laundry may proceed.

In one example, in one embodiment of the present disclosure, the driver 300 may be constructed to rotate the drum 20 and the fan 210. That is, the driver 300 may be connected to the drum 20 and the fan 210 to provide a rotational force to the drum 20 and the fan 210.

In one embodiment of the present disclosure, the driver 300 may be composed of a single motor or a plurality of motors. FIG. 2 shows the driver 300 including a first driver 310 connected to the drum 20 and a second driver 320 connected to the fan 210. The first driver 310 and the second driver 320 may correspond to motors that consume power to generate rotational forces.

When the driver 300 includes the first driver 310 and the second driver 320, the first driver 310 and the second driver 320 may be in different operating states. For example, the controller 400 may be connected to the first driver 310 and the second driver 320 to allow RPMs of the first driver 310 and the second driver 320 to be different from each other, allow one of the first driver 310 and the second driver 320 to be operated, or allow RPM change rates of the first driver 310 and the second driver 320 to be different from each other.

Figure 3:
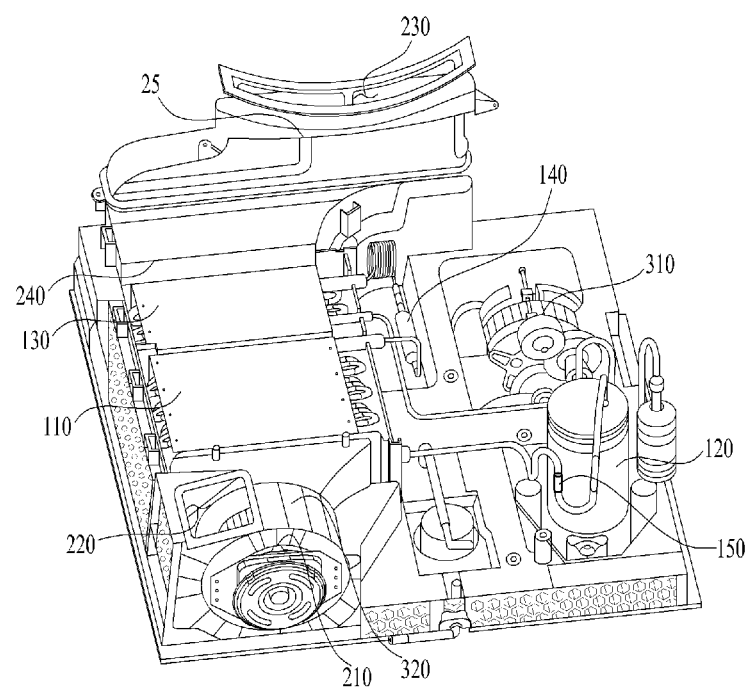
FIG. 3 is a view showing a fluid circulator and an air circulator of a laundry treating apparatus according to an embodiment of the present disclosure.
Figure 4:
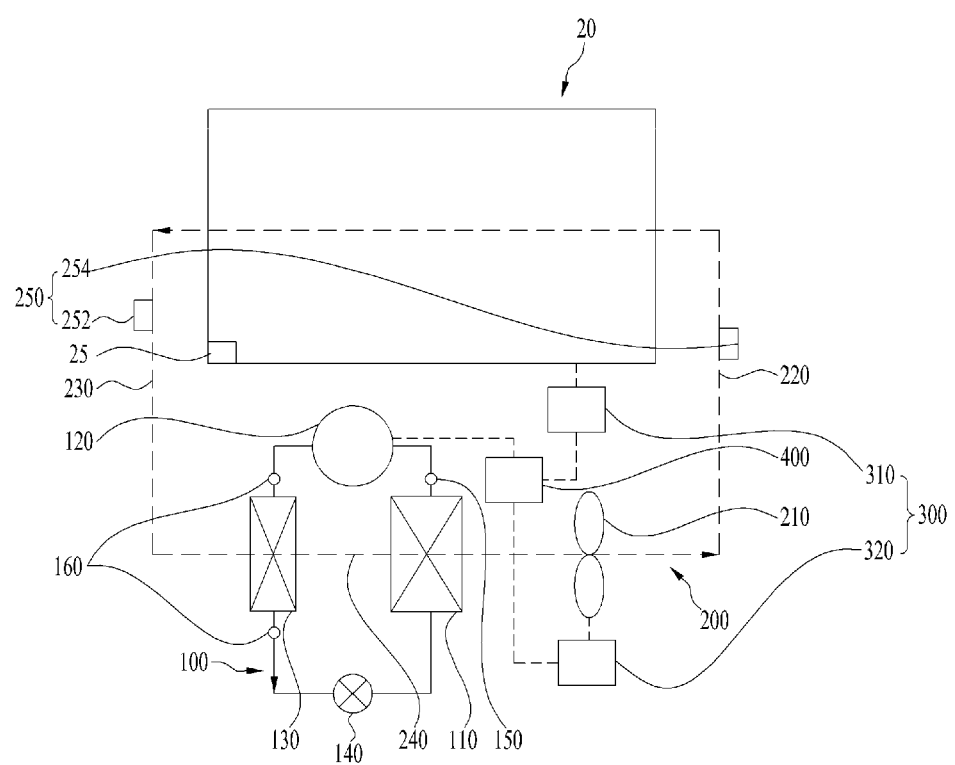
FIG. 4 is a view showing an operating relationship between a fluid circulator and an air circulator in a laundry treating apparatus according to an embodiment of the present disclosure.

In one example, FIG. 3 shows the fluid circulator 100 and the air circulator 200 according to an embodiment of the present disclosure, and FIG. 4 shows an operating relationship between the fluid circulator 100 and the air circulator 200 according to an embodiment of the present disclosure.

At least a portion of the fluid circulator 100 and the air circulator 200 may be disposed on a base disposed on a bottom face of the laundry treating apparatus 1, and the fluid circulator 100 may circulate fluid by repeating an endothermic process and an exothermic process.

The fluid circulator 100 may include a condenser 110, a compressor 120, an expansion valve 140, and an evaporator 130 through which the fluid circulates. There may be various fluid types. The fluid may be compressed while passing through the compressor 120, then release heat to the outside while passing through the condenser 110, then, be decreased in a pressure while passing through the expansion valve 140, and then, absorb heat from the outside while passing through the evaporator 130.

That is, the fluid in the fluid circulator 100 may repeat a circulation process of being supplied to the compressor 120 again after performing the endothermic process and the exothermic process while sequentially passing through the compressor 120, the condenser 110, the expansion valve 140, and the evaporator 130.

The condenser 110 and the evaporator 130 of the fluid circulator 100 may be disposed on the fluid circulator-passing portion 240 of the air circulator 200. That is, the air flowing along the fluid circulator-passing portion 240 in the air circulator 200 passes through the evaporator 130 and the condenser 110 of the fluid circulator 100.

A temperature of the air in the air circulator 200 is reduced by the evaporator 130 that reduces the temperature of the air, and the moisture in the air is condensed and collected on a surface of the evaporator 130 and at a lower portion of the evaporator 130. As described above, water generated by the evaporator 130 may be used for washing the interior of the laundry treating apparatus 1, utilized during a drying operation, or discharged to the outside as needed.

The air in the air circulator 200 may be heated while passing through the condenser 110 that increases the temperature of the air. The air heated after passing through the condenser 110 may be supplied into the drum 20 again. That is, the air in the air circulator 200 may be increased in humidity while passing the interior of the drum 20, then be dehumidified while passing through the evaporator 130, then be heated while passing through the condenser 110, and then be supplied into the drum 20 again in a high-temperature and low-humidity state. FIG. 4 conceptually shows a relationship between the fluid circulator 100 in which the fluid circulates and the air circulator 200 in which the air circulates.

In one example, in one embodiment of the present disclosure, the fluid circulator 100 may include a compressor sensor 150 that measures a temperature of fluid discharged from the compressor 120. FIG. 3 shows the compressor sensor 150 disposed on a discharge flow channel of the compressor 120, and FIG. 4 conceptually shows a location of the compressor sensor 150 in the fluid circulator 100.

The compressor sensor 150 may measure the temperature of the fluid discharged from the compressor 120. The compressor sensor 150 may be disposed in the compressor 120 or disposed on the discharge flow channel of the compressor 120 along which the fluid discharged from the compressor 120 flows.

In one example, in one embodiment of the present disclosure, the controller 400 may control the compressor 120 and the driver 300 to perform the drying operation of the laundry.

The controller 400 may be equipped inside the control unit 30 or inside the cabinet 10. The controller 400 may be connected to the control unit 30 to receive a command of a user, and may provide information on the driving state to the user through the display of the control unit 30.

The controller 400 may be connected to the fluid circulator 100 and the driver 300 to control the fluid circulator 100 and the driver 300. For example, the controller 400 may control a frequency at which the compressor 120 operates in the fluid circulator 100 or control a RPM of the driver 300.

In one example, in the drying operation of laundry, the controller 400 may control the fluid circulator 100 and the driver 300 to perform the drying operation in which the laundry is dried. The drying operation may be divided into a plurality of drying processes as will be described below, and the controller 400 may control operating states of the fluid circulator 100 and the driver 300 based on each drying process.

In one example, in one embodiment of the present disclosure, the drying operation of laundry may include an efficiency increasing process P10 for increasing a drying efficiency G3 inside the drum 20, an efficiency maintaining process P20 for maintaining the drying efficiency G3, and an efficiency decreasing process P30 for reducing the drying efficiency G3. That is, one embodiment of the present disclosure may proceed with the drying operation by dividing the drying operation of the laundry into the plurality of drying processes based on the drying efficiency G3.

The drying efficiency G3 corresponds to an actual evaporation amount for a theoretical maximum evaporation amount that may occur inside the drum 20. For the drying efficiency G3, the theoretical maximum evaporation amount may be calculated from a difference between a maximum absolute humidity for a current temperature of the air discharged from the drum 20 and a humidity amount of the air supplied into the drum 20, and the actual evaporation amount may be calculated from a difference between an actual absolute humidity of the air discharged from the drum 20 and a humidity amount of the air supplied into the drum 20.

A case in which the drying operation is continued for an excessively long time while the drying efficiency G3 is low, a case in which power consumption of the driver 300, the compressor 120, and the like is set unnecessarily although the drying efficiency G3 is maximum that may be reached in a current condition, or a case in which the operating states of the driver 300, the compressor 120, and the like are controlled to maintain the drying efficiency G3 high despite the drying operation entering the latter part is disadvantageous in terms of the energy efficiency.

That is, it is important for improving the energy efficiency of the laundry treating apparatus 1 to identify a change in the drying efficiency G3 in the drying operation of the laundry to effectively distinguish the plurality of drying processes, and effectively operate the driver 300, the compressor 120, and the like to provide proper drying efficiency G3 for each drying process.

Figure 6:
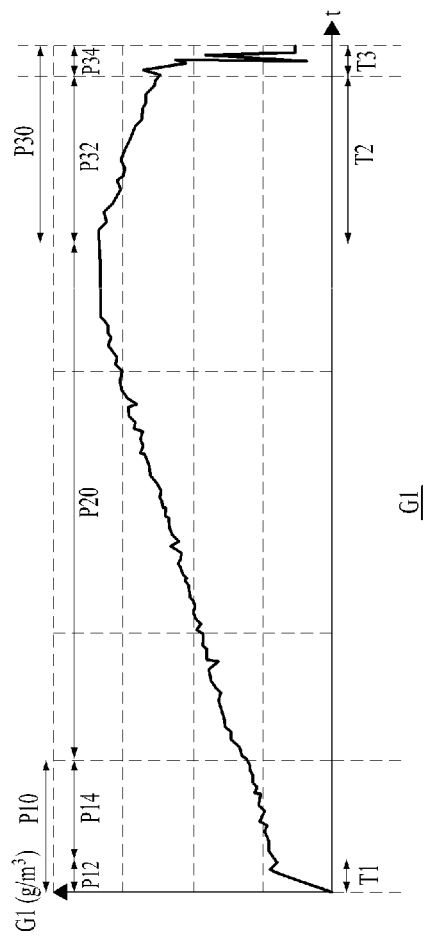
FIG. 6 is a graph showing an evaporation amount in a drum resulted from a drying operation of laundry in a laundry treating apparatus according to an embodiment of the present disclosure.

FIG. 6 is a graph showing an actual evaporation amount G1 inside the drum 20 in the drying operation of the laundry according to an embodiment of the present disclosure. A horizontal axis of FIG. 6 represents time, and a vertical axis represents the actual evaporation amount G1. Referring to FIG. 6, the actual evaporation amount G1 by the drying operation continuously increases in the beginning and middle of the drying operation, and then decreases in the latter part.

It may be understood that the actual evaporation amount G1 decreases in the latter part of the drying operation because moisture that may evaporate under the same condition itself decreases as the moisture in the laundry becomes equal to or less than a certain amount, and because the moisture of the laundry becomes equal to or less than the certain amount to reduce the output of the driver 300 and the compressor 120, and thus, to gradually reduce the temperature of the fluid and the temperature of the air.

Figure 7:
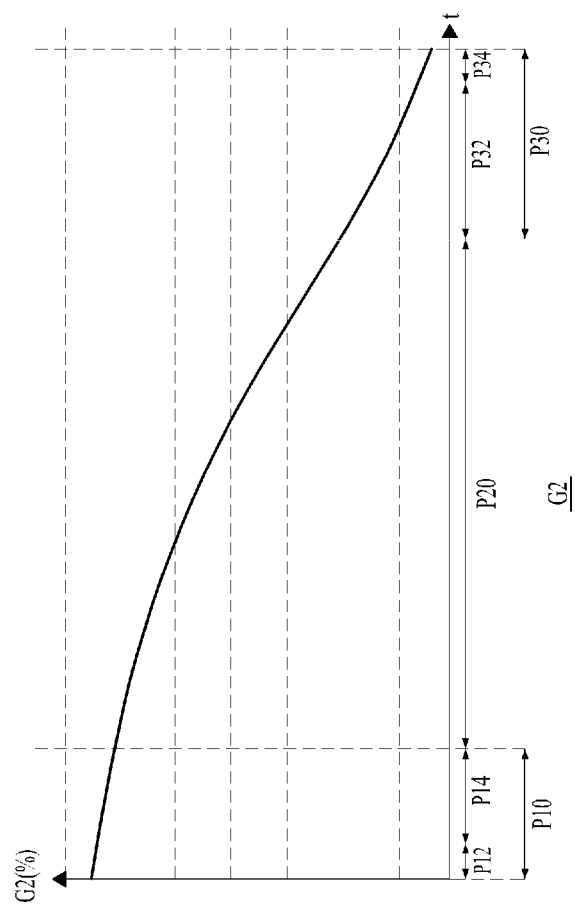
FIG. 7 is a view showing a change in a moisture amount in laundry resulted from a drying operation of the laundry in a laundry treating apparatus according to an embodiment of the present disclosure.

In one example, FIG. 7 is a graph showing a moisture amount G2 of the laundry in the drying operation of the laundry. A horizontal axis in FIG. 7 represents time, and a vertical axis represents the moisture amount G2. The graph in FIG. 7 is a result of calculating the moisture amount G2 of the laundry to a total load inside the drum 20 as a ratio.

Referring to FIG. 7, it may be seen that the moisture amount G2 of the laundry is reduced throughout the drying operation, but a reduction rate of the moisture amount G2 of the laundry increases from the beginning to the middle of the drying operation, and then, decreases again as the latter part proceeds.

That is, rapidly increasing the reduction rate of the moisture amount G2 of the laundry in the beginning of the drying operation of the laundry is advantageous for the energy efficiency improvement with the increase of the drying efficiency G3. In addition, flexibly reducing the reduction rate of the moisture amount G2 of the laundry in the latter part of the drying operation is advantageous for the energy efficiency improvement because the drying may be performed while effectively reducing the power consumption of the driver 300 and the compressor 120.

Figure 8:
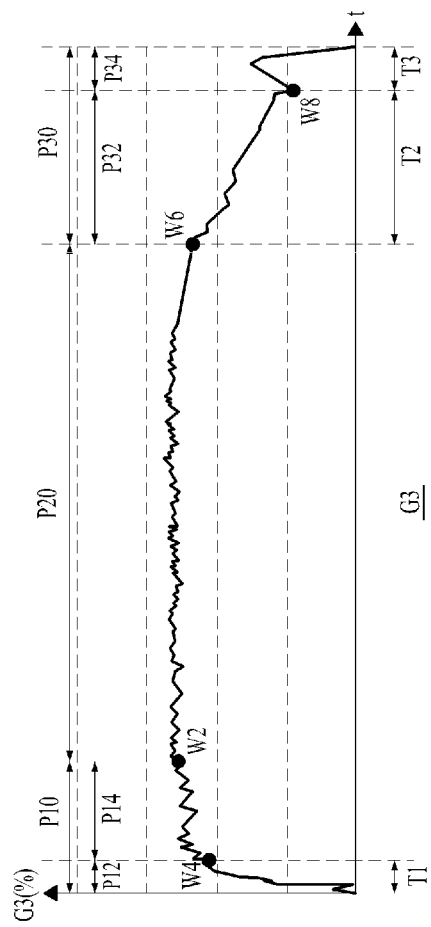
FIG. 8 is a view showing a change in a drying efficiency resulted from a drying operation of laundry in a laundry treating apparatus according to an embodiment of the present disclosure.

FIG. 8 is a graph showing the drying efficiency G3 calculated by the actual evaporation amount for the theoretical maximum evaporation amount that may occur inside the drum 20 in the drying operation of the laundry according to an embodiment of the present disclosure. In FIG. 8, a horizontal axis represents time, and a vertical axis represents the drying efficiency G3.

In one embodiment of the present disclosure, the drying operation may be divided into the efficiency increasing process P10, the efficiency maintaining process P20, and the efficiency decreasing process P30. The efficiency increasing process P10 corresponds to the drying process for increasing the drying efficiency G3.

One embodiment of the present disclosure may shorten a total time required for the drying operation and improve the energy efficiency by increasing a change rate of the drying efficiency G3 through the efficiency increasing process P10 to shorten a time to reach a maximum drying efficiency.

The efficiency maintaining process P20 is a drying process in which the drying of the laundry is performed while maintaining the drying efficiency G3, which has increased rapidly by the efficiency increasing process P10. In reality, the efficiency maintaining process P20 may be performed while allowing a variation within a certain range of the drying efficiency G3 resulted from changes in outdoor air, a laundry material, a laundry amount, and the like.

The drying operation of the laundry may reach a maximum region in which, even when the temperature of the fluid in the fluid circulator 100 or the temperature of the air in the air circulator 200 are increased through the control of the driver 300 or the compressor 120, the drying efficiency G3 is not able to increase any more under the corresponding condition or an increase amount is meaningless.

In one embodiment of the present disclosure, the efficiency maintaining process P20 is a process in which the drying efficiency G3 is maintained in the maximum region. The drying efficiency G3 in the efficiency maintaining process P20 may correspond to a predetermined range value instead of a specific value, and may be a maximum value in the corresponding condition or any value predetermined for substituting the maximum value.

One embodiment of the present disclosure may shorten a delay time for the drying efficiency G3 to reach the maximum value by rapidly increasing the drying efficiency G3 through the efficiency increasing process P10, and control the driver 300, the compressor 120, and the like without wasting unnecessary power through the efficiency maintaining process P20, so that the laundry may be dried while maintaining the maximum drying efficiency G3.

In the efficiency decreasing process P30, after the efficiency maintaining process P20, the moisture amount of laundry becomes equal to or less than a certain level, so that the drying efficiency G3 is gradually reduced even under the same condition. One embodiment of the present disclosure may appropriately reduce the output of the driver 300 and the compressor 120 in the efficiency decreasing process P30, and allow the drying of the laundry to be terminated with cooling of the fluid and the air through the efficiency decreasing process P30.

The efficiency decreasing process P30 is a drying process in which the drying efficiency G3 is reduced by the reduction of the moisture amount of the laundry itself, and is a drying process for terminating the drying operation while minimizing the unnecessary power consumption of the driver 300 and the compressor 120 for increasing the reduced drying efficiency G3.

One embodiment of the present disclosure may divide the drying operation of laundry into the efficiency increasing process P10, the efficiency maintaining process P20, and the efficiency decreasing process P30 based on the variation characteristics of the drying efficiency G3, and effectively adjust the drying efficiency G3 while minimizing the unnecessary energy consumption to be suitable for each drying process, thereby effectively improving the energy efficiency.

Referring back to FIGS. 2 and 4, in one embodiment of the present disclosure, the fluid circulator 100 may repeat the endothermic and exothermic processes as the fluid circulates, and the air circulator 200 may further include a humidity sensor 250.

The humidity sensor 250 may measure a humidity of the air passing through drum 20. The humidity measured by the humidity sensor 250 corresponds to an absolute humidity, and the humidity sensor 250 may measure a temperature of the air together with the humidity.

The humidity sensor 250 may be disposed in one of the air introducing portion 220 or the air discharging portion 230 of the air circulator 200. In addition, the humidity sensor 250 may be disposed in each of the air introducing portion 220 and the air discharging portion 230 of the air circulator 200.

That is, in one embodiment of the present disclosure, the humidity sensor 250 may measure a humidity of one of the air flowing into the drum 20 and the air flowing out of the drum 20 or measure the humidity of each of the air flowing into the drum 20 and the air flowing out of the drum 20.

FIGS. 2 and 4 show the state in which the humidity sensor 250 is disposed in each of the air introducing portion 220 and the air discharging portion 230 according to one embodiment of the present disclosure. That is, the humidity sensor 250 includes a first humidity sensor 252 and a second humidity sensor 254. In addition, it is shown that the first humidity sensor 252 is disposed in the air introducing portion 220, and the second humidity sensor 254 is disposed in the air discharging portion 230.

However, the present disclosure is not necessarily limited thereto. The humidity sensor 250 may include one of the first humidity sensor 252 and the second humidity sensor 254. For example, the humidity sensor 250 may be disposed in the air discharging portion 230 to measure the humidity of the air discharged from the drum 20.

The air introducing portion 220 may be located adjacent to the compressor of the fluid circulator 100. Therefore, a measured value G0 of the humidity sensor 250 may be unstable or unreliable by a temperature of the compressor. Accordingly, in one embodiment of the present disclosure, the humidity sensor 250 may be disposed in the air discharging portion 230 to measure the humidity of the air discharged from the drum 20.

Figure 5:
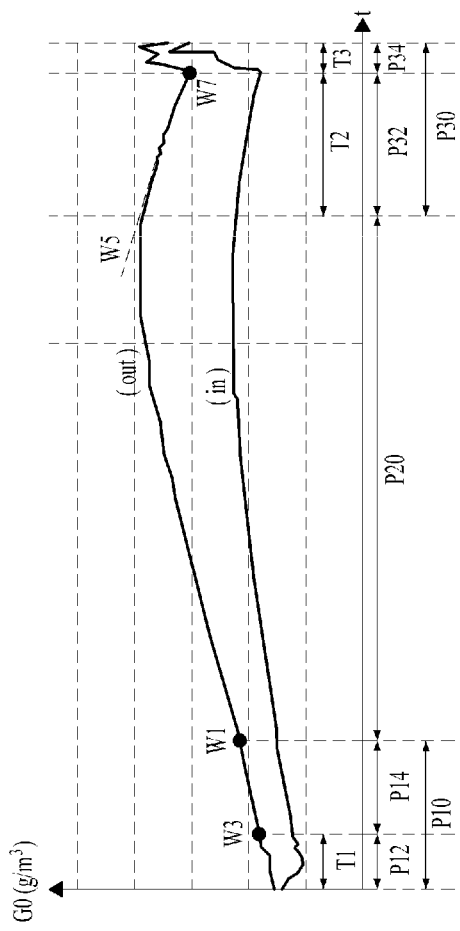
FIG. 5 is a graph showing a measured value of a humidity sensor in a drying operation of laundry in a laundry treating apparatus according to an embodiment of the present disclosure.

In one example, FIG. 5 shows a graph showing a humidity value corresponding to the measured value G0 of the humidity sensor 250 in the drying operation of the laundry according to one embodiment of the present disclosure. In FIG. 5, a horizontal axis represents time, and a vertical axis represents the humidity value G0.

The measured value G0 of the humidity sensor 250 shown in FIG. 5 corresponds to the absolute humidity. A graph marked with 'in' is a measured value of the first humidity sensor 252 that is disposed in the air introducing portion 220 and measures the humidity of the air flowing into the drum 20. A graph marked with 'out' is a measured value of the second humidity sensor 254 that is disposed in the air discharging portion 230 and measures the humidity of the air discharged from the drum 20. A deviation of the 'in' and 'out' graphs in FIG. 5 may eventually correspond to a graph of an evaporation amount of moisture shown in FIG. 6.

In addition, as described above, in one embodiment of the present disclosure, the humidity sensor 250 may be able to measure the temperature of the air, so that a theoretical maximum evaporation amount at a corresponding temperature may be derived.

Thus, when the humidity sensor 250 includes the first humidity sensor 252 and the second humidity sensor 254, the controller 400 may derive a drying efficiency G3 of FIG. 8 from the measured values of the first humidity sensor 252 and the second humidity sensor 254.

In addition, even when the humidity sensor 250 is composed of only one of the first humidity sensor 252 and the second humidity sensor 254, the controller 400 may be able to derive a drying efficiency G3 corresponding to the measured value G0 of the humidity sensor 250 based on the pre-stored graph of the drying efficiency G3.

In one example, in one embodiment of the present disclosure, the controller 400 may perform the drying operation while distinguishing the efficiency increasing process P10, the efficiency maintaining process P20, and the efficiency decreasing process P30 from each other using the measured value G0 of the humidity sensor 250.

As described above, the measured value G0 of the humidity sensor 250 may correspond to a main variable directly related to the drying efficiency G3, and thus, may represent a behavior of the drying efficiency G3 in the drying operation of the laundry.

For example, the drying efficiency G3 may have a specific behavior in the drying operation of the laundry. The drying efficiency G3 at a time point of entering the efficiency maintaining process P20 from the efficiency increasing process P10 or entering the efficiency decreasing process P30 from the efficiency maintaining process P20 may have a characteristic distinguished from that at other time points.

Furthermore, similar to the drying efficiency G3, the measured value G0 of the humidity sensor 250, which is directly related to the drying efficiency G3, may also have a characteristic distinguished from that at other time points at the time point of entering the efficiency maintaining process P20 from the efficiency increasing process P10 or entering the efficiency decreasing process P30 from the efficiency maintaining process P20.

Accordingly, in one embodiment of the present disclosure, the controller 400 may identify switching time points between the efficiency increasing process P10, the efficiency maintaining process P20, and the efficiency decreasing process P30 and distinguish the drying processes from each other using the measured value G0 of the humidity sensor 250.

There may be various schemes using the measured value G0 of the humidity sensor 250. For example, the controller 400 may determine whether the measured value G0 of the humidity sensor 250 corresponds to a specific value corresponding to each entry time point of each drying process, determine whether a change rate of the measured value G0 of the humidity sensor 250 corresponds to a specific change rate corresponding to each entry time point, and derive another index with the measured value G0 of the humidity sensor 250 as a variable and utilize the index value.

For example, as will be described below, the controller 400 may directly derive the drying efficiency G3 from the measured value G0 of the humidity sensor 250, and determine whether the drying efficiency G3 of the corresponding time point corresponds to an efficiency maintaining process entry drying efficiency W2 or an efficiency decreasing process entry drying efficiency W6.

One embodiment of the present disclosure uses the measured value G0 of the humidity sensor 250, thereby accurately and effectively distinguishing the plurality of drying processes constituting the drying operation of the laundry from each other. In addition, because efficient control of the compressor 120, the first driver 310, and the second driver 320 may be performed for each drying process distinguished as described above, the energy efficiency may be effectively improved.

In one example, in one embodiment of the present disclosure, the controller 400 may identify a termination time point of the efficiency increasing process P10 and an entry time point of the efficiency maintaining process P20 using the measured value G0 of the humidity sensor 250 in the efficiency increasing process P10.

Referring to FIGS. 5 and 8, in one embodiment of the present disclosure, as the efficiency increasing process P10 proceeds, the drying efficiency G3 is gradually increased. When the drying efficiency G3 reaches the preset efficiency maintaining process entry drying efficiency W2, the controller 400 may terminate the efficiency increasing process P10 and perform the efficiency maintaining process P20.

The efficiency maintaining process entry drying efficiency W2 may correspond to an efficiency maintaining value of the drying efficiency G3 maintained in the efficiency maintaining process P20 or may be strategically determined to be a value similar thereto.

In one example, the measured value G0 of the humidity sensor 250 increases overall in the efficiency increasing process P10 and in the efficiency maintaining process P20. In the controller 400, a humidity value at the entry time point of the efficiency maintaining process P20 may be preset as the efficiency maintaining process entry humidity sensor value W1.

In this case, when the measured value G0 of the humidity sensor 250 reaches the efficiency maintaining process entry humidity sensor value W1, the controller 400 may terminate the efficiency increasing process P10 and perform the efficiency maintaining process P20 even when the drying efficiency G3 is not derived.

When utilizing the humidity sensor 250 as described above, the drying efficiency G3, which is a direct measure that distinguishes the plurality of drying processes that constitute the drying operation of the laundry from each other, may be directly derived, or the drying processes may be distinguished from each other using the measured value G0 of the humidity sensor 250, which is closely related to the drying efficiency G3, so that entry of each drying process with high accuracy is possible.

Specifically, in one embodiment of the present disclosure, when the measured value G0 of the humidity sensor 250 reaches the preset efficiency maintaining process entry humidity sensor value W1 in the efficiency increasing process P10, the controller 400 may terminate the efficiency increasing process P10 and perform the efficiency maintaining process P20.

As described above, the measured value of the humidity sensor 250 at the time point at which the drying efficiency G3 reaches the efficiency maintaining process entry drying efficiency W2 for entering the efficiency maintaining process P20 may be preset, and the measured value may be stored in advance in the controller 400 as the efficiency maintaining process entry humidity sensor value W1.

In one embodiment of the present disclosure, when the measured value G0 of the humidity sensor 250 reaches the preset efficiency maintaining process entry humidity sensor value W1, the controller 400 may terminate the efficiency increasing process P10 and perform the efficiency maintaining process P20 in the same manner as when the drying efficiency G3 enters the efficiency maintaining process entry drying efficiency W2.

In one example, in one embodiment of the present disclosure, the humidity sensor 250 may include the first humidity sensor 252 that measures the humidity of the air flowing into the drum 20 and the second humidity sensor 254 that measures the humidity of the air flowing out of the drum 20, and the controller 400 may calculate the drying efficiency G3 from the measured values of the first humidity sensor 252 and the second humidity sensor 254, and terminate the efficiency increasing process P10 and perform the efficiency maintaining process P20 when the drying efficiency G3 reaches the preset efficiency maintaining process entry drying efficiency W2.

As described above, the humidity sensor 250 may include the first humidity sensor 252 in the air introducing portion 220 and the second humidity sensor 254 in the air discharging portion 230. In this case, the controller 400 may directly derive the drying efficiency G3 shown in FIG. 8 using the measured values of the first humidity sensor 252 and the second humidity sensor 254.

Accordingly, when the first humidity sensor 252 and the second humidity sensor 254 are disposed, the controller 400 may calculate the drying efficiency G3 from the measured value G0 of the humidity sensor 250 including the first humidity sensor 252 and the second humidity sensor 254, and perform the efficiency maintaining process P20 while terminating the efficiency increasing process P10 when the drying efficiency G3 reaches the preset efficiency maintaining process entry drying efficiency W2.

The efficiency maintaining process entry drying efficiency W2 may be a maximum drying efficiency G3 from which the drying efficiency G3 is no longer able to increase in a corresponding environment, or a value strategically determined to correspond thereto.

In one embodiment of the present disclosure, the direct index for dividing the drying operation of the laundry into the plurality of drying processes corresponds to the drying efficiency G3. Therefore, in one embodiment of the present disclosure, the controller 400 directly derive the drying efficiency G3 to distinguish the efficiency increasing process P10 and the efficiency maintaining process P20 from each other, so that very accurate distinguishment becomes possible.

Figure 9:
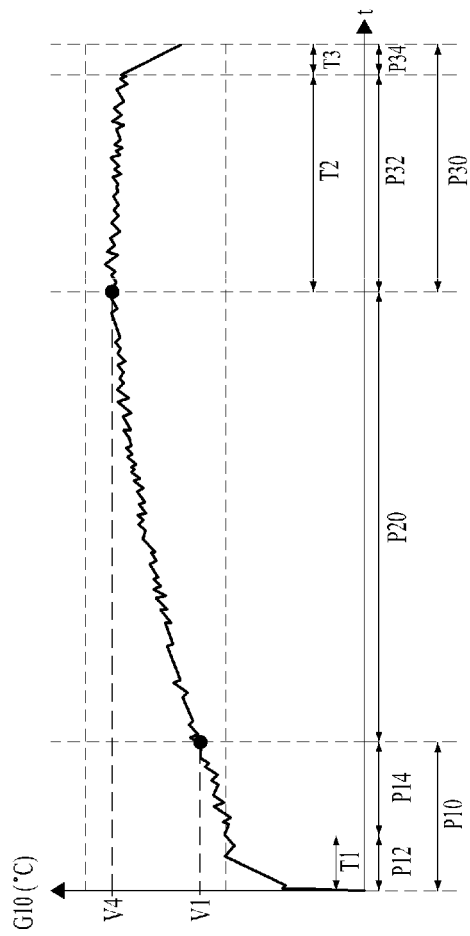
FIG. 9 is a graph showing a measured value of a compressor sensor in a drying operation of laundry in a laundry treating apparatus according to an embodiment of the present disclosure.

In one example, FIG. 9 is a graph showing a measured value G4 of the compressor sensor 150 in the drying operation of the laundry according to an embodiment of the present disclosure. In FIG. 9, a horizontal axis represents time, and a vertical axis represents the temperature of the fluid discharged from the compressor 120 as the measured value G4 of the compressor sensor 150.

In one embodiment of the present disclosure, when the measured value G4 of the compressor sensor 150 reaches the preset efficiency maintaining process entry compressor sensor value V1 in the efficiency increasing process P10, the controller 400 may terminate the efficiency increasing process P10 and perform the efficiency maintaining process P20.

In one embodiment of the present disclosure, even when the humidity sensor 250 has failed or been removed, another measured value that may represent a specific state of the drying efficiency G3 may be used to divide the drying operation of the laundry.

Specifically, an embodiment of the present disclosure may identify the time point for terminating the efficiency increasing process P10 and entering the efficiency maintaining process P20 using the measured value G4 of the compressor sensor 150. For example, one embodiment of the present disclosure may specify the drying efficiency G3 for entering the efficiency maintaining process P20 as the efficiency maintaining process entry drying efficiency W2, and specify the measured value G4 of the compressor sensor 150 as the efficiency maintaining process entry compressor sensor value V1 in the state in which the drying efficiency G3 has reached the efficiency maintaining process entry drying efficiency W2.

That is, in one embodiment of the present disclosure, even when the direct identification of the drying efficiency G3 is omitted, when the measured value G4 of the compressor sensor 150 reaches the preset efficiency maintaining process entry compressor sensor value V1, the controller 400 may properly control the driver 300 and the compressor 120 by entering the efficiency maintaining process P20 while terminating the efficiency increasing process P10.

Referring to FIG. 9, it may be seen that the measured value G4 of the compressor sensor 150 has a relatively linear change in the drying operation process. Therefore, it is advantageous to specify a measured value for identifying a time point for entering the efficiency maintaining process P20 that represents the drying efficiency G3. FIG. 9 shows the efficiency maintaining process entry compressor sensor value V1 according to an embodiment of the present disclosure.

In addition, in the efficiency increasing process P10, the compressor 120 operates at a high frequency as will be described below to increase the temperature of the fluid of the fluid circulator 100 and the temperature of the air of the air circulator 200. Thus, in the efficiency increasing process P10, a discharge temperature of the compressor 120 may become an index preferentially representing the changes in the temperature of the fluid circulator 100 and the air circulator 200.

Therefore, it is advantageous in terms of accuracy to use the measured value G4 of the compressor sensor 150 by replacing the drying efficiency G3 for the time point for the termination of the efficiency increasing process P10 and the entry of the efficiency maintaining process P20.

After all, one embodiment of the present disclosure may utilize the measured value G4 of the compressor sensor 150 disposed to control the fluid circulator 100 even in a situation in which the humidity sensor 250 has failed to identify a condition for the termination of the efficiency increasing process P10 and the entry of the efficiency maintaining process P20 with high reliability.

Figure 11:
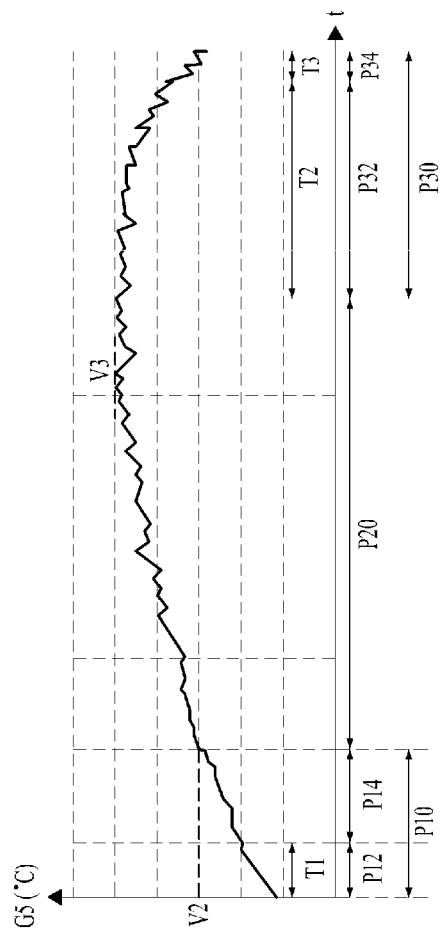
FIG. 11 is a graph showing a measured value of an evaporator sensor in a drying operation of laundry in a laundry treating apparatus according to an embodiment of the present disclosure.

In one example, FIG. 4 schematically shows a location of an evaporator sensor 160 in the laundry treating apparatus 1 according to an embodiment of the present disclosure, and FIG. 11 shows a graph showing a measured value G5 of the evaporator sensor 160 in the drying operation of the laundry. In FIG. 11, a horizontal axis represents time, and a vertical axis represents a temperature of fluid discharged from the evaporator 130 as the measured value G5 of the evaporator sensor 160.

In one embodiment of the present disclosure, the fluid circulator 100 may further include the evaporator sensor 160 for measuring the temperature of the fluid flowing into or out of the evaporator 130. The controller 400 may perform the efficiency maintaining process P20 when the measured value G5 of the evaporator sensor 160 reaches a preset efficiency maintaining process entry evaporator sensor value V2 in the state in which the measured value G4 of the compressor sensor 150 has reached the efficiency maintaining process entry compressor sensor value V1.

The evaporator sensor 160 may be disposed at an inlet or an outlet of the evaporator 130 to measure a temperature of the fluid passing through the evaporator 130. The evaporator sensor 160 may be disposed in the evaporator 130 or disposed on an inflow channel or an outflow channel of the evaporator 130.

The evaporator sensor 160 may be disposed on one of the inflow channel and the outflow channel of the evaporator 130, or may be disposed on each of the inflow channel and the outflow channel of the evaporator 130. The graph shown in FIG. 11 shows the measured value G5 of the evaporator sensor 160 disposed on the outflow channel of the evaporator 130 according to an embodiment of the present disclosure.

In one embodiment of the present disclosure, controller 400 may terminate the efficiency increasing process P10 and perform the efficiency maintaining process P20 when the measured value G5 of the evaporator sensor 160 reaches the efficiency maintaining process entry evaporator sensor value V2 in the state in which the measured value G4 of the compressor sensor 150 has reached the efficiency maintaining process entry compressor sensor value V1. The efficiency maintaining process entry evaporator sensor value V2 may correspond to the measured value G5 of the evaporator sensor 160 when the drying efficiency G3 corresponds to the efficiency maintaining process entry drying efficiency W2.

One embodiment of the present disclosure may set the efficiency maintaining process entry compressor sensor value V1 and the efficiency maintaining process entry evaporator sensor value V2 as entry conditions for the efficiency maintaining process P20 entry to enter the efficiency maintaining process P20, thereby further improving the accuracy by checking whether to enter the efficiency maintaining process P20 multiple times.

Furthermore, when the measured value G4 of the compressor sensor 150 shows an abnormal behavior or a failure of the compressor sensor 150 is identified, instead of determining the measured value G4 of the compressor sensor 150, the controller 400 may determine whether to enter the efficiency maintaining process P20 using the measured value G5 of the evaporator sensor 160, thereby improving a performance stability of the drying operation.

That is, one embodiment of the present disclosure may utilize at least one of the measured value of the humidity sensor 250, the drying efficiency G3, the measured value G4 of the compressor sensor 150, and the measured value G5 of the evaporator sensor 160 in an overlapping or replacing manner to distinguish the plurality of drying processes, thereby greatly improving accuracy and stability.

Figure 12:
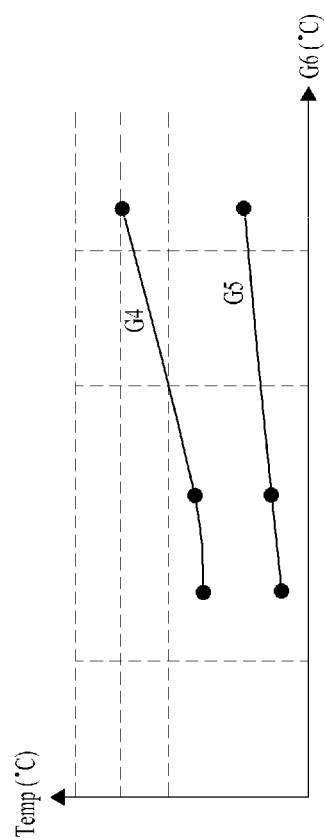
FIG. 12 is a graph showing a change in an efficiency maintaining process entry sensor value based on a change in a temperature of outdoor air in a laundry treating apparatus according to an embodiment of the present disclosure.

In one example, FIG. 2 schematically shows the outdoor air sensor 50 disposed in the laundry treating apparatus 1 according to an embodiment of the present disclosure, and FIG. 12 shows a graph showing the measured value G4 of the compressor sensor 150 and the measured value G5 of the evaporator sensor 160 corrected based on a change in a temperature of the outdoor air according to an embodiment of the present disclosure.

In FIG. 12, a horizontal axis represents the outdoor air temperature as the measured value G6 of the outdoor air sensor 50, and a vertical axis corresponds to correction values for the measured value G4 of the compressor sensor 150 and the measured value G5 of the evaporator sensor 160.

When referring to FIGS. 2 and 12, one embodiment of the present disclosure may further include an outdoor air sensor 50 for measuring a temperature of the air outside the cabinet 10, and the controller 400 may correct the efficiency maintaining process entry compressor sensor value V1 and the efficiency maintaining process entry evaporator sensor value V2 to higher values as a measured value G6 of the outdoor air sensor 50 is higher.

The outdoor air sensor 50 may measure the temperature of the air outside cabinet 10. The outdoor air sensor 50 may be disposed such that at least a portion thereof is exposed to the outside of the cabinet 10 or may be disposed inside the cabinet 10.

Changes in the outdoor air may affect a fluid density, an operating condition of the fluid circulator 100, the theoretical maximum evaporation amount that is the variable of the drying efficiency G3, and the like. Therefore, when the above-mentioned efficiency maintaining process entry compressor sensor value V1 and efficiency maintaining process entry evaporator sensor value V2 are corrected based on the outdoor air condition, it becomes possible to more accurately determine the entry time point of the efficiency maintaining process P20.

In one example, in FIG. 12, a horizontal axis corresponds to the measured value G6 of the outdoor air sensor 50, and a vertical axis corresponds to a temperature value. The measured value G4 of the compressor sensor 150 shown in FIG. 12 corresponds to the above-described efficiency maintaining process entry compressor sensor value V1, and the measured value G5 of the evaporator sensor 160 corresponds to the aforementioned efficiency maintaining process entry evaporator sensor value V2.

Referring to FIG. 12, an embodiment of the present disclosure may correct the efficiency maintaining process entry compressor sensor value V1 and the efficiency maintaining process entry evaporator sensor value V2 to the higher values as the temperature of the outdoor air increases.

The increase in the outdoor air temperature may increase the aforementioned theoretical maximum evaporation amount inside the drum 20, and thus the drying efficiency G3 may be lowered. Accordingly, in order for the drying efficiency G3 to reach the preset efficiency maintaining process entry drying efficiency W2, it is necessary to correct the efficiency maintaining process entry compressor sensor value V1 and the efficiency maintaining process entry evaporator sensor value V2 to the higher values.

One embodiment of the present disclosure may effectively determine the entry time point of each drying process without adding the sensor using the measured value G4 of the compressor sensor 150 or the measured value G5 of the evaporator sensor 160 that may represent the specific value or the specific range of the drying efficiency G3, and may determine the highly reliable entry time point of the efficiency maintaining process P20 or the entry time point of the efficiency decreasing process P30 despite the changes in the outdoor air using the outdoor air sensor 50. Furthermore, the measured value G0 of the humidity sensor 250, that is, the efficiency maintaining process entry humidity sensor value W1 or the like may be corrected using the measured value G6 of the outdoor air sensor 50.

Referring back to FIG. 8, in one embodiment of the present disclosure, the drying operation of the laundry may include a first efficiency increasing process P12 and a second efficiency increasing process P14. That is, the efficiency increasing section may include the first efficiency increasing process P12 and the second efficiency increasing process P14 performed after termination of the first efficiency increasing process P12.

The controller 400 may control the driver 300 and the fluid circulator 100, for example, the compressor 120, such that an increase rate of the drying efficiency G3 is higher in the first efficiency increasing process P12 than in the second efficiency increasing process P14.

Specifically, an embodiment of the present disclosure may divide the efficiency increasing process P10 into the first efficiency increasing process P12 and the second efficiency increasing process P14, rapidly increase the fluid temperature of the fluid circulator 100 in the first efficiency increasing process P12, and stabilize the operating states of the fluid circulator 100 and the air circulator 200 in the second efficiency increasing process P14 to allow the drying efficiency G3 to stably reach the efficiency maintaining process entry drying efficiency W2.

Referring to FIG. 8, it may be seen that the increase rate of the drying efficiency G3 is higher in the first efficiency increasing process P12 than in the second efficiency increasing process P14. It may be seen that the drying efficiency G3 gradually reaches the efficiency maintaining process entry drying efficiency W2 while showing a relatively low increase rate in the second efficiency increasing process P14.

The efficiency increasing process P10 increases the drying efficiency G3 rapidly so as to shorten the delay time to the entry time point of the efficiency maintaining process P20 and further shorten an overall drying operation time. However, when the second efficiency increasing process P14 is omitted and the drying efficiency G3 is rapidly increased before the entry of the efficiency maintaining process P20, after entering the efficiency maintaining process P20, sudden changes in the operating states of the driver 300 and the compressor 120 may cause instability of circulation cycles of the fluid circulator 100 and the air circulator 200.

Accordingly, unstable fluctuations in the drying efficiency G3 may occur during the entry of the efficiency maintaining process P20, which may worsen a drying effect of the laundry throughout the efficiency maintaining process P20.

Therefore, one embodiment of the present disclosure may efficiently secure an overall performance stability of the laundry drying operation as the controller 400 performs the second efficiency increasing process P14 that may stabilize the fluid circulator 100 and the air circulator 200 with an increase in the drying efficiency G3 more gentle than in the first efficiency increasing process P12 after performing the first efficiency increasing process P12 for the rapid increase of the drying efficiency G3.

The controller 400 controls the driver 300 and the fluid circulator 100 in various schemes to perform the drying operation while allowing the increase rate of the drying efficiency G3 in the second efficiency increasing process P14 to be lower than the increase rate of the drying efficiency G3 in the first efficiency increasing process P12.

For example, as will be described later, the controller 400 may control the driver 300 such that a RPM G8 of the fan 210 is higher in the second efficiency increasing process P14 than the first efficiency increasing process P12 while maintaining a frequency G9 of the compressor 120.

The RPM G8 of the fan 210 in the efficiency maintaining process P20 may be higher than the RPM G8 of the fan 210 in the efficiency increasing process P10. Therefore, the RPM G8 of the fan 210 in the second efficiency increasing process P14, which has a higher value than in the first efficiency increasing process P12, may reduce an increase rate of the fluid temperature of the fluid circulator 100 and ultimately reduce the increase rate of the drying efficiency G3. In addition, the RPM G8 of the fan 210 in the second efficiency increasing process P14 may have a value relatively close to the RPM G8 of the fan 210 in the efficiency maintaining process P20, thereby contributing to the stabilization of the drying operation.

In one example, in one embodiment of the present disclosure, the controller 400 may perform the second efficiency increasing process P14 after performing the first efficiency increasing process P12 for a preset first efficiency increasing process execution time T1.

That is, when the first efficiency increasing process execution time T1 is preset and the drying operation of the laundry is in progress, the controller 400 may enter the second efficiency increasing process P14 after performing the first efficiency increasing process P12 for the first efficiency increasing process execution time T1.

In the first efficiency increasing process P12, as the fluid circulator 100 and the air circulator 200 in an operation stop state are operated to rapidly increase the drying efficiency G3, accidental fluctuations of the compressor sensor 150 or the evaporator sensor 160 may occur. Therefore, one embodiment of the present disclosure may perform the first efficiency increasing process P12 for a predetermined time to promote the overall operation stabilization of the laundry treating apparatus 1 and effectively perform the first efficiency increasing process P12.

However, when necessary, a drying efficiency G3 of the second efficiency increasing process P14 for entering the second efficiency increasing process P14 may be determined, and the measured value G4 of the compressor sensor 150 or the measured value G5 of the evaporator sensor 160 corresponding to the drying efficiency G3 of the second efficiency increasing process P14 may be used.

Specifically, in one embodiment of the present disclosure, when the measured value G0 of the humidity sensor 250 reaches the preset second efficiency increasing process entry humidity sensor value W3, the controller 400 may terminate the first efficiency increasing process and perform the second efficiency increasing process. FIG. 5 shows the second efficiency increasing process entry humidity sensor value W3 according to an embodiment of the present disclosure.

In one embodiment of the present disclosure, a second efficiency increasing process entry drying efficiency W4 preset for the termination of the first efficiency increasing process and the entry of the second efficiency increasing process may be determined, When the drying efficiency G3 is the second efficiency increasing process entry drying efficiency W4, the measured value G0 of the humidity sensor 250 may be determined as the second efficiency increasing process entry humidity sensor value W3.

In this case, when the measured value G0 of the humidity sensor 250 reaches the preset second efficiency increasing process entry humidity sensor value W3, the controller 400 may perform the second efficiency increasing process P14 while terminating the first efficiency increasing process P12. The utilization of the humidity sensor 250 may be performed by distinguishing the first efficiency increasing process and the second efficiency increasing process from each other more accurately than in the performance of the first efficiency increasing process by utilizing the predetermined first efficiency increasing process execution time T1.

In one example, in one embodiment of the present disclosure, the humidity sensor 250 may include the first humidity sensor 252 and the second humidity sensor 254. The controller 400 may calculate the drying efficiency G3 from the measured values of the first humidity sensor 252 and the second humidity sensor 254, and may terminate the first efficiency increasing process P12 and perform the second efficiency increasing process P14 when the drying efficiency G3 reaches the preset second efficiency increasing process entry drying efficiency W4.

FIG. 8 shows the second efficiency increasing process entry drying efficiency W4 preset for the entry of the second efficiency increasing process P14 according to an embodiment of the present disclosure.

As described above, the humidity sensor 250 may include the first humidity sensor 252 and the second humidity sensor 254. In this case, the controller 400 may derive the drying efficiency G3 from the measured value G0 of the humidity sensor 250. Therefore, when the drying efficiency G3 derived from the measured value G0 of the humidity sensor 250 reaches the second efficiency increasing process entry drying efficiency W4, the controller 400 may terminate the first efficiency increasing process P12 and perform the second efficiency increasing process P14.

The direct derivation of the drying efficiency G3 and the utilization of the drying efficiency G3 for the entry of the second efficiency increasing process P14 may have very high reliability as the drying efficiency G3, which is the direct index for distinguishing the first efficiency increasing process P12 and the second efficiency increasing process P14 from each other is used.

In one example, in one embodiment of the present disclosure, in the first efficiency increasing process P12, an increase rate of the measured value G4 of the compressor sensor 150 may be greater than in the second efficiency increasing process P14. That is, controller 400 may control the driver 300 and the compressor 120 such that the increase rate of the measured value G4 of the compressor sensor 150 in the first efficiency increasing process P12 is greater than the increase rate of the measured value G4 of the compressor sensor 150 in the second efficiency increasing process P14.

FIG. 9 shows the measured value G4 of the compressor sensor 150 in the first efficiency increasing process P12 and the second efficiency increasing process P14. The increase rate of the measured value may be an increase rate at a corresponding time point, or may correspond to an average increase rate of each drying process. The average increase rate may be derived from a difference between a measured value at the time of entry and a measured value at the time of termination of each drying process.

That is, in one embodiment of the present disclosure, a total increase amount of the measured value G4 of the compressor sensor 150 through the first efficiency increasing process P12 may be greater than a total increase amount of the measured value G4 of the compressor sensor 150 through the second efficiency increasing process P14.

The controller 400 may control the driver 300 and the compressor 120 to allow the increase rate of the measured value G4 of the compressor sensor 150 in the first efficiency increasing process P12 is greater than in the second efficiency increasing process P14. However, it does not necessarily mean that the frequency G9 of the compressor 120 in the first efficiency increasing process P12 is greater than in the second efficiency increasing process P14.

For example, one embodiment of the present disclosure may change the RPM G8 of the fan 210 while maintaining the frequency G9 of the compressor 120 constant to allow the increase rate of the measured value G4 of the compressor sensor 150 in the first efficiency increasing process P12 to be greater than in the second efficiency increasing process P14.

In one example, in one embodiment of the present disclosure, the drying operation may further include the efficiency decreasing process P30 that is performed after the efficiency maintaining process P20 as described above. The controller 400 may control the driver 300 and the compressor 120 such that the drying efficiency G3 in the efficiency decreasing process P30 is lower than in the efficiency maintaining process P20.

For example, the controller 400 may reduce at least one of the RPM of the driver 300 or the frequency G9 of the compressor 120 in at least a portion of the efficiency decreasing process P30 to allow the drying efficiency G3 of the efficiency decreasing process P30 to be lower than in the efficiency maintaining process P20.

In one example, in one embodiment of the present disclosure, the controller 400 may identify the termination time point of the efficiency maintaining process P20 and the entry time point of the efficiency decreasing process P30 using the measured value G0 of the humidity sensor 250.

For example, the controller 400 may determine whether the measured value G0 of the humidity sensor 250 corresponds to a preset value of the humidity sensor 250 for the efficiency decreasing process entry, and may determine whether the drying efficiency G3 calculated from the humidity sensor 250 corresponds to the preset efficiency decreasing process entry drying efficiency W6.

The scheme using the measured value G0 of the humidity sensor 250 may vary as needed, and thus the characteristics of the humidity sensor 250 may also be varied. One embodiment of the present disclosure may effectively identify the termination time point of the efficiency increasing process P10 and the entry time point of the efficiency decreasing process P30 using the measured value of the humidity sensor 250, which is the direct index for the derivation of the drying efficiency G3.

In one example, in one embodiment of the present disclosure, when a change rate of the measured value G0 of the humidity sensor 250 reaches a preset efficiency decreasing process entry humidity change rate W5, the controller 400 may terminate the efficiency maintaining process P20 and perform the efficiency decreasing process P30. FIG. 5 shows the efficiency decreasing process entry humidity change rate W5 preset according to an embodiment of the present disclosure.

Specifically, when the moisture amount of the laundry becomes equal to or below a certain level, the drying efficiency G3 becomes naturally reduced even in the same condition. The present disclosure may properly control the driver 300 and the fluid circulator 100 by distinguishing such reduction process of the drying efficiency G3 as the efficiency decreasing process P30.

As above, in the efficiency decreasing process P30, because the moisture evaporation amount of the laundry decreases, the measured value G0 of the humidity sensor 250 shown in FIG. 5 also gradually decreases. Therefore, the change rate of measured value G0 of the humidity sensor 250 may become an index representing the entry time point of the efficiency decreasing process P30.

The efficiency decreasing process entry humidity change rate W5 may be set variously as needed. In FIG. 5, the efficiency decreasing process entry humidity change rate W5 is marked on the measured value of the humidity sensor 250 of the air discharged from the drum 20. The efficiency decreasing process entry humidity change rate W5 is marked to have a negative value.

However, such efficiency decreasing process entry humidity change rate W5 may have not only the negative value, but also 0 or a positive value, which may be strategically variously determined as needed. When using the humidity change rate, it becomes possible to more accurately identify the entry time point of the efficiency decreasing process P30.

In one example, the humidity sensor 250 may include the first humidity sensor 252 and the second humidity sensor 254. The controller 400 may calculate the drying efficiency G3 from the measured values of the first humidity sensor 252 and the second humidity sensor 254, and terminate the efficiency maintaining process P20 and perform the efficiency decreasing process P30 when the drying efficiency G3 reaches the preset efficiency decreasing process entry drying efficiency W6.

In this case, as the drying efficiency G3, which is a criterion for distinguishing the efficiency maintaining process P20 and the efficiency decreasing process P30 from each other, is directly calculated, the controller 400 may clearly identify the entry time point of the efficiency decreasing process P30, which is advantageous. FIG. 8 shows the efficiency decreasing process entry drying efficiency W6 corresponding to the entry condition of the efficiency decreasing process P30 according to an embodiment of the present disclosure.

In one example, in one embodiment of the present disclosure, when the change rate of the measured value G5 of the evaporator sensor 160 reaches a preset efficiency decreasing process entry change rate V3, the controller 400 may terminate the efficiency maintaining process P20 and perform the efficiency decreasing process P30. FIG. 11 shows a graph marked with the efficiency decreasing process entry change rate V3.

When the moisture amount of the laundry becomes equal to or less than a certain amount in the efficiency maintaining process P20, the humidity amount of the air discharged from drum 20 starts to decrease. Accordingly, the amount of water condensed in the evaporator 130 also decreases. In addition, as the humidity amount decreases, an amount of heat absorption of the fluid inside the evaporator 130 that absorbs heat through the condensation process of water also decreases, resulting in a decrease in temperature.

That is, a time point at which a change rate of the temperature of the fluid discharged from the evaporator 130 measured by the evaporator sensor 160 has a negative value or the measured value G5 of the evaporator sensor 160 at the corresponding time point may represent the entry time point of the decreasing efficiency section where the drying efficiency G3 is decreased as the drying of the laundry proceeds over a certain level.

The temperature of the fluid passing through the evaporator 130 may be varied by various factors. However, in the efficiency decreasing process P30, the increase and decrease in the fluid temperature of the evaporator 130 relatively faithfully reflect the change in the humidity amount. Thus, in one embodiment of the present disclosure, when the change rate of the measured value G5 of the evaporator sensor 160 reaches the preset efficiency decreasing process entry change rate V3, the efficiency decreasing process P30 by the controller 400 may be performed.

However, the efficiency decreasing process entry change rate V3 is not necessarily limited to the negative value. Even 0 or a positive value close to 0 of a slope of the graph of the measured value G5 of the evaporator sensor 160 may be determined as the efficiency decreasing process entry change rate V3 as needed.

In addition, referring to FIG. 11, the instantaneous change of the measured value G5 of the evaporator sensor 160 may occur by various causes. Accordingly, the graph of the measured value G5 of the evaporator sensor 160 microscopically includes noise. One embodiment of the present disclosure may remove the noise with various schemes and identify the change rate of the measured value G5 of the evaporator sensor 160.

For example, in one embodiment of the present disclosure, the controller 400 may derive an average value for each unit section for the measured value G5 of the evaporator sensor 160, and may determine whether the change rate of the average value corresponds to the efficiency decreasing process entry change rate V3.

Such an average scheme may be advantageous in removing meaningless variation measured in the measured value G5 of the evaporator sensor 160 and deriving substantially meaningful measured value and change rate.

In one example, in the efficiency decreasing process P30, the temperature reduction of the fluid circulator 100 is from the evaporator 130. Thus, one embodiment of the present disclosure may determine the efficiency decreasing process P30 with excellent reliability using the change rate of the measured value G5 of the evaporator sensor 160 representing the temperature change in the efficiency decreasing process P30 by replacing the drying efficiency G3.

In one example, in one embodiment of the present disclosure, the controller 400 may terminate the efficiency maintaining process P20 and perform the efficiency decreasing process P30 when the measured value G4 of the compressor sensor 150 reaches a preset efficiency decreasing process entry compressor sensor value V4. FIG. 9 shows a graph marked with the efficiency decreasing process entry compressor sensor value V4.

In the fluid circulator 100, as the fluid circulates through the evaporator 130 and the compressor 120, the measured value G4 of the compressor sensor 150 may exhibit a similar behavior to the measured value G5 of the evaporator sensor 160. For example, as shown in FIG. 9, the measured value G4 of the compressor sensor 150 exhibits a decreasing behavior when entering the efficiency decreasing process P30.

Therefore, the measured value G4 of the compressor sensor 150 becomes to have a specific value at the entry time point of the efficiency decreasing process P30. One embodiment of the present disclosure may set the measured value G4 of the compressor sensor 150 at the entry time point of the efficiency decreasing process P30 to the efficiency decreasing process entry compressor sensor value V4.

In one example, in one embodiment of the present disclosure, the drum 20 is provided with an electrode sensor 25 for measuring the moisture amount in contact with the laundry. The controller 400 may terminate the efficiency maintaining process P20 and perform the efficiency decreasing process P30 when the measured value G10 of the electrode sensor 25 reaches a preset efficiency decreasing process entry electrode sensor value V5.

That is, one embodiment of the present disclosure includes the drum 20 rotatably disposed inside the cabinet 10 and including the electrode sensor 25 for measuring the moisture amount of the laundry accommodated therein, and the fluid circulator 100 including the condenser 110, the compressor 120, and the evaporator 130 along which the fluid circulates. The drying operation includes the efficiency maintaining process P20 for maintaining the drying efficiency G3 inside the drum 20 and the efficiency decreasing process P30 for decreasing the drying efficiency G3. The controller 400 may terminate the efficiency maintaining process P20 and perform the efficiency decreasing process P30 when the measured value G10 of the electrode sensor 25 reaches the preset efficiency decreasing process entry electrode sensor value V5.

Specifically, the electrode sensor 25 may be disposed in the drum 20 as shown in FIGS. 2 and 3 to measure the moisture amount of the laundry accommodated inside the drum 20. For example, the electrode sensor 25 may include a pair of electrodes, and may measure the moisture amount of the laundry by analyzing conduction characteristics occurred in the pair of electrodes when in contact with the laundry.

Figure 10:
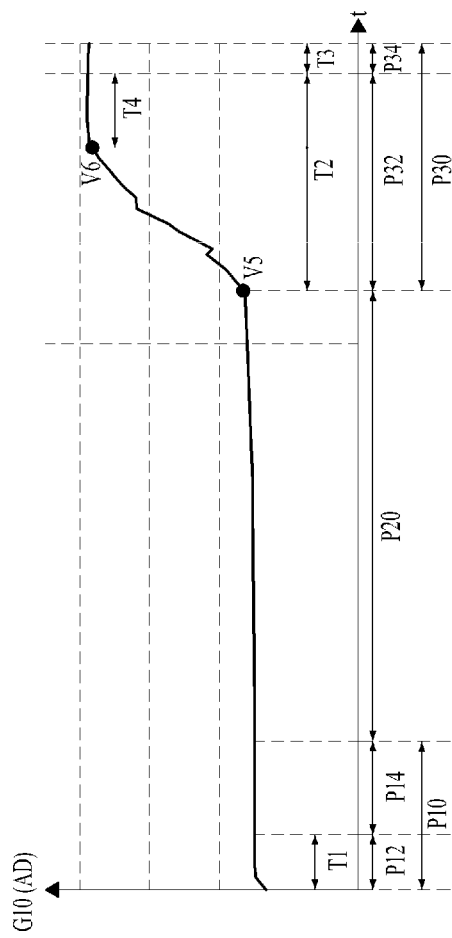
FIG. 10 is a graph showing a measured value of an electrode sensor in a drying operation of laundry in a laundry treating apparatus according to an embodiment of the present disclosure.

FIG. 10 shows a graph indicating a measured value G10 of the electrode sensor 25 in the drying operation of the laundry in one embodiment of the present disclosure. In FIG. 10, a horizontal axis represents time, and a vertical axis is the measured value G10 of the electrode sensor 25 and is related to the moisture amount of the laundry. The measured value G10 of the electrode sensor 25 may correspond to a resistance value measured in a state in which current flows in the presence of moisture.

For example, the lower the measured value G10 of the electrode sensor 25 in FIG. 10, the higher the moisture amount of the laundry, and the higher the measured value G10 of the electrode sensor 25, the lower the moisture amount of the laundry.

The measured value G10 of the electrode sensor 25 shows slight fluctuations when the moisture amount of the laundry is equal to or greater than a certain amount, and shows an increasing behavior as the moisture amount of the laundry becomes less than the certain amount.

In one embodiment of the present disclosure, a time point at which the measured value G10 of the electrode sensor 25 increases is similar to the time point at which the change rate of the measured value G5 of the evaporator sensor 160 corresponds to the efficiency decreasing process entry change rate V3. Therefore, one embodiment of the present disclosure may determine that the efficiency decreasing process P30 is started when the measured value G10 of electrode sensor 25 increases and reaches the efficiency decreasing process entry drying efficiency G3 or the efficiency decreasing process entry electrode sensor value V5 representing the efficiency decreasing process entry change rate V3.

One embodiment of the present disclosure may determine the efficiency decreasing process P30 and control the driver 300, the compressor 120, and the like by utilizing the electrode sensor 25 and the temperature sensor that may be commonly used for the operation of the laundry treating apparatus 1, thereby effectively improving the energy efficiency.

As such, one embodiment of the present disclosure may utilize at least one of the measured value G0 of the humidity sensor 250, the drying efficiency G3, the measured value G4 of the compressor sensor 150, the measured value G5 of the evaporator sensor 160, and the measured value G10 of the electrode sensor 25 in an overlapping or replacing manner, thereby effectively entering the efficiency decreasing process P30 in various situations.

In one example, an embodiment of the present disclosure may utilize the measured values of the different sensors together to more reliably determine the entry time point of the efficiency decreasing process P30.

Specifically, in one embodiment of the present disclosure, when the change rate of the measured value G5 of the evaporator sensor 160 reaches the preset efficiency decreasing process entry change rate V3 or the measured value G4 of the compressor sensor 150 reaches the preset efficiency decreasing process entry compressor sensor value V4 in the state in which the measured value G10 of the electrode sensor 25 has reached the efficiency decreasing process entry electrode sensor value V5, the controller 400 may terminate the efficiency maintaining process P20 and perform the efficiency decreasing process P30.

As such, one embodiment of the present disclosure may determine the entry time point of the efficiency decreasing process P30 using the measured values measured by the plurality of sensors in multiple ways, thereby improving accuracy and stably determining the efficiency decreasing process P30.

In one example, in one embodiment of the present disclosure, the drying operation may include a laundry amount determination process P11 in which the controller 400 controls the driver 300 to rotate the drum 20 and determines the amount of laundry inside the drum 20.

The laundry amount determination process P11 is a process for determining the amount of laundry accommodated inside drum 20. The controller 400 may control the driver 300 to determine the amount of laundry inside the drum 20 while rotating the drum 20 in a preset pattern.

For example, the driver 300 may rotate the drum 20 at a preset RPM in one direction and the other direction, and the controller 400 may determine the amount of laundry by identifying a back electromotive force and the like of the driver 300 generated during the rotation and stop processes of the drum 20.

The amount of laundry identified through laundry amount determination process P11 may be used in various schemes. Specifically, the controller 400 may perform the efficiency decreasing process P30 when the measured value G10 of the electrode sensor 25 reaches the efficiency decreasing process entry electrode sensor value V5 in a case in which the amount of laundry is equal to or greater than a preset small amount reference value.

The electrode sensor 25 may be disposed on the drum 20 to measure the moisture amount of laundry in contact with the laundry, and may be located in a region of an inner face of the drum 20. For example, the electrode sensor 25 may be disposed adjacent to a front portion of the drum 20, that is, the open face of the drum 20.

When the drum 20 is rotated in the drying operation, the laundry tends to be moved to be distributed to one side of the drum 20. In general, when the drum 20 rotates, the laundry may have a tendency to move toward the front portion of the drum 20, that is, the open face of the drum 20.

Based on such movement tendency of the laundry, the electrode sensor 25 may be disposed adjacent to the open face of the drum 20 to induce contact with the laundry. However, when the amount of laundry is equal to or less than a certain level, the contact between the contact sensor and the laundry may not be made or may be unstable despite the movement tendency of the laundry.

Accordingly, one embodiment of the present disclosure sets an amount of laundry with which the measured value G10 of the electrode sensor 25 loses reliability by a poor contact relationship between the electrode sensor 25 and the laundry in advance as the small amount reference value. The measured value G10 of the electrode sensor 25 shown in FIG. 10 is a value measured with the amount of laundry equal to or greater than the small amount reference value.

The small amount reference value may be set by identifying a change in the behavior of the measured value G10 of the electrode sensor 25 based on the amount of laundry. For example, when a maximum amount of laundry accommodated inside drum 20 is determined to be 16 KG by design, a 3 KG load may be set as the small amount reference value when the measured value G10 of the electrode sensor 25 is not able to correspond to the change in the moisture amount of laundry with the amount of laundry equal to or less than 3 KG. However, there may be various specific values for the maximum amount of laundry or the small amount reference value.

One embodiment of the present disclosure may determine the entry time point of the efficiency decreasing process P30 using the measured value G10 of the electrode sensor 25 in the state in which the controller 400 has identified that the amount of laundry is equal to or greater than the small amount reference value, thereby effectively improving reliability of determination of conditions for entering the efficiency decreasing process P30 using the electrode sensor 25.

In one example, in one embodiment of the present disclosure, when the amount of laundry is less than the small amount reference value, the controller 400 may terminate the efficiency maintaining process P20 and perform the efficiency decreasing process P30 when the change rate of the measured value G5 of the evaporator sensor 160 reaches the preset efficiency decreasing process entry change rate V3 or the measured value G4 of the compressor sensor 150 reaches the preset efficiency decreasing process entry compressor sensor value V4.

As described above, when the amount of laundry is less than the small amount reference value, determining the entry time point of the efficiency decreasing process P30 using the measured value G10 of the electrode sensor 25 may have low reliability and efficiency. Therefore, one embodiment of the present disclosure may determine the entry time point of the efficiency decreasing process P30 using the measured value G5 of the evaporator sensor 160 or the measured value G4 of the compressor sensor 150 when the amount of laundry is less than the small amount reference value.

In one example, in one embodiment of the present disclosure, the efficiency decreasing process P30 may include a first efficiency decreasing process P32 and a second efficiency decreasing process P34 performed after termination of the first efficiency decreasing process P32. The controller 400 may control the driver 300 and the compressor 120 such that a reduction rate of the drying efficiency G3 in the first efficiency decreasing process P32 is lower than in the second efficiency decreasing process P34.

FIG. 8 shows the first efficiency decreasing process P32 and the second efficiency decreasing process P34, and shows that the reduction rate of the drying efficiency G3 in the first efficiency decreasing process P32 is lower than the reduction rate of the drying efficiency G3 in the second efficiency decreasing process P34.

Unlike the efficiency maintaining process P20, the efficiency decreasing process P30 is a drying process in which the drying efficiency G3 is naturally reduced as the moisture amount of laundry becomes equal to or less than a certain level. Therefore, the efficiency decreasing process P30 may correspond to the latter part of the drying process of the laundry, and may mean that the drying of the laundry has progressed over a certain level.

However, referring to FIG. 7, even when the efficiency decreasing process P30 is started, the moisture of laundry still exists, so that it is necessary to continue the drying operation. Therefore, even when there is the reduction in the drying efficiency G3, it is necessary to continuously remove the moisture from the laundry by continuing the drying.

In one embodiment of the present disclosure, the efficiency decreasing process P30 may include the first efficiency decreasing process P32 in which the drying efficiency G3 is gradually reduced and the drying of the laundry proceeds over a certain level, and the second efficiency decreasing process P34 that prepares the operation termination of the fluid circulator, the air circulator 200, and the like and performs a cooling process after the first efficiency decreasing process P32.

One embodiment of the present disclosure may perform the first efficiency decreasing process P32 in which the drying of the laundry proceeds such that the drying operation of the laundry may be completely performed even in the efficiency decreasing process P30, and perform the second efficiency decreasing process P34 in which the cooling process of the air and the fluid and the preparation process for the operation termination of each driving apparatus are performed after the first efficiency decreasing process P32, thereby performing the efficient drying operation based on the change in the drying efficiency G3.

The controller 400 may control the driver 300, the compressor 120, and the like to perform the first efficiency decreasing process P32 and the second efficiency decreasing process P34. Strategies for controlling the driver 300, the compressor 120, and the like in the first efficiency decreasing process P32 and in the second efficiency decreasing process P34 may be various.

For example, the controller 400 may allow the output of the driver 300 and the compressor 120 to be lower in the first efficiency decreasing process P32 than in the efficiency maintaining process P20, and allow the output of the driver 300 and the compressor 120 to be lower in the second efficiency decreasing process P34 than in the first efficiency decreasing process P32 or terminate the output of the driver 300 and the compressor 120. Accordingly, the controller 400 may control the driver 300, the compressor 120, and the like such that the reduction rate of the drying efficiency G3 is lower in the second efficiency decreasing process P34 than the reduction rate of the drying efficiency G3 in the first efficiency decreasing process P32.

In one example, in one embodiment of the present disclosure, the controller 400 may determine a termination time point of the first efficiency decreasing process P32 and an entry time point of the second efficiency decreasing process P34 using the measured value G0 of the humidity sensor 250.

For example, in one embodiment of the present disclosure, when the measured value G0 of the humidity sensor 250 reaches a preset second efficiency decreasing process entry humidity sensor value W7 in the first efficiency decreasing process P32, the controller 400 may terminate the first efficiency decreasing process P32 and perform the second efficiency decreasing process P34. FIG. 5 shows the second efficiency decreasing process entry humidity sensor value W7 preset according to an embodiment of the present disclosure.

In the first efficiency decreasing process P32, the measured value G0 of the humidity sensor 250 is continuously decreased as shown in FIG. 5 by the reduction of the evaporation amount of the moisture of the laundry and control strategies of the driver 300 and the fluid circulator 400. Accordingly, the measured value G0 of the humidity sensor 250 may become an index representing the entry time point of the second efficiency decreasing process P34.

The second efficiency decreasing process entry humidity sensor value W7 may be set variously as needed. FIG. 5 shows the second efficiency decreasing process entry humidity sensor value W7 marked on the measured value of the humidity sensor 250 of the air discharged from the drum 20.

In one example, the humidity sensor 250 may include the first humidity sensor 252 and the second humidity sensor 254, and the controller 400 may calculate the drying efficiency G3 from the measured values of the first humidity sensor 252 and the second humidity sensor 254, and terminate the first efficiency decreasing process P32 and perform the second efficiency decreasing process P34 when the drying efficiency G3 reaches a preset second efficiency decreasing process entry drying efficiency W8.

In this case, as the drying efficiency G3, which is a criterion for distinguishing the first efficiency decreasing process P32 and the second efficiency decreasing process P34 from each other, is directly calculated, the controller 400 may clearly identify the entry time point of the second efficiency decreasing process P34, which is advantageous. FIG. 8 shows the second efficiency decreasing process entry drying efficiency W8 corresponding to the entry condition of the second efficiency decreasing process P34 according to an embodiment of the present disclosure.

In one example, in one embodiment of the present disclosure, when the measured value G10 of the electrode sensor 25 in the first efficiency decreasing process P32 corresponds to a preset second efficiency decreasing process entry electrode sensor value V6 during a preset observation time T4, the controller 400 may terminate the first efficiency decreasing process P32 and perform the second efficiency decreasing process P34. FIG. 10 shows a graph of the measured value G10 of the electrode sensor 25 in which the second efficiency decreasing process entry electrode sensor value V6 and the observation time T4 are indicated.

In one embodiment of the present disclosure, the entry of the second efficiency decreasing process P34 may be performed using the electrode sensor 25. Because the electrode sensor 25 measures the amount of moisture remaining in the laundry, it is advantageous in determining the termination time point of the first efficiency decreasing process P32 at which the drying of the laundry is substantially completed.

For example, a drying efficiency G3 in a state in which the moisture of the laundry is sufficiently removed to terminate the drying may be set as the second efficiency decreasing process entry drying efficiency W8, and a time point at which a current drying efficiency G3 reaches the second efficiency decreasing process entry drying efficiency W8 may be identified by determining the graph of the measured value G10 of the electrode sensor 25.

In one example, as shown in FIG. 10, in electrode sensor 25, it is difficult to measure the fluctuation in the resistance value in a state in which the moisture amount of laundry is too large, so that the measured value G10 appears substantially constant. Even in a state in which the moisture amount of laundry is too small, it is difficult to measure the fluctuation in the resistance value, so that the measured value G10 of the electrode sensor 25 appears substantially constant.

Considering such characteristics of the electrode sensor 25, when the drying efficiency G3 is reduced to be equal to or below a certain level in the efficiency decreasing process P30, the measured value G10 of the electrode sensor 25 does not show the fluctuation enough to distinguish the second efficiency decreasing process P34. Thus, one embodiment of the present disclosure may determine the entry time point of the second efficiency decreasing process P34 from the measured value G10 of the electrode sensor 25 by reflecting the observation time T4.

For example, when a drying efficiency G3 in a state in which the moisture of the laundry is sufficiently removed to terminate the first efficiency decreasing process P32 is set as the second efficiency decreasing process entry drying efficiency W8, even when the measured value G10 of the electrode sensor 25 has already reached a maximum value or a preset specific value before the current drying efficiency G3 reaches the second efficiency decreasing process entry drying efficiency W8, a time required for the drying efficiency G3 to reach the second efficiency decreasing process entry drying efficiency after reaching the specific value may be specified. An embodiment of the present disclosure may determine such time required as the observation time T4 in advance and reflect the observation time T4 in the measured value G10 of the electrode sensor 25, thereby determining the entry time point of the second efficiency decreasing process P34.

That is, one embodiment of the present disclosure may set the maximum value measurable by the electrode sensor 25 or the specific value that may represent the same as the second efficiency decreasing process entry electrode sensor value V6, and determine the time point at which the observation time T4 has elapsed after the measured value G10 of the electrode sensor 25 reaches the second efficiency decreasing process entry electrode sensor value V6 as the entry time point of the second efficiency decreasing process P34.

When the observation time T4 elapses after the measured value G10 of the electrode sensor 25 reaches the second efficiency decreasing process entry electrode sensor value V6, the drying efficiency G3 may already has reached the second efficiency decreasing process entry drying efficiency W8.

As above, one embodiment of the present disclosure may determine the entry time point of the second efficiency decreasing process P34 through the measured value G10 of the electrode sensor 25 that may directly indicate the moisture amount of laundry, so that the reliability may be improved. In addition, even in a situation in which the moisture amount of the laundry is out of the measurable range of the electrode sensor 25, the entry time point of the second efficiency decreasing process P34 may be efficiently identified by introducing the observation time T4.

In one example, when the amount of laundry identified in the laundry amount determination process P11 equal to or greater than the preset small amount reference value, one embodiment of the present disclosure may secure the reliability of the determination of the entry time point of each drying process using the electrode sensor 25 as described above.

That is, in one embodiment of the present disclosure, when the amount of laundry is equal to or greater than the preset small amount reference value, the controller 400 may perform the second efficiency decreasing process P34 when the measured value G10 of the electrode sensor 25 reaches the second efficiency decreasing process entry electrode sensor value V6.

In one example, in one embodiment of the present disclosure, when the amount of laundry is less than the small amount reference value, the controller 400 may perform the second efficiency decreasing process P34 after performing the first efficiency decreasing process P32 for a preset first efficiency decreasing process execution time T2.

For example, when the amount of laundry inside the drum 20 is less than the small amount reference value, and thus, the reliability of the measured value G10 of the electrode sensor 25 is lowered, one embodiment of the present disclosure may determine the entry time point of the efficiency decreasing process P30 using the measured value G4 of the evaporator sensor 160 or the compressor sensor 150 as described above.

In addition, based on the change in the drying efficiency G3, the time required from the entry time point of the efficiency decreasing process P30 to the entry time point of the second efficiency decreasing process P34 may be set as the first efficiency decreasing process execution time T2 in advance, so that the entry time point of the second efficiency decreasing process P34 may be efficiently determined even when it is difficult to use the electrode sensor 25.

Accordingly, one embodiment of the present disclosure may efficiently perform the first efficiency decreasing process P32 and the second efficiency decreasing process P34, which are distinguished based on the drying efficiency G3, even without additionally including the expensive sensor and the like.

In one example, the controller 400 may perform the second efficiency decreasing process P34 for the preset second efficiency decreasing process execution time T3 after performing the first efficiency decreasing process P32.

The second efficiency decreasing process P34 is a drying process for terminating the operation cycle of each component of the laundry treating apparatus 1 and performing the cooling process. Thus, instead of being performed based on the change in the drying efficiency G3 and the like, the second efficiency decreasing process P34 may be terminated after being performed for a preset second efficiency decreasing process execution time T3.

The second efficiency decreasing process execution time T3 may be variously determined as a period during which cooling of the fluid of the fluid circulator 100 or the air of the air circulator 200 is completed as the temperature thereof becomes equal to or lower than a predetermined level, and driving of each driving apparatus is stably terminated.

Figure 13:
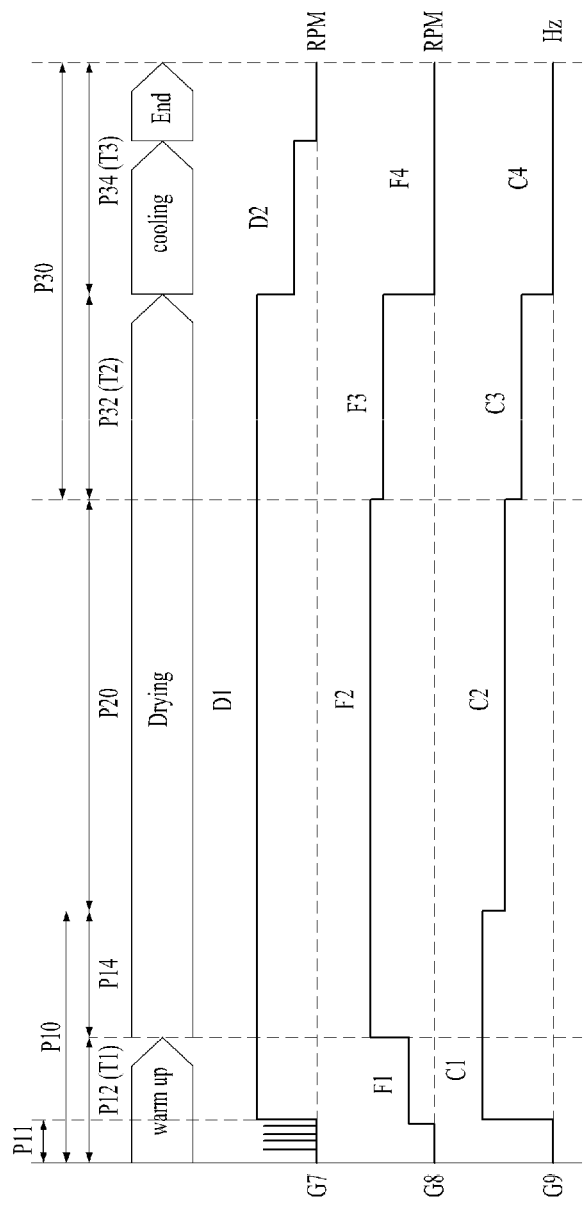
FIG. 13 is a graph showing changes in operation of a drum, a fan, and a compressor in a drying operation of laundry in a laundry treating apparatus according to an embodiment of the present disclosure in a normal load mode.
Figure 14:
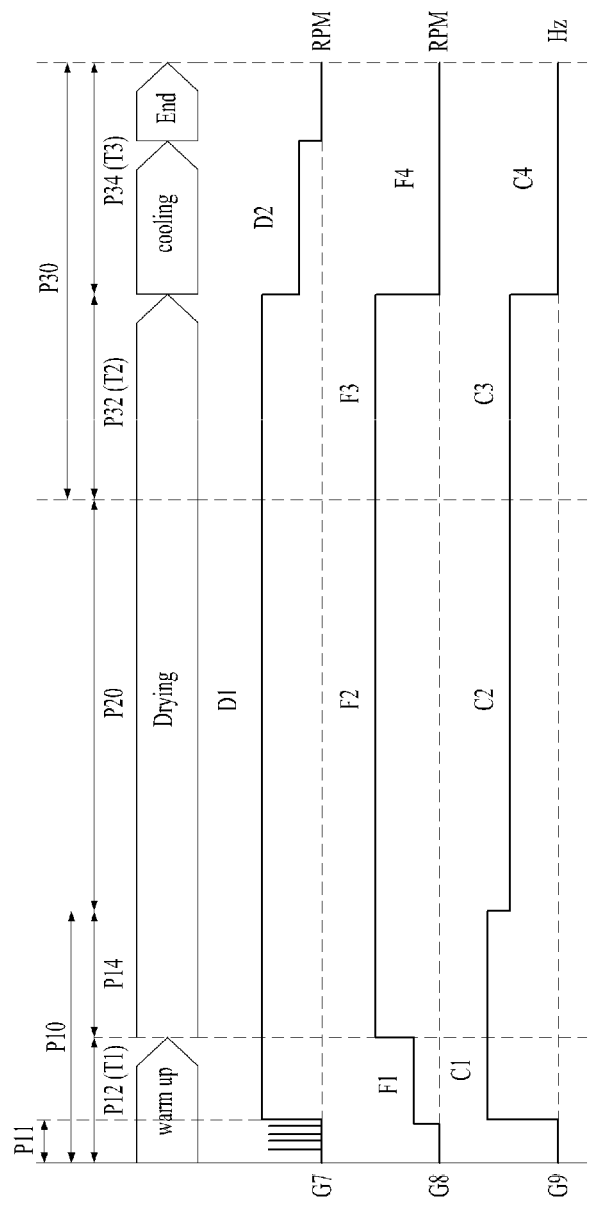
FIG. 14 is a graph showing changes in operation of a drum, a fan, and a compressor in a drying operation of laundry in a laundry treating apparatus according to an embodiment of the present disclosure in a heavy load mode.

In one example, FIGS. 13 and 14 show graphs showing changes in a RPM G7 of the drum 20, a RPM G8 of the fan 210, and a frequency G9 of the compressor 120 in each drying process of the drying operation according to an embodiment of the present disclosure.

In FIGS. 13 and 14, a horizontal axis corresponds to time, and a vertical axis corresponds to the RPMs G7 and G8 of the drum 20 and the fan 210 and the frequency (HZ) G9 of the compressor.

FIG. 13 corresponds to a case in which the amount of laundry inside the drum 20 is less than a preset large amount reference value, and FIG. 14 corresponds to a case in which the amount of laundry inside the drum 20 is equal to or greater than the large amount reference value.

That is, FIG. 13 corresponds to a normal load mode based on the amount of laundry, and FIG. 14 corresponds to a heavy load mode. Details of the normal load mode and the heavy load mode will be described later.

Referring to FIGS. 13 and 14, in one embodiment of the present disclosure, the controller 400 may control the frequency G9 of the compressor 120 to be higher in the efficiency increasing process P10 than in the efficiency maintaining process P20.

The efficiency increasing process P10 is a drying process that requires a rapid increase in the drying efficiency G3. Therefore, the fluid temperature of the fluid circulator 100 needs to be increased rapidly. Accordingly, the controller 400 may control the compressor 120 such that the frequency G9 of the compressor 120 in the efficiency increasing process P10 is higher than in the efficiency maintaining process P20.

In one example, the controller 400 may control the driver 300 such that the RPM G8 of the fan 210 in the first efficiency increasing process P12 is lower than in the second efficiency increasing process P14.

In the efficiency increasing process P10, the first efficiency increasing process P12 corresponds to a process of rapidly increasing the fluid temperature of the fluid circulator 100. The second efficiency increasing process P14 may be performed to stabilize the operation cycles of the fluid circulator 100 and the air circulator 200 with a relatively gentle increase in the fluid temperature.

Accordingly, one embodiment of the present disclosure may reduce the RPM G8 of the fan 210 to reduce an amount of heat transferred from the fluid of the fluid circulator 100 to the air of the air circulator 200 in the first efficiency increasing process P12, and may operate the fan 210 at a higher RPM than that in the second efficiency increasing process P14 such that the RPM G8 of the fan 210 in the second efficiency increasing process P14 is the same as that in the efficiency maintaining process P20.

As such, one embodiment of the present disclosure may control the driver 300 based on the characteristics of the first efficiency increasing process P12 and the second efficiency increasing process P14, thereby more efficiently performing the efficiency increasing process P10 and efficiently improving the energy efficiency.

In one example, the controller 400 may control the compressor 120 such that the frequency G9 of the compressor 120 is constant in the efficiency increasing process P10. That is, the frequency G9 of the compressor 120 may be maintained the same in the first efficiency increasing process P12 and the second efficiency increasing process P14.

For the fluid circulator 100, a stabilization time based on a fluctuation of the frequency G9 of the compressor 120 is important. Therefore, one embodiment of the present disclosure may adjust the change rate of the drying efficiency G3 by changing the RPM G8 of the fan 210 while maintaining the frequency G9 of the compressor 120 despite the changes in the first efficiency increasing process P12 and the second efficiency increasing process P14, thereby efficiently performing the efficiency increasing process P10.

In one example, in one embodiment of the present disclosure, the driver 300 may include the first driver 310 rotating the drum 20 and the second driver 320 rotating the fan 210. FIGS. 2 to 4 show the driver 300 including the first driver 310 rotating the drum 20 and the second driver 320 rotating the fan 210.

The operation of the first driver 310 and the second driver 320 may be controlled by the controller 400, and may be controlled independently of each other. For example, the controller 400 may operate only one of the first driver 310 and the second driver 320, may control the RPMs of the first driver 310 and second driver 320 to be different from each other, and may control RPM change rates of the first driver 310 and the second driver 320 to be different from each other.

Accordingly, one embodiment of the present disclosure may control the RPM G7 of the drum 20 and the RPM G8 of the fan 210 required in each drying process independently of each other, so that driving of the drum 20 and the fan 210 corresponding to each drying process may be specifically performed, and the energy efficiency may be effectively improved.

In one example, as shown in FIGS. 13 and 14, in one embodiment of the present disclosure, the controller 400 may control the first driver 310 such that the RPM G7 of the drum 20 is the same in the first efficiency increasing process P12 and the second efficiency increasing process P14, and may control the second driver 320 such that the RPM G8 of the fan 210 is lower in the second efficiency increasing process P14 than in the first efficiency increasing process P12.

In the performance of the efficiency increasing process P10, changing the RPM G7 of the drum 20 to increase the drying efficiency G3 may be of little benefit, and may rather cause a stabilization delay resulted from the fluctuation of the RPM G7 of the drum 20. Thus, one embodiment of the present disclosure maintains the same target RPM of drum 20 in the first efficiency increasing process P12 and the second efficiency increasing process P14. Furthermore, for stabilizing the drying operation, the RPM G7 of the drum 20 in the efficiency increasing process P10 may be controlled to the same value as in the efficiency maintaining process P20.

In one example, as described above, the RPM G8 of the fan 210 is related to flow rate and velocity of the air, and the flow rate and velocity of the air are related to an amount of heat lost from the fluid in the fluid circulator 100. Thus, in order to efficiently increase the temperature of the fluid of the fluid circulator 100, the RPM G8 of the fan 210 is set lower in the first efficiency increasing process P12 than in the second efficiency increasing process P14, thereby contributing to a rapid increase in the drying efficiency G3.

As above, one embodiment of the present disclosure adjusts the RPM G8 of the fan 210 to match the process characteristics of the rapid increase of the drying efficiency G3 and the fluid temperature of the fluid circulator 100 in the first efficiency increasing process P12, and adjusts the RPM G7 of the drum 20 independently of the RPM G8 of the fan 210, thereby efficiently improving the energy efficiency while effectively implementing the characteristics of each drying process.

In one example, in one embodiment of the present disclosure, the controller 400 may control the driver 300 such that the RPM G7 of the drum 20 is constant in the first efficiency increasing process P12 after the laundry amount determination process P11.

That is, one embodiment of the present disclosure may perform the above-described laundry amount determination process P11 together with the performance of the first efficiency increasing process P12. For example, when the drying operation of the laundry is performed, the laundry amount determination process P11 may be performed first, and the first laundry efficiency increasing process P12 may constantly maintain the RPM G7 of the drum 20 after the laundry amount determination process P11 is performed by including the laundry amount determination process P11.

In FIGS. 13 and 14, the laundry amount determination process P11 performed by controlling, by the controller 400, the driver 300 according to an embodiment of the present disclosure is expressed on the RPM G7 of the drum 20.

One embodiment of the present disclosure may control the drum 20 and the RPM G8 of the fan 210 independently of each other in schemes including the scheme in which the driver 300 includes the first driver 310 and the second driver 320 even when the RPM G7 of the drum 20 is changed for the laundry amount determination process P11 as described above, thereby performing the laundry amount determination process P11 unnecessary fluctuation in the RPM G8 of the fan 210.

In one example, in one embodiment of the present disclosure, the controller 400 may control the driver 300 such that the RPM G7 of the drum 20 and the RPM G8 of the fan 210 are constant in the second efficiency increasing process P14 and the efficiency maintaining process P20.

Because the second efficiency increasing process P14 is a drying process performed after the first efficiency increasing process P12 for stabilizing each driving apparatus and the cycle to enter in the efficiency maintaining process P20, the controller 400 may control the driver 300 such that the RPMs G7 and G8 of the drum 20 and the fan 210 in the second efficiency increasing process P14 are respectively the same as the RPMs G7 and G8 of the drum 20 and the fan 210 in the efficiency maintaining process P20.

In one example, in one embodiment of the present disclosure, the controller 400 may control the RPM of the driver 300 and the frequency G9 of the compressor 120 in the first efficiency decreasing process P32 to be equal to or lower than values in the efficiency maintaining process P20, and control the RPM of the driver 300 and the frequency G9 of the compressor 120 in the second efficiency decreasing process P34 to be lower than values in the first efficiency decreasing process P32.

Referring to FIGS. 13 and 14, in the first efficiency decreasing process P32, the RPM of the driver 300, that is, the RPMs G7 and G8 of the drum 20 and the fan 210 may be adjusted to be equal to or lower than values in the efficiency maintaining process P20. For example, the RPMs G7 and G8 of the drum 20 and the fan 210 in the first efficiency decreasing process P32 may be equal to or lower than the values in the efficiency maintaining process P20.

That is, in one embodiment of the present disclosure, the controller 400 may control the driver 300 such that the RPMs G7 and G8 of the drum 20 and the fan 210 in the first efficiency decreasing process P32 become equal to or lower than the values in the efficiency maintaining process P20 so as to prevent additional energy consumption for increasing the drying efficiency G3.

In one example, in one embodiment of the present disclosure, the second efficiency decreasing process P34 may control the RPM of the driver 300 and the frequency G9 of the compressor 120 to be lower than values in the first efficiency decreasing process P32. That is, the controller 400 may stop the driver 300 and the compressor 120 in the second efficiency decreasing process P34 or control the driver 300 and the compressor 120 with lower output compared to the output in the first efficiency decreasing process P32.

Because the second efficiency decreasing process P34 is a process of relatively gently stopping the operation of the laundry treating apparatus 1 for the termination of the drying operation instead of the complete termination of the drying operation, the driver 300 and the compressor 120 may still be operated in at least a portion of the second efficiency decreasing process P34.

Referring to FIGS. 13 and 14, it may be seen that, in the second efficiency decreasing process P34, the controller 400 stops the operation of the driver 300, that is, the operation of the fan 210 and the compressor 120, and rotates the drum 20 at the lower RPM G7 than in the first efficiency decreasing process P32.

In the second efficiency decreasing process P34, the cooling process for the fluid and the air may be performed. FIGS. 13 and 14 show the cooling process. It may be seen that, in the cooling process, the drum 20 rotates at the lower RPM G7 than in the first efficiency decreasing process.

When the drying operation of the laundry is terminated, the user of the laundry treating apparatus 1 according to an embodiment of the present disclosure may retrieve the laundry from the interior of the drum 20. In this case, it may be inconvenient for the user to retrieve the laundry because of the temperature of the laundry increased by the drying operation of the laundry.

Accordingly, one embodiment of the present disclosure may still rotate the drum 20 at a predetermined RPM such that the cooling of the laundry may be performed as well as the temperature reduction of the fluid and the air in the second efficiency decreasing process P34. The rotation of the drum 20 may be advantageous in lowering the temperature of the laundry by allowing the laundry to evenly dissipate the heat.

In one example, in one embodiment of the present disclosure, when the amount of laundry is equal to or greater than the preset large amount reference value, the controller 400 may control the RPM of the driver 300 and the frequency G9 of the compressor 120 in the first efficiency decreasing process P32 in the same manner as in the efficiency maintaining process P20.

Specifically, in one embodiment of the present disclosure, when the amount of laundry identified through the laundry amount determination process P11 is equal to or greater than the preset large amount reference value, the controller 400 may proceed with the drying operation based on the heavy load mode.

The large amount reference value may mean an amount of laundry with the amount of moisture remaining in the laundry equal to or greater than a certain level even after the efficiency maintaining process P20 is performed, and the large amount reference value may be variously determined based on repeated experimental results and theoretical results.

A driver 300 and compressor 120 control strategy based on the heavy load mode corresponds to the graph of FIG. 14. In the heavy load mode, the controller 400 may keep the RPM of the driver 300 and the frequency G9 of the compressor 120 in the first efficiency decreasing process P32 the same as those in the efficiency maintaining process P20.

The heavy load mode may be understood as a situation in which the moisture amount of laundry is still large even when the moisture amount of laundry is reduced through the efficiency maintaining process P20 and the efficiency decreasing process P30 in which the drying efficiency G3 is reduced is started. Accordingly, a drying effect of the laundry may be sufficiently maintained such that a result of the drying operation may be sufficiently satisfactory to the user.

In one example, in one embodiment of the present disclosure, when the amount of laundry is less than the large amount reference value, the controller 400 may control the compressor 120 such that the frequency G9 of the compressor 120 is lower in the first efficiency decreasing process P32 than in the efficiency maintaining process P20.

That is, when the amount of laundry is less than the large amount reference value, the controller 400 controls the compressor 120 and the driver 300 based on the normal load mode. Such driver 300 and compressor 120 control strategy based on the normal load mode is represented in the graph of FIG. 13.

The normal load mode may be understood as a mode that prioritizes the energy efficiency instead of increasing the drying effect of the laundry when compared with the heavy load mode. The normal load mode may be understood as a mode in which the moisture amount of laundry may be sufficiently removed even when the general first efficiency decreasing process P32 is performed after performing the efficiency maintaining process P20.

When comparing the heavy load mode with the normal load mode with reference to FIGS. 13 and 14, the heavy load mode may control the RPM of the driver 300 and the frequency G9 of the compressor 120 in the same way as in the efficiency maintaining process P20 such that the drying effect of the laundry in the first efficiency decreasing process P32, that is, an amount of water evaporation from the laundry may be improved.

Even when the driver 300 and the compressor 120 are controlled in the first efficiency decreasing process P32 in the same way as in the efficiency maintaining process P20, the drying efficiency G3 becomes to be gradually decreased by the decrease in the moisture amount of the laundry.

In one example, the normal load mode may control the output of the driver 300 and the compressor 120 in the first efficiency decreasing process P32 to be equal to or lower than that in the efficiency maintaining process P20 such that the energy efficiency based on energy consumption of the driver 300 and the compressor 120 may be improved.

For example, in one embodiment of the present disclosure, when the amount of laundry is less than the large amount reference value, the controller 400 may control the first driver 310 in the first efficiency decreasing process P32 to control the RPM G7 of the drum 20 to be the same as in the efficiency maintaining process P20, and control the second driver 320 to control the RPM G8 of the fan 210 to be lower than the value in the efficiency maintaining process P20.

Referring to FIG. 13, in the normal load mode where the amount of laundry is less than the large amount reference value, the controller 400 may maintain the RPM G7 of the drum 20 the same as in the efficiency maintaining process P20, and control the first driver 310 and the second driver 320 such that the RPM G8 of the fan 210 becomes lower than the value in the efficiency maintaining process P20.

Because the rotation of drum 20 is involved in the drying effect of the laundry and the decrease in the temperature of the laundry, even in the first efficiency decreasing process, it may be advantageous to maintain the same RPM as in the efficiency maintaining process P20. In one example, the RPM G8 of the fan 210 may be controlled to be lower than the value in the efficiency maintaining process P20 to reduce the energy consumption.

As such, one embodiment of the present disclosure may independently and efficiently control the RPM G7 of the drum 20 and the RPM G8 of the fan 210 through the individual control of the first driver 310 and the second driver 320, thereby effectively improving the drying efficiency G3 of the drying operation together with the energy efficiency improvement.

In one example, in one embodiment of the present disclosure, the controller 400 may control the driver 300 in the second efficiency decreasing process P34 to control the RPM G7 of the drum 20 to a cooling RPM lower than that in the efficiency maintaining process P20 for a preset cooling time, and control the RPM G7 of the drum 20 to a value lower than the cooling RPM described above after the cooling time has elapsed. The cooling time may be set in various ways as needed. After the cooling time, the driver 300 may be controlled such that the RPM G7 of the drum 20 corresponds to 0.

In one embodiment of the present disclosure, the cooling of the laundry proceeds as the drum 20 rotates during the cooling time also in the second efficiency decreasing process P34 through setting of the cooling time. After the cooling process is performed, as the rotation of the drum 20 is terminated, the drying operation may be completed.

In one example, the controller 400 may control the first driver 310 such that the RPM G7 of the drum 20 corresponds to a cooling RPM during the cooling time in the second efficiency decreasing process P34, and may control the second driver 320 such that the RPM G8 of the fan 210 is constant in the second efficiency decreasing process P34.

As described above, the cooling of the laundry may be performed while the drum 20 is rotated at a low RPM lower than the RPM in the first efficiency decreasing process P32 during the cooling process, and the rotation of the fan 210 may be terminated in advance such that each system inside the laundry treating apparatus 1 may be stably terminated.

In one embodiment of the present disclosure, the first driver 310 and the second driver 320 operate independently such that the rotation of the drum 20 may be terminated with the rotation of the drum 20 in the second efficiency decreasing process P34 as above, so that the energy efficiency in the drying operation of the laundry may be improved.

Hereinafter, a method for controlling the laundry treating apparatus 1 according to an embodiment of the present disclosure will be described in detail. However, overlapping content with respect to the treating apparatus 1 according to an embodiment of the present laundry disclosure will be omitted as much as possible.

Figure 15:
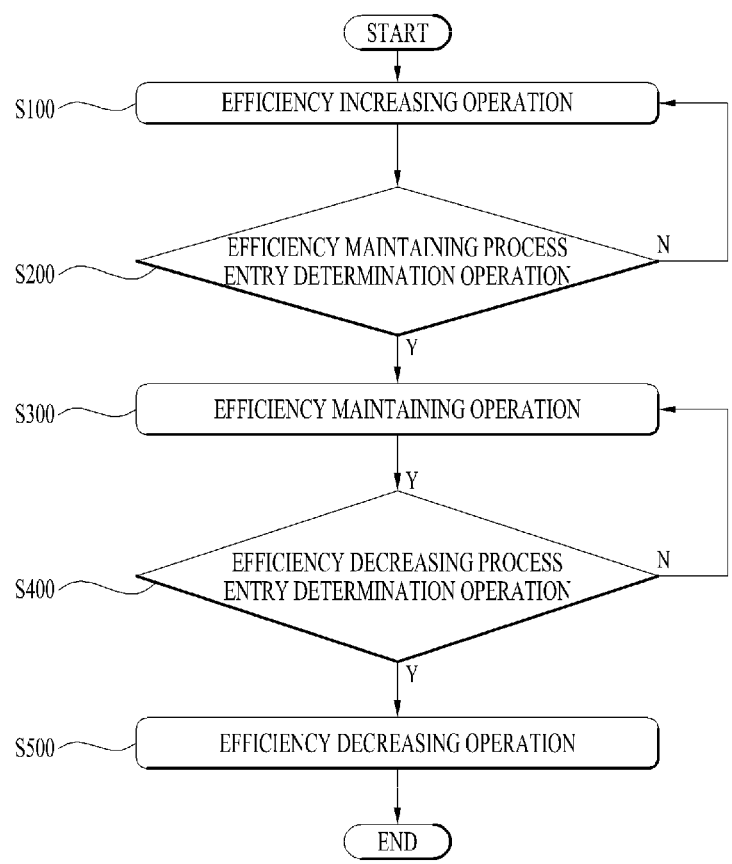
FIG. 15 is a flowchart schematically illustrating a method for controlling a laundry treating apparatus according to an embodiment of the present disclosure.

FIGS. 13 and 14 show graphs showing changes in an RPM G7 of the drum 20, an RPM G8 of the fan 210, and a frequency G9 of the compressor 120 in the method for controlling the laundry treating apparatus 1 according to an embodiment of the present disclosure, and FIG. 15 schematically illustrates a method for controlling the laundry treating apparatus 1 according to an embodiment of the present disclosure.

As described above, in one embodiment of the present disclosure, the laundry treating apparatus 1 may include the cabinet 10, the drum 20 that is rotatably disposed inside the cabinet 10 and accommodates the laundry therein, the fluid circulator 100 in which the fluid circulates along the condenser 110, the compressor 120, and the evaporator 130, the air circulator 200 that includes the fan 210 for flowing the air heated through the fluid circulator 100 into the drum 20, the driver 300 including the first driver 310 for rotating the drum 20 and the second driver 320 for rotating the fan 210, and the controller 400 that controls the compressor 120 and the driver 300 to perform the drying operation of the laundry.

In one example, referring to FIG. 15, the method for controlling the laundry treating apparatus 1 according to an embodiment of the present disclosure may include an efficiency increasing operation (S100) and an efficiency maintaining operation (S300).

The efficiency increasing operation (S100) is an operation in which the above-described efficiency increasing process P10 is performed. The efficiency maintaining operation S300 may be an operation in which the aforementioned efficiency maintaining process P20 is performed. That is, in the efficiency increasing operation (S100), the controller 400 performs the efficiency increasing process P10 for increasing the drying efficiency G3 inside the drum 20 during the drying operation. In the efficiency maintaining operation (S300), after the efficiency increasing operation (S100), the controller 400 performs the efficiency maintaining process P20 for maintaining the drying efficiency G3 during the drying operation.

Figure 16:
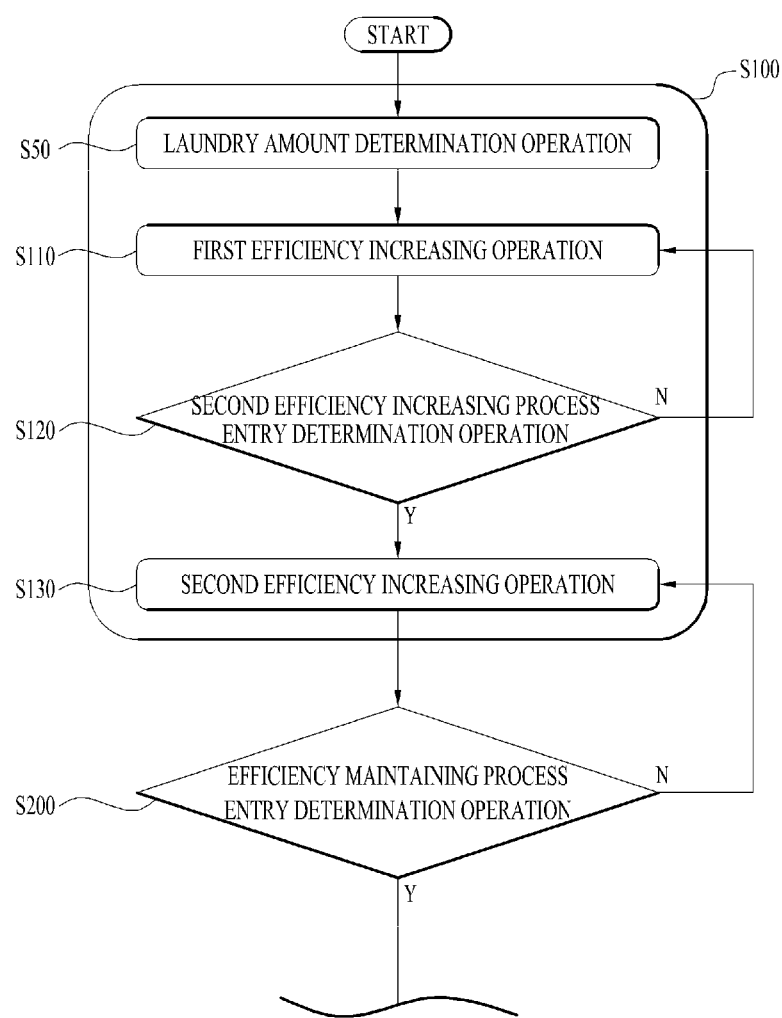
FIG. 16 is a flowchart specifically illustrating an efficiency increasing operation in a method for controlling a laundry treating apparatus according to an embodiment of the present disclosure.
Figure 18:
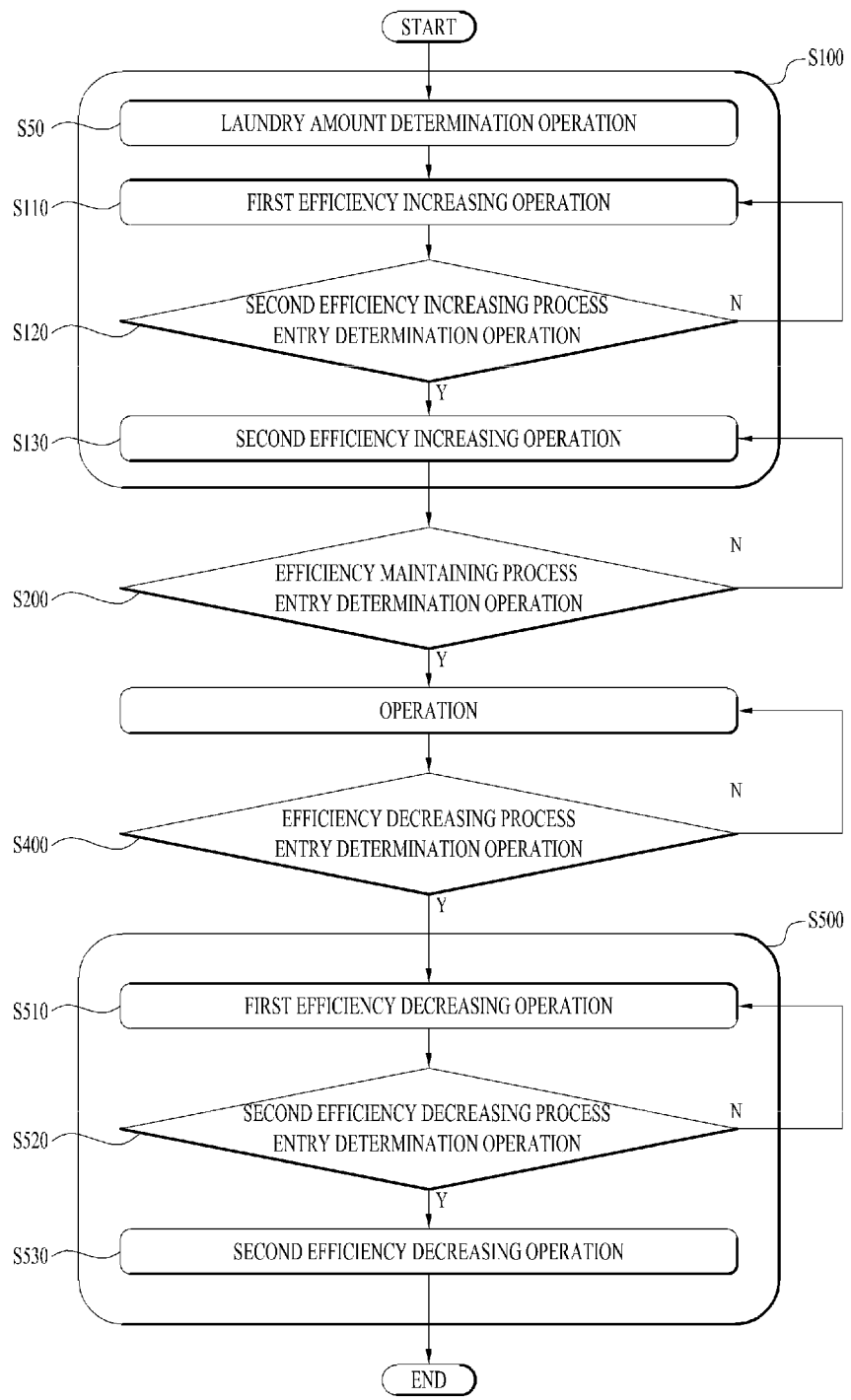
FIG. 18 is a flowchart specifically illustrating a method for controlling a laundry treating apparatus according to an embodiment of the present disclosure.

In one example, referring to FIG. 16, the efficiency increasing operation (S100) may include a first efficiency increasing operation (S110) and a second efficiency increasing operation (S130). FIG. 18 shows a detailed flowchart of a method for controlling the laundry treating apparatus 1 including the first efficiency increasing operation (S110) and the second efficiency increasing operation (S130).

In the first efficiency increasing operation (S110), the controller 400 may control the first driver 310 such that the RPM G7 of the drum 20 corresponds to a first drum RPM D1, and control the second driver 320 such that the RPM G8 of the fan 210 corresponds to a first fan RPM F1 to perform the first efficiency increasing process P12.

In the second efficiency increasing operation (S130), after the first efficiency increasing operation (S110), the controller 400 may control the first driver 310 such that the RPM G7 of the drum 20 corresponds to the first drum RPM D1, and control the second driver 320 such that the RPM G8 of the fan 210 corresponds to a second fan RPM F2 higher than the first fan RPM F1 to perform the second efficiency increasing process P14.

Operational characteristics of the drum 20 and the fan 210 in the first efficiency increasing operation (S110) and the second efficiency increasing operation (S130) will be described with reference to FIGS. 13 and 14 as follows.

In the first efficiency increasing operation (S110), the RPM G7 of the drum 20 may correspond to the first drum RPM D1. In the second efficiency increasing operation (S130), the RPM G7 of the drum 20 may be maintained at the first drum RPM D1. That is, in the first efficiency increasing operation (S110) and the second efficiency increasing operation (S130), the RPM G7 of the drum 20 may be maintained constant at the first drum RPM D1.

The first drum RPM D1 may be maintained to be the same as in the efficiency maintaining operation (S300), as will be described later. The drum 20 has a large unnecessary energy consumption by RPM fluctuations resulted from an own load and a laundry load. In one embodiment of the present disclosure, the first drum RPM D1 is maintained as the first drum RPM D1 throughout the efficiency increasing operation (S100) and the efficiency maintaining operation (S300) to ensure driving stability and mechanical stability of the drying operation. The first drum RPM D1 may be set to various values as needed.

In one example, the controller 400 may control the second driver 320 such that the RPM G8 of the fan 210 corresponds to the first fan RPM F1 in the first efficiency increasing operation (S110), and the RPM G8 of the fan 210 corresponds to the second fan RPM F2 in the second efficiency increasing operation (S130). The second fan RPM F2 may be set to a higher value than the first fan RPM F1. That is, in the second efficiency increasing operation (S130), the fan 210 may be rotated at a faster speed than in the first efficiency increasing operation (S110).

The first efficiency increasing process P12 performed in the first efficiency increasing operation (S110) is a process for rapidly increasing the temperatures of the fluid and the air to promote a stable drying process, in order to increase temperature increase rates of the fluid and the air, one embodiment of the present disclosure may determine that the RPM G8 of the fan 210 in the first efficiency increasing operation (S110) is lower than the RPM G8 of the fan 210 in the second efficiency increasing operation (S130).

In addition, in the efficiency maintaining operation (S300), the second fan RPM F2 in the second efficiency increasing operation (S130) may be the same as the RPM G8 of the fan 210, or may have a value closer to the RPM G8 of the fan 210 in the efficiency maintaining operation (S300) than to the first fan RPM F1. That is, in the second efficiency increasing operation (S130), the controller 400 may set the RPM G8 of the fan 210 to the second fan RPM F2 to maintain the RPM G8 of the fan 210 that is the same as or similar to that in the efficiency maintaining operation (S300), thereby stabilizing the air circulation of the air circulator 200 in consideration of the efficiency maintaining operation (S300).

One embodiment of the present disclosure controls the RPM G7 of the drum 20 and the RPM G8 of the fan 210 independently of each other as the driver 300 includes the first driver 310 and the second driver 320, thereby effectively increasing the drying efficiency G3 and at the same time effectively improving the energy efficiency.

That is, one embodiment of the present disclosure may maintain the RPM G7 of the drum 20, which is relatively difficult to be fluctuated, at the first drum RPM D1 both in the first efficiency increasing operation (S110) and in the second efficiency increasing operation (S130), and set the RPM G8 of fan 210, which is relatively easy to be fluctuated and plays a major role in the increase in the temperature of the fluid and the air, to the first fan RPM F1 in first efficiency increasing operation (S110) and to the second fan RPM F2 in the second efficiency increasing operation (S130), thereby effectively inducing the increase in the temperature of the fluid and the air in the first efficiency increasing operation (S110) and promoting system stabilization in the second efficiency increasing operation (S130).

In one example, in one embodiment of the present disclosure, the controller 400 may control the compressor 120 and the driver 300 such that the increase rate of the drying efficiency G3 in the first efficiency increasing operation (S110) is greater than the increase rate of the drying efficiency G3 in the second efficiency increasing operation (S130).

As described above, in the first efficiency increasing operation (S110), the temperatures of the fluid and the gas may be rapidly increased to allow the drying efficiency G3 to rapidly approach the normalized drying efficiency G3 in the efficiency maintaining operation (S300). In addition, in the second efficiency increasing operation (S130), the increase rate of the drying efficiency G3 may be reduced to be lower than in the first efficiency increasing operation (S110), and system stabilization of the laundry treating apparatus 1 including the fluid circulator 100 and the air circulator 200 may be achieved.

Accordingly, the controller 400 may control the driver 300 and the compressor 120 such that the increase rate of the drying efficiency G3 is high in the first efficiency increasing operation (S110), and may control the driver 300 and the compressor 120 such that the increase rate of the drying efficiency G3 has a positive value, but is lower in the second efficiency increasing operation (S130) than in the first efficiency increasing operation (S110).

In one example, referring to FIG. 9, in the method for controlling the laundry treating apparatus 1 according to an embodiment of the present disclosure, the controller 400 may control the compressor 120 and the driver 300 such that an increase rate of the measured value G4 of the compressor sensor 150 disposed in the fluid circulator 100 and measuring the temperature of the fluid passing through the compressor 120 is greater in the first efficiency increasing operation (S110) than in the second efficiency increasing operation (S130).

The measured value G4 of the compressor sensor 150 may represent the temperature of the fluid circulating in the fluid circulator 100. That is, in one embodiment of the present disclosure, the increase rate of the temperature of the fluid in the first efficiency increasing operation (S110) may be higher than the increase rate of the temperature of the fluid in the second efficiency increasing operation (S130).

For example, as described above, the controller 400 controls the RPM G8 of the fan 210 to the first fan RPM F1 in the first efficiency increasing operation (S110), but controls the RPM G8 of the fan 210 to the second fan RPM F2 in the second efficiency increasing operation (S130), so that an amount of heat transferred from the fluid to the air is reduced using the first fan RPM F1 in the first efficiency increasing operation (S110), and the amount of heat is increased using the second fan RPM F2 equal to or similar to a RPM in a normal state in the second efficiency increasing operation (S130), thereby stabilizing the fluid circulator 100 and the air circulator 200.

The first fan RPM F1 may be determined as various values, and the second fan RPM F2 may be variously determined as a higher value than the first fan RPM F1. A deviation between the first fan RPM F1 and the RPM G8 of the fan 210 in the efficiency maintaining operation (S300) may be greater than a deviation between the second fan RPM F2 and the RPM of the fan 210 in the efficiency maintaining operation (S300).

In one embodiment of the present disclosure, there may be various schemes for controlling the driver 300 and the compressor 120 for increasing the drying efficiency G3. For example, the controller 400 may maintain the same RPM G7 of the drum 20, but maintain the RPM G8 of the fan 210 at the first fan RPM F1 in the first efficiency increasing operation (S110), but change the RPM G8 of the fan 210 to the second fan RPM F2 in the second efficiency increasing operation (S130), thereby adjusting the temperature increase rates of the fluid and the air.

In addition, in one embodiment of the present disclosure, the controller 400 may control the compressor 120 such that the frequency G9 of the compressor 120 corresponds to a first frequency C1 in the first efficiency increasing operation (S110) and in the second efficiency increasing operation (S130).

That is, in one embodiment of the present disclosure, the controller 400 may control the frequency G9 of the compressor 120 to the same value in the first efficiency increasing operation (S110) and the second efficiency increasing operation (S130).

A fluctuation of the frequency G9 of the compressor 120 is sensitive to changes in a pressure or a flow rate of the fluid. Accordingly, frequent fluctuations or large fluctuations of the frequency G9 of the compressor 120 may adversely affect the stabilization of the fluid circulator 100.

Therefore, in one embodiment of the present disclosure, the controller 400 may maintain the frequency G9 of the compressor 120 at the first frequency C1 in the first efficiency increasing operation (S110) that relatively significantly increases the drying efficiency G3 and in the second efficiency increasing operation (S130) that relatively gently increases the drying efficiency G3, but change the RPM G8 of the fan 210 from the first fan RPM F1 to the second fan RPM F2, thereby effectively adjusting the temperature increase rate of the fluid or the increase rate of the drying efficiency G3.

In one example, as shown in FIGS. 13 and 14, in one embodiment of the present disclosure, in the efficiency maintaining operation (S300), the controller 400 may control the compressor 120 such that the frequency G9 of the compressor 120 corresponds to a second frequency C2 lower than the first frequency C1.

Specifically, the first efficiency increasing operation (S110) and the second efficiency increasing operation (S130) generally correspond to processes for raising the temperature of the fluid to a normal state, that is, to a temperature of the fluid for performing the efficiency maintaining operation (S300). Accordingly, one embodiment of the present disclosure may set the frequency G9 of the compressor 120 to be higher in the efficiency increasing operation (S100) than in the efficiency maintaining operation (S300).

However, in order to minimize unnecessary fluctuations in the frequency G9 of the compressor 120 as described above, in the first efficiency increasing operation (S110) and the second efficiency increasing operation (S130), the frequency G9 of the compressor 120 may be maintained at the first frequency C1.

In one embodiment of the present disclosure, the frequency G9 of the compressor 120 may be controlled to be the first frequency C1 in the efficiency increasing operation (S100) in order to rapidly increase the temperature of the fluid to advance the time point for the drying operation of the laundry to enter the efficiency maintaining operation (S300), and adjusted to be the second frequency C2 corresponding to the normal state in the efficiency maintaining operation (S300), thereby maintaining the drying efficiency G3 to the maximum while improving the energy efficiency.

The first frequency C1 and the second frequency C2 may be determined to various values, and may be changed based on the laundry amount, a laundry material, and the like. However, the second frequency C2, which is the value lower than the first frequency C1, may correspond to the frequency in the normal state corresponding to the efficiency maintaining operation (S300) in which the drying efficiency G3 may be maintained to the maximum in the corresponding environment.

In one example, in an embodiment of the present disclosure, in the efficiency maintaining operation (S300), the controller 400 may control the first driver 310 such that the RPM G7 of the drum 20 corresponds to the first drum RPM D1.

As described above, the change in the RPM G7 of the drum 20 may generate a large energy consumption by a load of the drum 20 itself, a load of the laundry, and the like, and may generate a large load in a connection structure between the first driver 310 and the drum 20, so that the frequent changes in the RPM or the large fluctuations of the RPM of the drum 20 may be disadvantageous in terms of the energy and the structure.

Accordingly, one embodiment of the present disclosure allows the drying operation to be performed from the efficiency increasing operation (S100) to the efficiency maintaining operation (S300) without the change in the RPM G7 of the drum 20 by setting the first drum RPM D1 corresponding to the RPM G7 of the drum 20 applied in the efficiency increasing operation (S100) to be the same as the RPM G7 of the drum 20 applied in the efficiency maintaining operation (S300). However, the first drum RPM D1 may be fluctuated by the laundry material, the laundry amount, and the like of the laundry accommodated in the drum 20.

In one example, in an embodiment of the present disclosure, in the efficiency maintaining operation (S300), the controller 400 may control the second driver 320 such that the RPM G8 of the fan 210 corresponds to the second fan RPM F2. FIGS. 13 and 14 show the RPM G8 of the fan 210 having the same value in the second efficiency increasing operation (S130) and in the efficiency maintaining operation (S300).

As described above, the controller 400 may control the RPM G8 of the fan 210 to the first fan RPM F1 in the first efficiency increasing operation (S110) for the rapid increase in the temperature of the fluid, and the RPM G8 of the fan 210 may have the same value as in the efficiency maintaining operation (S300), which is the second fan RPM F2, in the second efficiency increasing operation (S130) to stabilize the air circulator 200 for performing the efficiency maintaining operation (S300).

One embodiment of the present disclosure may implement a rapid increase in the drying efficiency G3 by changing the RPM G8 of the fan 210 in the first efficiency increasing operation (S110) and the second efficiency increasing operation (S130), and at the same time, achieving the stabilization of the system, such as the fluid circulator 100 and the like, by making the RPM G8 of the fan 210 the same in the second efficiency increasing operation (S130) and in the efficiency maintaining operation (S300).

Further, the RPM G7 of the drum 20 is maintained at the same first drum RPM D1 in the efficiency increasing operation (S100) and in the efficiency maintaining operation (S300) to improve the energy efficiency and secure the mechanical stability. In addition, the frequency G9 of the compressor 120 is controlled to the first frequency C1 in the efficiency increasing operation (S100) and to the second frequency C2 in the efficiency maintaining operation (S300) to effectively adjust the drying efficiency G3 while minimizing the unnecessary frequency fluctuations.

In one example, in one embodiment of the present disclosure, the efficiency increasing operation (S100) may further include a second efficiency increasing process entry determination operation (S120). The second efficiency increasing process entry determination operation (S120) may be performed before the second efficiency increasing operation (S130), and the controller 400 may determine whether a duration of the first efficiency increasing operation (S110) is equal to or greater than the first efficiency increasing operation execution time T1.

The second efficiency increasing operation (S130) may be performed when it is determined in the second efficiency increasing process entry determination operation (S120) that the duration is equal to or greater than the first efficiency increasing operation execution time T1. FIG. 16 is a flowchart specifically illustrating an efficiency increasing operation (S100) according to an embodiment of the present disclosure.

In one embodiment of the present disclosure, the first efficiency increasing operation (S110) may be performed for the preset first efficiency increasing operation execution time T1. As described above, the first efficiency increasing operation execution time T1 or the execution time of the first efficiency increasing process P12 may be set to various values in consideration of the second efficiency increasing operation (S130) and the efficiency maintaining operation (S300).

Referring to FIG. 16, in the second efficiency increasing process entry determination operation (S120), the controller 400 may determine whether the duration for which the first efficiency increasing operation (S110) is performed is equal to or greater than the first efficiency increasing operation execution time T1, may continue the first efficiency increasing operation (S110) when the duration is less than the first efficiency increasing operation execution time T1, and terminate the first efficiency increasing operation (S110) and perform the second efficiency increasing operation (S130) when the duration is equal to or greater than the execution time of the second efficiency increasing operation (S130).

In one example, FIGS. 15 and 18 show the efficiency maintaining process entry determination operation (S200) performed before the efficiency maintaining operation (S300). The efficiency maintaining process entry determination operation (S200) may be performed before the efficiency maintaining operation (S300), and the controller 400 may determine whether entry conditions of the efficiency maintaining process are satisfied using the measured value of the humidity sensor 250 disposed inside the air circulator 200 and measuring the humidity of the air passing through the drum 20. The efficiency maintaining operation (S300) may be performed when it is determined that the entry conditions of the efficiency maintaining process are satisfied in the efficiency maintaining process entry determination operation (S200).

The efficiency maintaining process entry determination operation (S200) may be understood as an operation independent of the efficiency increasing operation (S100), and may be understood as a part of the efficiency increasing operation (S100). In the efficiency maintaining process entry determination operation (S200), the controller 400 may determine whether the entry conditions of the efficiency maintaining process are satisfied using the measured value of the humidity sensor 250.

There may be various entry conditions of the efficiency maintaining process. The entry conditions of the efficiency maintaining process may include the efficiency maintaining process entry humidity sensor value W1, the efficiency maintaining process entry drying efficiency W2, the efficiency maintaining process entry compressor sensor value V1, the efficiency maintaining process entry evaporator sensor value V2, and the like described above.

When using the humidity sensor 250, the controller 400 may determine whether the measured value of the humidity sensor 250 corresponds to the efficiency maintaining process entry humidity sensor value W1, or determine whether the drying efficiency G3 derived by utilizing the first humidity sensor 252 and the second humidity sensor 254 corresponds to the efficiency maintaining process entry drying efficiency W2.

The controller 400 may determine whether one of the plurality of entry conditions of the efficiency maintaining process is satisfied, or repeatedly determine whether at least two thereof are satisfied, thereby determining whether the entry conditions of the efficiency maintaining process are satisfied.

For example, the controller 400 may determine that the entry conditions of the efficiency maintaining process are satisfied and perform the efficiency maintaining operation (S300) when the measured value of the humidity sensor 250 corresponds to the efficiency maintaining process entry humidity sensor value W1, or may perform the efficiency maintaining operation (S300) when the measured value of the humidity sensor 250 corresponds to the efficiency maintaining process entry humidity sensor value W1, and at least one of the rest of the plurality of entry conditions of the efficiency maintaining process is satisfied.

For example, the controller 400 may determine that the entry conditions of the efficiency maintaining process are satisfied only when the value of the efficiency maintaining process entry humidity sensor 250 is satisfied and the efficiency maintaining process entry compressor sensor value V1 and/or the efficiency maintaining process entry evaporator sensor value V2 are satisfied using the compressor sensor 150 and/or the evaporator sensor 160 together in addition to the humidity sensor 250.

One embodiment of the present disclosure may determine whether the entry conditions of the efficiency maintaining process are satisfied through the measured value of the humidity sensor 250, the change rate of the measured value of the humidity sensor 250, or the drying efficiency G3 derived from the measured value of the humidity sensor 250, and may terminate the efficiency increasing operation (S100) and perform the efficiency maintaining operation (S300) when the entry conditions of the efficiency maintaining process are satisfied.

Specifically, in one embodiment of the present disclosure, the humidity sensor 250 may include the first humidity sensor 252 that measures the humidity of the air flowing into the drum 20 and the second humidity sensor 254 that measures the humidity of the air flowing out of the drum 20.

In addition, in the efficiency maintaining process entry determination operation (S200), the controller 400 may determine that the entry conditions of the efficiency maintaining process are satisfied when the drying efficiency G3 derived from the measured values of the first humidity sensor 252 and the second humidity sensor 254 reaches the efficiency maintaining process entry drying efficiency W2.

In one embodiment of the present disclosure, the efficiency increasing operation (S100) and the efficiency maintaining operation (S300) may be distinguished from each other based on the characteristics of the drying efficiency G3. When determining whether to enter the efficiency maintaining operation (S300) through the efficiency maintaining process entry drying efficiency W2, the efficiency increasing operation (S100) and the efficiency maintaining operation (S300) may be accurately distinguished from each other, which is advantageous.

In one example, in an embodiment of the present disclosure, in the efficiency maintaining process entry determination operation (S200), the controller 400 may determine whether the measured value G4 of the compressor sensor 150 disposed in the fluid circulator 100 and measuring the temperature of the fluid passing through the compressor 120 corresponds to the efficiency maintaining process entry compressor sensor value V1. The efficiency maintaining operation (S300) may be performed when the measured value G4 of the compressor sensor 150 satisfies the efficiency maintaining process entry compressor sensor value V1 in the efficiency maintaining process entry determination operation (S200).

That is, in one embodiment of the present disclosure, the controller 400 may determine whether the entry conditions of the efficiency maintaining process are satisfied utilizing the compressor sensor 150 by replacing the humidity sensor 250 or together with the humidity sensor 250. When using the compressor sensor 150, the controller 400 may determine whether the measured value G4 of the compressor sensor 150 corresponds to the efficiency maintaining process entry compressor sensor value V1 during the entry condition of efficiency maintaining process.

When determining whether the entry conditions of the efficiency maintaining process are satisfied using the compressor sensor 150 and the efficiency maintaining process entry compressor sensor value V1, even when the humidity sensor 250, which is relatively expensive, is excluded, the entry time point of the efficiency maintaining operation (S300) may be relatively accurately determined, which is advantageous.

In one example, in the method for controlling the laundry treating apparatus 1 according to an embodiment of the present disclosure, in the efficiency maintaining process entry determination operation (S200), the controller 400 may correct the efficiency maintaining process entry compressor sensor value V1 to a higher value as the measured value of the outdoor air sensor 50 that measures the temperature of the air outside the cabinet 10 is higher.

As described above, the laundry treating apparatus 1 according to an embodiment of the present disclosure may further include the outdoor air sensor 50, and the outdoor air temperature G6 may affect the efficiency maintaining process entry compressor sensor value V1, the efficiency maintaining process entry evaporator sensor value V2, and the like for the entry of the efficiency maintaining operation (S300).

Accordingly, in one embodiment of the present disclosure, the controller 400 corrects the efficiency maintaining process entry compressor sensor value V1 to the higher value as the measured value of the outdoor air sensor 50 is higher, thereby more accurately identifying the change in the drying efficiency G3, and entry time points of the efficiency maintaining operation (S300) and an efficiency decreasing operation (S500).

Figure 17:
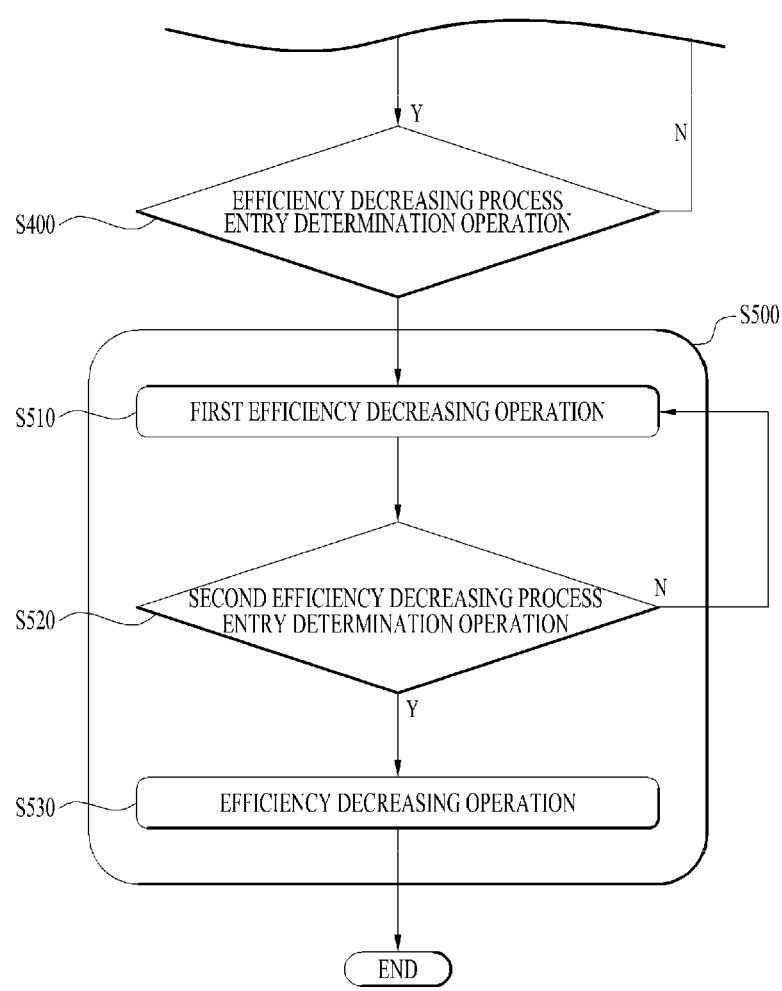
FIG. 17 is a flowchart specifically illustrating an efficiency decreasing operation in a method for controlling a laundry treating apparatus according to an embodiment of the present disclosure.

In one example, FIG. 15 schematically shows the efficiency decreasing operation (S500) according to an embodiment of the present disclosure, and FIGS. 17 and 18 are detailed flowcharts of the efficiency decreasing operation (S500).

One embodiment of the present disclosure may further include the efficiency decreasing operation (S500). In the efficiency decreasing operation (S500), the controller 400 may perform an efficiency decreasing process P30 for reducing the drying efficiency G3 during the drying operation after the efficiency maintaining operation (S300).

The efficiency decreasing operation (S500) may include a first efficiency decreasing operation (S510). Referring to FIGS. 17 and 18, in the first efficiency decreasing operation (S510), the controller 400 may control the first driver 310 such that the RPM G7 of the drum 20 corresponds to the first drum RPM D1, and control the second driver 320 such that the RPM G8 of the fan 210 corresponds to the third fan RPM F3 lower than the RPM F2 of the second fan, thereby performing the first efficiency decreasing process P32.

In the method for controlling the laundry treating apparatus 1 according to an embodiment of the present disclosure, in the efficiency decreasing operation (S500), the above-mentioned efficiency decreasing process P30 may be performed, and the efficiency decreasing process P30 may continue to dry the laundry while reducing the drying efficiency G3, and may control the driver 300 and the compressor 120 such that the drying operation of the laundry is eventually terminated stably.

In addition, the efficiency decreasing operation (S500) may include the first efficiency decreasing operation (S510). In the first efficiency decreasing operation (S510), the controller 400 may perform the above-described first efficiency decreasing process P32. In the first efficiency decreasing process P32, the controller 400 ensures that the drying of the laundry continues in the process of decreasing the drying efficiency G3, and thus, sufficient drying is performed.

In one embodiment of the present disclosure, the controller 400 may control the first driver 310 and the second driver 320 in the first efficiency decreasing operation (S510) to perform the second efficiency decreasing process P34. The controller 400 may control the first driver 310 such that the RPM G7 of the drum 20 corresponds to the first drum RPM D1, and control the second driver 320 such that the RPM G8 of the fan 210 corresponds to the third fan RPM F3 lower than the RPM F2 of the second fan, thereby performing the first efficiency decreasing process P32.

In the first efficiency decreasing operation (S510), the RPM G7 of the drum 20 may be controlled as the first drum RPM D1 in the same manner as in the efficiency maintaining operation (S300). That is, the drum 20 may be controlled at the same RPM in the efficiency increasing operation (S100), the efficiency maintaining operation (S300), and the first efficiency decreasing operation (S510).

In one example, the fan 210 may be controlled at the third fan RPM F3 corresponding to an RPM lower than that in the efficiency maintaining operation (S300). That is, the fan 210 may be controlled at the first fan RPM F1 in the first efficiency increasing operation (S110), controlled at the second fan RPM F2 having the higher value than the first fan RPM F1 in the second efficiency increasing operation (S130) and the efficiency maintaining operation (S300), and controlled at the third fan RPM F3 having the lower value than the second fan RPM F2 in the first efficiency decreasing operation (S510).

The third fan RPM F3 may correspond to the higher value than the first fan RPM F1. Accordingly, in the first efficiency decreasing operation (S510), the RPM G8 of the fan 210 does not contribute to the increase in the temperature of the fluid as in the first efficiency increasing operation (S110), but is adjusted to be close to that in the efficiency maintaining operation (S300) to allow the drying process to be sufficiently performed.

In the first efficiency decreasing operation (S510), an amount of dry of the laundry becomes equal to or greater than a certain level, that is, the amount of moisture remaining in the laundry becomes equal to or less than a certain level, and the drying efficiency G3 begins to decrease. In order to correspond to the natural decrease in the drying efficiency G3, the RPM G8 of the fan 210 is also decreased to secure the energy efficiency.

One embodiment of the present disclosure may effectively increase the drying efficiency G3 while effectively increasing the energy efficiency by effectively adjusting the RPM G7 of the drum 20 and the RPM G8 of the fan 210 through independent control of the first driver 310 and the second driver 320. Furthermore, in the first efficiency decreasing operation (S510), one embodiment of the present disclosure may control the RPM G7 of the drum 20 to the first drum RPM D1, which is the same in the efficiency maintaining operation (S300), to allow the thorough drying of the laundry to be continued, and adjust the RPM G8 of the fan 210 to the third fan RPM F3 lower than the second fan RPM F2 in the efficiency maintaining operation (S300) to continue the drying process while reducing the energy consumption.

In one example, in an embodiment of the present disclosure, the controller 400 may control the compressor 120 such that the frequency G9 of the compressor 120 corresponds to the second frequency C2 in the efficiency maintaining operation (S300), and the controller 400 may control the compressor 120 such that the frequency G9 of the compressor 120 corresponds to the third frequency C3 lower than the second frequency C2 in the first efficiency decreasing operation (S510).

As described above, the compressor 120 may be controlled at the first frequency C1 in the efficiency increasing operation (S100), and may be controlled at the second frequency C2 lower than the first frequency C1 in the efficiency maintaining operation (S300). Furthermore, in the first efficiency decreasing operation (S510), the compressor 120 may be controlled at the third frequency C3 lower than the second frequency C2.

In the first efficiency decreasing operation (S510), the compressor 120 is controlled at the third frequency C3, so that the temperature and the like of the fluid is gradually reduced to correspond to the natural decrease of the drying efficiency G3. Accordingly, as the drying process of the laundry proceeds, the energy consumption of the fluid circulator 100 may be reduced, and a final driving stop state of the fluid circulator 100 may be approached.

In one example, in one embodiment of the present disclosure, the efficiency increasing operation (S100) may further include a laundry amount determination operation (S50). The laundry amount determination operation (S50) may be performed before the first efficiency increasing operation (S110), and the controller 400 may determine the amount of laundry while rotating the drum 20.

In the first efficiency decreasing operation (S510), when the amount of laundry determined in the laundry amount determination operation (S50) is equal to or greater than a large amount reference value, the controller 400 may correct the third fan RPM F3 to a value the same as the second fan RPM F2 and correct the third frequency C3 to a value the same as the second frequency C2.

Specifically, in one embodiment of the present disclosure, the laundry amount determination process described above may be performed in the laundry amount determination operation (S50). That is, in the laundry amount determination operation (S50), the controller 400 may measure the amount of laundry in the drum 20, that is, the laundry amount through a load, an amount of current, and the like applied to the first driver 310 while appropriately rotating the drum 20 by controlling the first driver 310.

In the method for controlling the laundry treating apparatus 1 according to one embodiment of the present disclosure, the laundry amount determination operation (S50) may correspond to a part of the efficiency increasing operation (S100) as shown in FIG. 16 or may be defined independently of the efficiency increasing operation (S100). That is, the laundry amount determination operation (S50) may be performed before the efficiency increasing operation (S100) is performed. A specific relationship between the laundry amount determination operation (S50) and the efficiency increasing operation (S100) may be variously determined as needed, and the laundry amount determination operation (S50) may be included in the efficiency maintaining operation (S300) or the efficiency decreasing operation (S500) as needed.

In one example, the controller 400 may determine whether the laundry amount identified in the laundry amount determination operation (S50) is equal to or greater than the large amount reference value. The large amount reference value may be preset in the controller 400, and may be set to various values as necessary.

As described above, in one embodiment of the present disclosure, the controller 400 may perform a heavy load mode when the laundry amount is equal to or greater than the large amount reference value, and may perform a normal load mode when the laundry amount is less than the large amount reference value.

In the case of the normal load mode, in the first efficiency decreasing operation (S510), the controller 400 may control the RPM G8 of the fan 210 to the third fan RPM F3 lower than the second fan RPM F2 and may control the frequency G9 of the compressor 120 to the third frequency C3 lower than the second frequency C2 as described above.

In one example, when it is determined in the laundry amount determination operation (S50) that the laundry amount in the drum 20 is equal to or greater than the large amount reference value, that is, in the case of the heavy load mode, the controller 400 may correct the third fan RPM F3 and the third frequency C3 in the first efficiency decreasing operation (S510).

Specifically, in the case of the heavy load mode, in the first efficiency decreasing operation (S510), the controller 400 may correct the third fan RPM F3 to the value the same as the second fan RPM F2 in the efficiency maintaining operation (S300), and correct the third frequency C3 to the value the same as the second frequency C2 in the efficiency maintaining operation (S300).

That is, when the laundry amount is equal to or greater than the large amount reference value, in the first efficiency decreasing operation (S510), the controller 400 may control the RPM G8 of the fan 210 to a third corrected RPM the same as the second fan RPM F2 and control the frequency G9 of the compressor 120 to a third corrected frequency the same as the second frequency C2. That is, the controller 400 may control the RPM G8 of the fan 210 to be the same as in the efficiency maintaining operation (S300) and control the frequency G9 of the compressor 120 to be the same as in the efficiency maintaining operation (S300).

When the laundry amount is equal to or greater than the large amount reference value, even after the general efficiency maintaining operation (S300) is terminated, an absolute amount of moisture remaining in the laundry is relatively large. Accordingly, a larger evaporation amount G1 of moisture required in the first efficiency decreasing operation (S510) may be required.

One embodiment of the present disclosure may perform effective drying by correcting the third fan RPM F3 and the third frequency C3 in the first efficiency decreasing operation (S510) based on the heavy load mode such that the energy consumption is effectively reduced through efficient control of the fan 210 and the compressor 120, and a drying quality of the laundry based on the laundry amount is sufficiently ensured. The large amount reference value may be determined as various values by reflecting results of multiple experiments and strategic decisions.

In one example, referring to FIG. 15, the method for controlling the laundry treating apparatus 1 according to an embodiment of the present disclosure may further include an efficiency decreasing process entry determination operation (S400). The efficiency decreasing process entry determination operation (S400) may be performed before the efficiency maintaining operation (S300), and the controller 400 may determine whether a change rate of the measured value of the humidity sensor 250 disposed in the air circulator 200 and measuring the humidity of the air passing through the drum 20 corresponds to the efficiency decreasing process entry humidity change rate W5.

The efficiency decreasing operation (S500) may be performed when the change rate of measured value of the humidity sensor 250 in the efficiency decreasing process entry determination operation (S400) corresponds to the efficiency decreasing process entry humidity change rate W5.

The efficiency decreasing process entry determination operation (S400) may be performed between the efficiency maintaining operation (S300) and the first efficiency decreasing operation (S510). In the efficiency decreasing process entry determination operation (S400), the controller 400 may determine whether the entry conditions of the efficiency decreasing process are satisfied. When it is determined that the entry conditions of the efficiency decreasing process are satisfied, the efficiency maintaining operation (S300) may be terminated and the first efficiency decreasing operation (S510) may proceed.

There may be various entry conditions of the efficiency decreasing process. For example, the entry conditions of the efficiency decreasing process may include an efficiency decreasing process entry humidity change rate W5, an efficiency decreasing process entry drying efficiency W6, an efficiency decreasing process entry change rate V3, an efficiency decreasing process entry compressor sensor value V4, and an efficiency decreasing process entry electrode sensor value V5.

The controller 400 may determine whether the change rate of the measured value of the humidity sensor 250 corresponds to the efficiency decreasing process entry humidity change rate W5, whether the drying efficiency G3, which may be derived from the measured value of humidity sensor 250, corresponds to the efficiency decreasing process entry drying efficiency W6, whether the change rate of the measured value G5 of the evaporator sensor 160 corresponds to the efficiency decreasing process entry change rate V3, and whether the measured value G4 of the compressor sensor 150 corresponds to the efficiency decreasing process entry electrode sensor value V5.

The controller 400 may terminate the efficiency maintaining operation (S300) and perform the first efficiency decreasing operation (S510) when one of the plurality of entry conditions of the efficiency decreasing process is satisfied, and may terminate the efficiency maintaining operation (S300) and perform the first efficiency decreasing operation (S510) when at least two of the plurality of entry conditions of the efficiency decreasing process are satisfied.

In one embodiment of the present disclosure, the controller 400 may determine whether the change rate of the measured value of the humidity sensor 250 corresponds to the efficiency decreasing process entry humidity change rate W5 in the efficiency decreasing process entry determination operation (S400), and terminate the efficiency maintaining operation (S300) and perform the efficiency decreasing operation (S500), that is, the first efficiency decreasing operation (S510) when the change rate of the measured value of the humidity sensor 250 corresponds to the efficiency decreasing process entry humidity change rate W5.

At a time point at which the moisture amount of the laundry in the drum 20 is reduced over a certain level and the drying efficiency G3 begins to significantly decrease, that is, at a time point at which the efficiency maintaining operation (S300) is terminated and the efficiency decreasing operation (S500) starts, the measured value of the humidity sensor 250 may also be reduced at a reduction rate equal to or lower than a certain level.

Accordingly, in one embodiment of the present disclosure, when the change rate of the measured value of the humidity sensor 250 corresponds to the preset efficiency decreasing process entry humidity change rate W5, the controller 400 may determine that the entry conditions of the efficiency decreasing process entry condition are satisfied, and terminate the efficiency maintaining operation (S300) and perform the first efficiency decreasing operation (S510).

In the present disclosure, switching between the efficiency increasing operation (S100), the switching of the efficiency maintaining operation (S300), and the efficiency decreasing operation (S500) may correspond to time points at which control values of the compressor 120 and the driver 300 are changed.

FIG. 5 shows a graph showing the measured value of the humidity sensor 250 measured in the laundry treating apparatus 1 according to an embodiment of the present disclosure. The efficiency decreasing process entry humidity change rate W5 may correspond to a slope indicated by the graph at a start time point of the first efficiency decreasing operation (S510), and may have a negative value.

One embodiment of the present disclosure identifies the entry time point of the first efficiency decreasing operation (S510) using the change rate of the measured value of the humidity sensor 250 sensitively related to the change in the drying efficiency G3, thereby identifying a relatively accurate time point of the first efficiency decreasing operation (S510). It is also possible to determine whether the entry conditions of the efficiency decreasing process entry condition are satisfied by whether the drying efficiency G3 derived using the first humidity sensor 252 and the second humidity sensor 254 corresponds to the efficiency decreasing process entry drying efficiency W6.

In one example, in one embodiment of the present disclosure, the controller 400 may determine whether the change rate of the measured value G5 of the evaporator sensor 160 reaches the efficiency decreasing process entry change rate V3 in the efficiency decreasing process entry determination operation (S400). The efficiency decreasing operation S500 may be performed when the change rate of the measured value G5 of the evaporator sensor 160 reaches the efficiency decreasing process entry change rate V3 in the efficiency decreasing process entry determination operation S400.

As described above, one embodiment of the present disclosure may determine whether the entry conditions of the efficiency decreasing process are satisfied through various conditions in the efficiency decreasing process entry determination operation (S400). That is, one embodiment of the present disclosure may determine whether the entry conditions of the efficiency decreasing process are satisfied through the change rate of the measured value G5 of the evaporator sensor 160 in the efficiency decreasing process entry determination operation (S400). FIG. 11 shows a graph showing the measured value G5 of the evaporator sensor 160 according to an embodiment of the present disclosure.

As described above, when the moisture amount of the laundry is reduced over the certain level and the efficiency maintaining operation (S300) is terminated, the moisture amount contained in the air or the humidity of the air discharged from the drum 20 is reduced. Accordingly, the amount of moisture that causes a phase change in the evaporator 130 of the fluid circulator 100 is also rapidly reduced. Accordingly, the amount of heat obtained by the fluid passing through the evaporator 130 from the phase change of the water is reduced, so that the measured value G5 of the evaporator sensor 160 may be reduced.

For example, when it is the time point to terminate the efficiency maintaining operation (S300) as above, the change rate of the measured value G5 of the evaporator sensor 160 may have a value of 0, a negative value, or a value close to 0.

Using the behavioral characteristics of the change rate of the measured value G5 of the evaporator sensor 160, in one embodiment of the present disclosure, the controller 400 may compare the change rate of the measured value G5 of the evaporator sensor 160 with the efficiency decreasing process entry change rate V3 in the efficiency decreasing process entry determination operation (S400), thereby effectively determining whether the entry conditions of the efficiency decreasing process are satisfied and whether to perform the first efficiency decreasing operation (S510).

In one example, in one embodiment of the present disclosure, the controller 400 may determine whether the measured value G10 of the electrode sensor 25 reaches the efficiency decreasing process entry electrode sensor value V5. The efficiency decreasing operation S500 may be performed when the measured value G10 of the electrode sensor 25 reaches the efficiency decreasing process entry electrode sensor value V5 in the efficiency decreasing process entry determination operation S400.

As described above, the electrode sensor 25 shows a behavior in which the measured value thereof is rapidly increased when the moisture amount of laundry becomes equal to or less than a certain level. In one embodiment of the present disclosure, the controller 400 may determine whether the entry conditions of the efficiency decreasing process are satisfied by using the measured value G10 of the electrode sensor 25 in the efficiency decreasing process entry determination operation (S400).

FIG. 10 shows a graph showing the measured value G10 of the electrode sensor 25 in one embodiment of the present disclosure. FIG. 10 shows the measured value G10 of the electrode sensor 25 corresponding to the entry time point of the efficiency decreasing operation S500, that is, the efficiency decreasing process entry electrode sensor value V5.

In one embodiment of the present disclosure, in the efficiency decreasing process entry determination operation (S400), the controller 400 may determine whether the entry conditions of the efficiency decreasing process are satisfied by comparing the measured value G10 of the electrode sensor 25 with the efficiency decreasing process entry electrode sensor value V5. When the measured value G10 of the electrode sensor 25 satisfies the efficiency decreasing process entry electrode sensor value V5, the controller 400 may terminate the efficiency maintaining operation (S300) and perform the first efficiency decreasing operation (S510).

However, the above-described plurality of entry conditions of the efficiency decreasing process are not necessarily an alternative relationship, one may be selected or a plurality of entry conditions of the efficiency decreasing process are selected together to be used in the efficiency decreasing process entry determination operation (S400).

In one example, the method for controlling the laundry treating apparatus 1 according to an embodiment of the present disclosure may include the laundry amount determination operation (S50). In the efficiency decreasing process entry determination operation (S400), when the laundry amount determined in the laundry amount determination operation (S50) is equal to or greater than the small amount reference value, the controller 400 may determine whether the measured value G10 of the electrode sensor 25 reaches the efficiency decreasing process entry electrode sensor value V5.

As described above, the electrode sensor 25 generates a measured value proportional to or inversely proportional to the moisture amount of the laundry through contact with the laundry. When the amount of laundry in the drum 20 is too small, because the contact between the electrode sensor 25 and the laundry is unstable, the measured value G10 of the electrode sensor 25 may have poor reliability or the measurement may not be performed.

Accordingly, one embodiment of the present disclosure may determine in advance a minimum amount of laundry from which the measured value G10 of the electrode sensor 25 is not reliable, and set the minimum amount of laundry as the small amount reference value in the controller 400 in advance. When the laundry amount determined in the laundry amount determination operation (S50) is equal to or greater than the small amount reference value, the controller 400 may compare the measured value G10 of the electrode sensor 25 with the efficiency decreasing process entry electrode sensor value V5.

As described above, one embodiment of the present disclosure may identify in advance an environment that may utilize the electrode sensor 25, and set a condition accordingly to utilize the measured value G10 of the electrode sensor 25 in the efficiency decreasing process entry determination operation (S400), thereby effectively determining the entry time point of the efficiency decreasing operation (S500).

In one example, in one embodiment of the present disclosure, the efficiency decreasing operation (S500) may further include a second efficiency decreasing operation (S530). After the first efficiency decreasing operation (S510), in the second efficiency decreasing operation (S530), the controller 400 may control the first driver 310 such that the RPM G7 of the drum 20 corresponds to the second drum RPM D2 lower than the first drum RPM D1, and may perform the second efficiency decreasing process P34 by controlling the second driver 320 such that the RPM G8 of the fan 210 corresponds to a fourth fan RPM F4 lower than the third fan RPM F3.

FIGS. 17 and 18 show flowcharts of the efficiency decreasing operation (S500) including the second efficiency decreasing operation (S530), and FIGS. 13 and 14 show the RPM G7 of the drum 20, the RPM G8 of the fan 210, and the frequency G9 of the compressor 120 in the second efficiency decreasing operation (S530).

The second efficiency decreasing operation (S530) is a preparation process for terminating the drying operation of the laundry after the first efficiency decreasing operation (S510), and is an operation for stabilizing the termination of the fluid circulator and the air circulator 200. In the second efficiency decreasing operation (S530), the second efficiency decreasing process P34 that reduces the temperatures of not only the fluid and the air, but also of the laundry in the drum 20 to stabilize the system and make it easier for the user to withdraw the laundry may be performed.

The second efficiency decreasing operation (S530) may be performed after the first efficiency decreasing operation (S510), and the drying operation may be terminated after the second efficiency decreasing operation (S530). In the second efficiency decreasing operation (S530), the controller 400 may control the RPM G7 of the drum 20 to the second drum RPM D2 lower than the first drum RPM D1 in the first efficiency decreasing operation (S510).

That is, in one embodiment of the present disclosure, after controlling the first driver 310 to control the RPM G7 of the drum 20 to the first drum RPM D1 in the efficiency increasing operation (S100), the efficiency maintaining operation (S300), and the first efficiency decreasing operation (S510), the controller 400 may control the RPM G7 of the drum 20 to the second drum RPM D2 in the second efficiency decreasing operation (S530).

In the second efficiency decreasing operation (S530), the controller 400 may control the RPM G8 of the fan 210 to the fourth fan RPM F4 lower than the third fan RPM F3 in the first efficiency decreasing operation (S510). That is, the controller 400 may control a wp2 driver to control the RPM G8 of the fan 210 to the first fan RPM F1 in the first efficiency increasing operation (S110), to the second fan RPM F2 in the second efficiency increasing operation (S130) and in the efficiency maintaining operation (S300), to the third fan RPM F3 in the first efficiency decreasing operation (S510), and to the fourth fan RPM F4 in the second efficiency decreasing operation (S530).

In one embodiment of the present disclosure, the drying process of the laundry is substantially terminated after the first efficiency decreasing process P32, and the stabilization of each system for terminating the drying operation of the laundry is performed while reducing the temperature of the laundry through the second efficiency decreasing process P34. The second drum RPM D2 may correspond to the aforementioned cooling RPM.

In one example, in the second efficiency decreasing operation (S530), the fan 210 may be controlled at the fourth fan RPM F4 by the controller 400, and the fourth fan RPM F4 may correspond to a value lower than the third fan RPM F3 in the first efficiency decreasing operation (S510). That is, in the second efficiency decreasing operation (S530) after the first efficiency decreasing operation (S510), one embodiment of the present disclosure may minimize the RPM G8 of the fan 210 and may allow the air flow to stop stably.

In one example, referring to FIG. 8, in one embodiment of the present disclosure, the controller 400 may control the compressor 120 and the driver 300 such that the reduction rate of the drying efficiency G3 in the first efficiency decreasing operation (S510) is greater than the reduction rate of the drying efficiency G3 in the second efficiency decreasing operation (S530).

In the first efficiency decreasing operation (S510), unlike the efficiency maintaining operation (S300), the drying efficiency G3 is reduced, but control for drying the laundry may still be performed. In one example, because the second efficiency decreasing operation (S530) is an operation for terminating the drying operation of the laundry, cooling the laundry, and stably stopping the air circulator 200 and the fluid circulator 100, unlike the first efficiency decreasing operation (S510), the reduction rate of the drying efficiency G3 in the second efficiency decreasing operation (S530) may be greater than the reduction rate of the drying efficiency G3 in the first efficiency decreasing operation (S510). That is, the drying efficiency G3 in the second efficiency decreasing operation (S530) may be reduced to a greater extent than the drying efficiency G3 in the first efficiency decreasing operation (S510).

In one example, referring to FIGS. 13 and 14, in the first efficiency decreasing operation (S510), the controller 400 may control the compressor 120 such that the frequency G9 of the compressor 120 corresponds to the third frequency C3. In the second efficiency decreasing operation (S530), the controller 400 may control the compressor 120 such that the frequency G9 of the compressor 120 corresponds to a fourth frequency C4 lower than the third frequency C3.

Similarly to the fan 210, the compressor 120 may be controlled at a frequency lower in the second efficiency decreasing operation (S530) than in the first efficiency decreasing operation (S510). That is, the compressor 120 may be controlled at the third frequency C3 in the first efficiency decreasing operation (S510), and controlled at the fourth frequency C4 lower than the third frequency C3 in the second efficiency decreasing operation (S530).

In one example, in one embodiment of the present disclosure, in the second efficiency decreasing operation (S530), the second drum RPM D2 may have a value greater than 0, and the fourth fan RPM F4 and the fourth frequency C4 may correspond to a value of 0, so that the driving of the fan 210 and the compressor 120 may be terminated.

Specifically, in one embodiment of the present disclosure, the second efficiency decreasing operation (S530) may correspond to an operation of cooling the laundry inside the drum 20 and the fluid and the air to promote the termination of each system. Therefore, the fan 210 and the compressor 120 may no longer be operated and the operation thereof may be terminated.

In one example, the laundry inside the drum 20 may be subjected to an active cooling process through the second efficiency decreasing operation (S530) to improve convenience of the user. Accordingly, one embodiment of the present disclosure may set the RPM G8 of the fan 210 to the value of 0 to terminate the operation of the fan 210, set the frequency G9 of the compressor 120 to the value of 0 to stop the operation of the compressor 120, but set the RPM G7 of the drum 20 to the value greater than 0 to induce contact between the laundry and the air with the rotation of the drum 20, thereby inducing the cooling of the laundry.

In one example, referring to FIGS. 17 and 18, in one embodiment of the present disclosure, the efficiency decreasing operation (S500) may further include a second efficiency decreasing process entry determination operation (S520). In the second efficiency decreasing process entry determination operation (S520), when the laundry amount determined in the laundry amount determination operation (S50) is equal to or greater than the small amount reference value, the controller 400 may determine whether the measured value G10 of the electrode sensor 25 disposed in the drum 20 and in contact with the laundry to measure the moisture amount corresponds to the second efficiency decreasing process entry electrode sensor value V6 during a preset observation time T4.

The second efficiency decreasing operation (S530) may be performed when the measured value G10 of the electrode sensor 25 corresponds to the second efficiency decreasing process entry electrode sensor value V6 during the observation time T4 in the second efficiency decreasing process entry determination operation (S520).

Specifically, in one embodiment of the present disclosure, in the second efficiency decreasing process entry determination operation (S520), the controller 400 may determine whether the entry conditions of the second efficiency decreasing process entry condition are satisfied, and terminate the first efficiency decreasing operation (S510) and perform the second efficiency decreasing operation (S530) when it is determined that the entry conditions of the second efficiency decreasing process entry condition are satisfied.

There may be various entry conditions of the second efficiency decreasing process. For example, the entry conditions of the second efficiency decreasing process may include the second efficiency decreasing process entry humidity sensor value W7, the second efficiency decreasing process entry drying efficiency W8, the second efficiency decreasing process entry electrode sensor value V6, the second efficiency decreasing process entry execution time, and the like.

For example, the controller 400 may determine whether the entry conditions of the second efficiency decreasing process are satisfied by determining whether the measured value of the humidity sensor 250 corresponds to the second efficiency decreasing process entry humidity sensor value W7, whether the drying efficiency G3 derived through the humidity sensor 250 corresponds to the second efficiency decreasing process entry drying efficiency W8, whether the measured value G10 of the electrode sensor 25 corresponds to the second efficiency decreasing process entry electrode sensor value V6, whether the duration of the first efficiency decreasing operation (S510) satisfies the first efficiency decreasing process entry execution time, and the like.

In the second efficiency decreasing process entry determination operation (S520), the controller 400 may determine whether the entry conditions of the second efficiency decreasing process are satisfied using one of the plurality of entry conditions of the second efficiency decreasing process as a representative, or determine whether the entry conditions of the second efficiency decreasing process are satisfied using two or more of the plurality of entry conditions of the second efficiency decreasing process redundantly.

For example, in one embodiment of the present disclosure, in the second efficiency decreasing process entry determination operation (S520), the controller 400 may determine whether the entry conditions of the second efficiency decreasing process are satisfied by determining whether the measured value G10 of the electrode sensor 25 corresponds to the preset second efficiency decreasing process entry humidity sensor value W7.

In order to use the measured value G10 of the electrode sensor 25, the controller 400 may determine whether the laundry amount identified in the laundry amount determination operation (S50) is equal to or greater than the preset small amount reference value, and may compare the measured value G10 of the electrode sensor 25 with the second efficiency decreasing process entry electrode sensor value V6 in the second efficiency decreasing process entry determination operation (S520) when the laundry amount is determined to be equal to or greater than the small amount reference value.

However, in the second efficiency decreasing process entry determination operation (S520), the controller 400 may determine that the entry conditions of the second efficiency decreasing process entry condition are satisfied when the measured value G10 of the electrode sensor 25 follows the second efficiency decreasing process entry electrode sensor value V6 for the preset observation time T4.

Referring to FIG. 10, the measured value G10 of the electrode sensor 25 may rapidly increase after entering the efficiency decreasing operation (S500), and may output a constant value without any further large fluctuations after the moisture amount of laundry is sufficiently reduced. For example, the measured value G10 of the electrode sensor 25 may maintain a maximum value after the moisture amount of laundry is sufficiently reduced.

One embodiment of the present disclosure may terminate the first efficiency decreasing operation (S510) and perform the second efficiency decreasing operation (S530) in the state in which the measured value G10 of the electrode sensor 25 does not show any further fluctuations as the moisture amount of the laundry is sufficiently reduced. That is, one embodiment of the present disclosure may set a maximum value of the measured value G10 of the electrode sensor 25 or a value strategically determined to replace the same as the second efficiency decreasing process entry electrode sensor value V6, and terminate the first efficiency decreasing operation (S510) and perform the second efficiency decreasing operation (S530) when the measured value G10 of the electrode sensor 25 reaches the second efficiency decreasing process entry electrode sensor value V6.

However, as the moisture amount of laundry decreases, the measured value G10 of the electrode sensor 25 becomes to have a sharp fluctuation and a temporary reliability of the measured value becomes lowered. Thus, one embodiment of the present disclosure may set the observation time T4 in advance to increase the reliability of the measured value G10 of the electrode sensor 25, and determine that the entry conditions of the second efficiency decreasing process are satisfied when the measured value G10 of the electrode sensor 25 corresponds to or greater than the second efficiency decreasing process entry electrode sensor value V6 during the observation time T4.

In one example, in one embodiment of the present disclosure, when it is desired to determine the entry time point of the second efficiency decreasing operation (S530) using the electrode sensor 25, when the laundry amount determined in the laundry amount determination operation (S50) is less than the small amount reference value, the controller 400 may determine whether the duration of the first efficiency decreasing operation (S510) is equal to or greater than the first efficiency decreasing operation execution time T2. The second efficiency decreasing operation (S530) may be performed when the duration of the first efficiency decreasing operation (S510) is equal to or greater than the first efficiency decreasing operation execution time T2 in the second efficiency decreasing process entry determination operation (S520).

As described above, the measured value G10 of the electrode sensor 25 has sufficient reliability when the laundry amount of laundry is equal to or greater than the small amount reference value. Accordingly, when the laundry amount is less than the small amount reference value, a determination condition excluding the electrode sensor 25 may be used.

Specifically, in one embodiment of the present disclosure, when the laundry amount is less than the small amount reference value in the second efficiency decreasing process entry determination operation (S520), the controller 400 may determine whether the duration of the first efficiency decreasing operation (S510) is equal to or greater than the preset first efficiency decreasing operation execution time T2, and may terminate the first efficiency decreasing operation (S510) and perform the second efficiency decreasing operation (S530) when the duration is equal to or greater than the first efficiency decreasing operation execution time T2.

That is, when the laundry amount is less than the small amount reference value, one embodiment of the present disclosure may perform the first efficiency decreasing operation (S510) for a preset first efficiency decreasing operation execution time T2 and enter the second efficiency decreasing operation (S530).

The first efficiency decreasing operation execution time T2 may be determined through repeated experiments in various conditions, and may be determined as various values in terms of control strategies. In one example, when the laundry amount is less than the small amount reference value, the second efficiency decreasing process entry determination operation (S520) may determine whether the entry conditions of the second efficiency decreasing process are satisfied by utilizing the second efficiency decreasing process entry humidity sensor value W7 or the second efficiency decreasing process entry drying efficiency W8 in addition to the first efficiency decreasing operation execution time T2.

In addition, the first efficiency decreasing operation execution time T2 preset in the controller 400 may be variously corrected based on the laundry amount, the outdoor air temperature G6, or an input signal from the user or the like input through the manipulation unit.

In one example, in one embodiment of the present disclosure, in the second efficiency decreasing operation (S530), the controller 400 may terminate the second efficiency decreasing operation (S530) when the duration of the second efficiency decreasing operation (S530) is equal to or greater than the second efficiency decreasing operation execution time T3.

In one example, the method for controlling the laundry treating apparatus 1 according to an embodiment of the present disclosure may include the efficiency maintaining operation (S300) in which the controller 400 performs the efficiency maintaining process P20 for maintaining the drying efficiency G3 inside the drum 20 during the drying operation, and the efficiency decreasing operation (S500) in which the controller 400 performs the efficiency decreasing process P30 for reducing the drying efficiency G3 during the drying operation after the efficiency maintaining operation (S300).

In addition, in the efficiency maintaining operation (S300), the controller 400 may control the first driver 310 such that the RPM G7 of the drum 20 corresponds to the first drum RPM D1, and the controller 400 may control the second driver 320 such that the RPM G8 of the fan 210 corresponds to the second fan RPM F2.

In addition, the efficiency decreasing operation (S500) may include the first efficiency decreasing operation (S510) in which the controller 400 controls the first driver 310 such that the RPM G7 of the drum 20 corresponds to the first drum RPM D1, and controls the second driver 320 such that the RPM G8 of the fan 210 corresponds to the third fan RPM F3 lower than the second fan RPM F2 to perform the first efficiency decreasing process P32.

Although the present disclosure has been illustrated and described in relation to a specific embodiment, it is understood that the present disclosure may be variously improved and changed within the scope of the technical idea of the present disclosure provided by the following claims. It will be obvious to those of ordinary skill in the industry.

What is claimed is:

1. A method for controlling a laundry treating apparatus, the laundry treating apparatus including a cabinet, a drum disposed rotatably inside the cabinet and configured to accommodate laundry therein, a fluid circulator including a condenser, a compressor, and an evaporator for circulating fluid therethrough, an air circulator including a fan configured to cause air heated through the fluid circulator to flow into the drum, and a driver including a first driver configured to rotate the drum and a second driver configured to rotate the fan, the method comprising:

performing an efficiency increasing operation by controlling the first driver and the second driver to increase a drying efficiency that is related to a humidity of the air inside the drum during a drying operation; and performing an efficiency maintaining operation by controlling the first driver and the second driver after the efficiency increasing operation to maintain the drying efficiency during the drying operation, wherein performing the efficiency increasing operation comprises:

performing a first efficiency increasing process by controlling the first driver to rotate the drum at a first drum revolutions per minute (RPM) and controlling the second driver to rotate the fan at a first fan RPM, determining whether a duration of the first efficiency increasing process is equal to or greater than a first efficiency increasing process execution time, and based on determining that the duration of the first efficiency increasing process is equal to or greater than the first efficiency increasing process execution time, performing a second efficiency increasing process by controlling the first driver to rotate the drum at the first drum RPM and controlling the second driver to rotate the fan at a second fan RPM higher than the first fan RPM.

2. The method of claim 1, wherein performing the efficiency increasing operation comprises controlling the compressor to operate at a first frequency in the first efficiency increasing process and in the second efficiency increasing process.

3. The method of claim 2, wherein performing the efficiency maintaining operation comprises controlling the compressor to operate at a second frequency lower than the first frequency in the efficiency maintaining operation.

4. The method of claim 1, wherein performing the efficiency maintaining operation comprises controlling the first driver to rotate the drum at the first drum RPM.

5. The method of claim 1, wherein performing the efficiency maintaining operation comprises controlling the second driver to rotate the fan at the second fan RPM.

6. The method of claim 1, further comprising:
before performing the efficiency maintaining operation, performing an efficiency maintaining process entry determination operation that defines whether entry conditions of the efficiency maintaining process are satisfied using a measured value of a humidity sensor disposed in the air circulator to measure a humidity of the air passing through the drum,
wherein the efficiency maintaining operation is performed based on determining that the entry conditions of the efficiency maintaining process are satisfied.

7. The method of claim 6, wherein the humidity sensor includes a first humidity sensor for measuring a humidity of air flowing into the drum and a second humidity sensor for measuring a humidity of air flowing out of the drum,
wherein performing the efficiency maintaining process entry determination operation comprises determining that the entry conditions of the efficiency maintaining process are satisfied based on the drying efficiency derived from measured values of the first humidity sensor and the second humidity sensor reaching an efficiency maintaining process entry drying efficiency.

8. The method of claim 1, further comprising:
before performing the efficiency maintaining operation, determining whether a measured value of a compressor sensor disposed in the fluid circulator to measure a temperature of the fluid passing through the compressor corresponds to an efficiency maintaining process entry compressor sensor value,
wherein the efficiency maintaining operation is performed based on determining the measured value of the compressor sensor corresponds to the efficiency maintaining process entry compressor sensor value.

9. The method of claim 8, further comprising correcting the efficiency maintaining process entry compressor sensor value to a higher value based on an increase of a measured value of an outdoor air sensor for measuring a temperature of air outside the cabinet.

10. The method of claim 1, further comprising:
performing an efficiency decreasing operation by controlling the first driver and the second driver after the efficiency maintaining operation for reducing the drying efficiency during the drying operation,
wherein performing the efficiency decreasing operation comprises:
performing a first efficiency decreasing process by controlling the first driver to rotate the drum at the first drum RPM and controlling the second driver to rotate the fan at a third fan RPM lower than the second fan RPM.

11. The method of claim 10, wherein performing the efficiency maintaining operation comprises controlling the compressor to operate at a second frequency, and
wherein performing the first efficiency decreasing process comprises controlling the compressor to operate at a third frequency lower than the second frequency.

12. The method of claim 11, wherein performing the efficiency increasing operation further comprises:
before performing the first efficiency increasing process, performing a laundry amount determination operation by rotating the drum to determine a laundry amount in the drum,
wherein performing the first efficiency decreasing process comprises correcting the third fan RPM to a value equal to the second fan RPM and correcting the third frequency to a value equal to the second frequency based on determining that the laundry amount is equal to or greater than an amount reference value.

13. The method of claim 10, further comprising:
before performing before the efficiency maintaining operation, determining whether a change rate of a measured value of a humidity sensor disposed in the air circulator to measure a humidity of the air passing through the drum corresponds to an efficiency decreasing process entry humidity change rate,
wherein the efficiency decreasing operation is performed based on determining that the change rate of the measured value of the humidity sensor corresponds to the efficiency decreasing process entry humidity change rate.

14. The method of claim 10, further comprising:
before performing the efficiency maintaining operation, determining whether a change rate of a measured value of an evaporator sensor disposed in the fluid circulator to measure a temperature of the fluid passing through the evaporator corresponds to an efficiency decreasing process entry change rate,
wherein the efficiency decreasing operation is performed based on determining that the change rate of the measured value of the evaporator sensor reaches the efficiency decreasing process entry change rate.

15. The method of claim 10, further comprising:
before performing the efficiency decreasing operation, performing an efficiency decreasing process entry determination operation that determines whether a measured value of an electrode sensor disposed in the drum to measure a moisture amount in contact with the laundry reaches an efficiency decreasing process entry electrode sensor value,
wherein the efficiency decreasing operation is performed based on determining that the measured value of the electrode sensor reaches the efficiency decreasing process entry electrode sensor value.

16. The method of claim 15, wherein performing the efficiency increasing operation further comprises:
before performing the first efficiency increasing process, performing a laundry amount determination operation by rotating the drum to determine a laundry amount in the drum, and
wherein the efficiency decreasing process entry determination operation is performed based on determining that the laundry amount is equal to or greater than an amount reference value.

17. The method of claim 10, wherein performing the efficiency decreasing operation further comprises:
performing a second efficiency decreasing process by controlling the first driver and the second driver after the first efficiency decreasing process, and
wherein performing the second efficiency decreasing process comprises controlling the first driver to rotate the drum at a second drum RPM lower than the first drum RPM and controlling the second driver to rotate the fan at a fourth fan RPM lower than the third fan RPM.

18. The method of claim 17, wherein the performing the efficiency decreasing operation comprises controlling the compressor and the driver such that a reduction rate of the drying efficiency is greater in the first efficiency decreasing process than in the second efficiency decreasing process.

19. The method of claim 17, wherein performing the first efficiency decreasing process comprises controlling the compressor to operate at a third frequency, and
wherein performing the second efficiency decreasing process comprises controlling the compressor to operate at a fourth frequency lower than a third frequency.

20. The method of claim 19, wherein, in the second efficiency decreasing process, the second drum RPM has a value greater than 0, and the fourth fan RPM and the fourth frequency correspond to 0, and driving of the fan and the compressor is terminated.

21. The method of claim 17, wherein performing the efficiency increasing operation further comprises:
before performing the first efficiency increasing process, performing a laundry amount determination operation by rotating the drum to determine a laundry amount,
wherein performing the efficiency decreasing operation further comprises:
based on the laundry amount being equal to or greater than an amount reference value, performing a second efficiency decreasing process entry determination operation that comprises determining whether a measured value of an electrode sensor disposed in the drum to measure a moisture amount in contact with the laundry corresponds to a second efficiency decreasing process entry electrode sensor value for a preset observation time, and
wherein the second efficiency decreasing process is performed based on determining that the measured value of the electrode sensor corresponds to the second efficiency decreasing process entry electrode sensor value for the preset observation time.

22. The method of claim 21, wherein the second efficiency decreasing process entry determination operation further comprises:
determining whether a duration of the first efficiency decreasing process is equal to or greater than a first efficiency process operation execution time based on the laundry amount being less than the amount reference value, and
wherein the second efficiency decreasing process is performed based on determining that the duration of the first efficiency decreasing process is equal to or greater than the first efficiency decreasing process execution time in the second efficiency decreasing process entry determination operation.

23. The method of claim 17, further comprising:
terminating the second efficiency decreasing process based on determining a duration of the second efficiency decreasing process is equal to or greater than a second efficiency decreasing process execution time.

24. A method for controlling a laundry treating apparatus, the laundry treating apparatus including a cabinet, a drum disposed rotatably inside the cabinet and configured to accommodate laundry therein, a fluid circulator including a condenser, a compressor, and an evaporator for circulating fluid therethrough, an air circulator including a fan configured to cause air heated through the fluid circulator to flow into the drum, and a driver including a first driver configured to rotate the drum and a second driver configured to rotate the fan, the method comprising:
performing an efficiency maintaining operation by controlling the first driver and the second driver to maintain a drying efficiency that is related to a humidity of the air inside the drum during a drying operation; and
performing an efficiency decreasing operation by controlling the first driver and the second driver after the efficiency maintaining operation to reduce the drying efficiency during the drying operation,
wherein performing the efficiency maintaining operation comprises controlling the first driver to rotate the drum at a first drum revolutions per minute (RPM) and controlling the second driver to rotate the fan at a second fan RPM, and
wherein performing the efficiency decreasing operation comprises:
performing a first efficiency decreasing process by controlling the first driver to rotate the drum at the first drum RPM and controlling the second driver to rotate the fan at a third fan RPM lower than the second fan RPM,
determining whether a duration of the first efficiency decreasing process is equal to or greater than a first efficiency decreasing process execution time, and
based on determining that the duration of the first efficiency decreasing process is equal to or greater than the first efficiency decreasing process execution time, performing a second efficiency decreasing process by controlling the first driver to rotate the drum at the first drum RPM and controlling the second driver to rotate the fan at a fourth fan RPM lower than the third fan RPM.

* * * * *